US012657669B2

(12) United States Patent
Hu et al.

(10) Patent No.: US 12,657,669 B2
(45) Date of Patent: Jun. 16, 2026

(54) IMAGE PROCESSING METHOD, ELECTRONIC DEVICE AND READABLE STORAGE MEDIUM

(71) Applicant: SAMSUNG ELECTRONICS CO., LTD., Suwon-si (KR)

(72) Inventors: Ben Hu, Beijing (CN); Jianxing Zhang, Beijing (CN); Sengui Zheng, Beijing (CN); Chunyang Li, Beijing (CN); Zikun Liu, Beijing (CN); Jili Li, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 575 days.

(21) Appl. No.: 17/987,609

(22) Filed: Nov. 15, 2022

(65) Prior Publication Data

US 2023/0080693 A1 Mar. 16, 2023

Related U.S. Application Data

(63) Continuation of application No. PCT/KR2021/006077, filed on May 14, 2021.

(30) Foreign Application Priority Data

May 15, 2020 (CN) ......................... 202010414871.3
Jul. 29, 2020 (CN) ......................... 202010746488.8
Oct. 29, 2020 (CN) ......................... 202011185859.6

(51) Int. Cl.
*G06K 9/00* (2022.01)
*G06T 5/50* (2006.01)
*G06T 5/70* (2024.01)

(52) U.S. Cl.
CPC .................. *G06T 5/70* (2024.01); *G06T 5/50* (2013.01); *G06T 2207/20221* (2013.01)

(58) Field of Classification Search
None
See application file for complete search history.

(56) References Cited

U.S. PATENT DOCUMENTS 9,185,376 B2 11/2015 Tai et al.
9,262,808 B2 2/2016 Porikli et al.
(Continued)

FOREIGN PATENT DOCUMENTS

CN 102129673 B * 7/2012
CN 108765319 A * 11/2018 ............... G06T 5/70
(Continued)

OTHER PUBLICATIONS

ISR and Written Opinion (PCT/ISA/220, PCT/ISA/210, and PCT/ISA/237) issued Aug. 12, 2021 by the International Searching Authority in International App No. PCT/KR2021/006077.
(Continued)

*Primary Examiner* — Wei Wen Yang
(74) *Attorney, Agent, or Firm* — Sughrue Mion, PLLC

(57) ABSTRACT

Provided is an image processing method to process an image, the method including acquiring a plurality of channel images of the image to be processed, acquiring a noise intensity corresponding to the each of the plurality of channel images of the image to be processed, denoising the image to be processed based on the noise intensity corresponding to the each of the plurality of channel images of the image, and obtaining the denoised image.

11 Claims, 30 Drawing Sheets

(56) References Cited

U.S. PATENT DOCUMENTS

| | | | | |
|---|---|---|---|---|
| 11,379,955 | B2 | 7/2022 | Nair | |
| 2011/0243466 | A1 | 10/2011 | Lee | |
| 2018/0352118 | A1* | 12/2018 | Birkbeck | G06T 5/70 |
| 2020/0396398 | A1* | 12/2020 | Romanenko | G06T 5/50 |

FOREIGN PATENT DOCUMENTS

| | | | | | |
|---|---|---|---|---|---|
| CN | 109242794 | A | | 1/2019 | |
| CN | 109658344 | A | | 4/2019 | |
| CN | 109658348 | A | * | 4/2019 | G06N 3/0454 |
| CN | 109685729 | A | | 4/2019 | |
| CN | 110738605 | A | | 1/2020 | |
| CN | 110796614 | A | | 2/2020 | |
| CN | 111741211 | A | * | 10/2020 | G06T 5/002 |
| EP | 2 360 906 | A2 | | 8/2011 | |
| EP | 3404611 | A1 | * | 11/2018 | G06N 3/04 |
| JP | 2001-285640 | A | | 10/2001 | |
| JP | 2003-283878 | A | | 10/2003 | |
| JP | 2013-41565 | A | | 2/2013 | |
| KR | 10-1931332 | B1 | | 12/2018 | |
| WO | 2019164232 | A1 | | 8/2019 | |

OTHER PUBLICATIONS

Ignatov et al., "DSLR-Quality Photos on Mobile Devices with Deep Convolutional Networks," CVF, Apr. 2017, 9 total pages.

Guo, et al., "Toward Convolutional Blind Denoising of Real Photographs," CVF, Apr. 2019, 11 total pages.

Zhang et al., "Kindling the Darkness: A Practical Low-light Image Enhancer," arXiv:1905.04161v1 [cs.CV], May 4, 2019, 13 total pages.

Sun et al., "Learned Image Downscaling for Upscaling Using Content Adaptive Resampler," arXiv:1907.12904v2 [cs.CV], Nov. 5, 2019, 14 total pages.

Communication dated Apr. 30, 2025, issued by the China National Intellectual Property Administration in Chinese Application No. 202011185859.6.

* cited by examiner

ACQUIRE A BRIGHTNESS CHANNEL
IMAGE OF THE IMAGE TO BE PROCESSED — 431

DETERMINE A BRIGHTNESS ENHANCEMENT
PARAMETER OF THE IMAGE TO BE PROCESSED — 433

PREFORM IMAGE BRIGHTNESS ADJUSTMENT
ON THE IMAGE TO BE PROCESSED BASED ON
THE BRIGHTNESS ENHANCEMENT PARAMETER — 435

OBTAIN A BRIGHTNESS-ADJUSTED IMAGE — 437

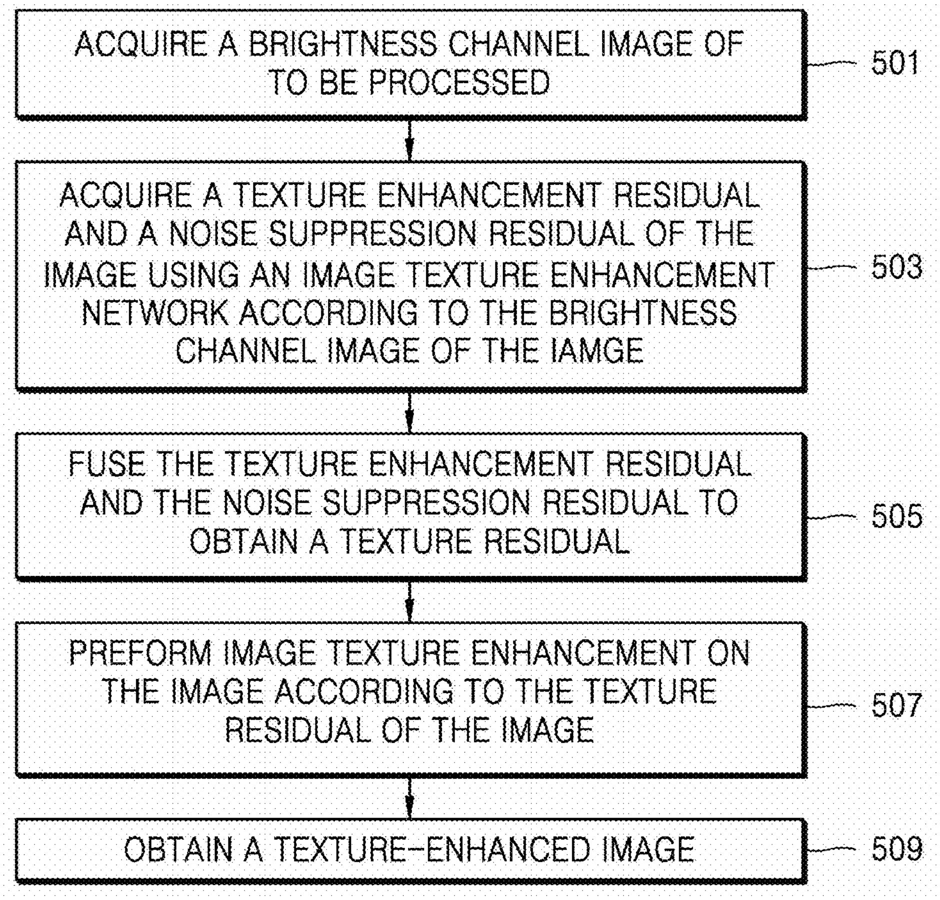

FIG. 5H

ACQUIRE A BRIGHTNESS CHANNEL IMAGE OF TO BE PROCESSED — 501

ACQUIRE A TEXTURE ENHANCEMENT RESIDUAL AND A NOISE SUPPRESSION RESIDUAL OF THE IMAGE USING AN IMAGE TEXTURE ENHANCEMENT NETWORK ACCORDING TO THE BRIGHTNESS CHANNEL IMAGE OF THE IAMGE — 503

FUSE THE TEXTURE ENHANCEMENT RESIDUAL AND THE NOISE SUPPRESSION RESIDUAL TO OBTAIN A TEXTURE RESIDUAL — 505

PREFORM IMAGE TEXTURE ENHANCEMENT ON THE IMAGE ACCORDING TO THE TEXTURE RESIDUAL OF THE IMAGE — 507

OBTAIN A TEXTURE-ENHANCED IMAGE — 509

IMAGE PROCESSING METHOD, ELECTRONIC DEVICE AND READABLE STORAGE MEDIUM

CROSS REFERENCE TO RELATED APPLICATIONS

This application is a bypass continuation application of International Application No. PCT/KR2021/006077, filed on May 14, 2021, which is based on and claims the priority to Chinese Patent Application No. 202010414871.3 filed on May 15, 2020, Chinese Patent Application No. 202010746488.8 filed on Jul. 29, 2020, and Chinese Patent Application No. 202011185859.6 filed on Oct. 29, 2020 in the China National Intellectual Property Administration, the disclosures of which are incorporated by reference herein in their entireties.

BACKGROUND

The disclosure relates to the field of image processing and artificial intelligence technologies, and specifically, the disclosure relates to an image processing method, electronic device and computer readable storage medium.

At present, the mobile terminal (including smart phones) market is very popular. Camera performance of smart terminals has become one focus of fierce competition among major smart phone manufacturers. Each mobile terminal manufacturer takes efforts in hardware, software, and application, to constantly improve of image quality level for smart terminals, to improve the user's photo experience. Image quality enhancement is a broad concept. Although the existing image quality enhancement solutions have achieved very good technical results, there is still much room for improvement.

SUMMARY

The present application aims to solve at least one of the above technical defects. The technical solutions according to embodiments of the present application are as follows:

According to an aspect of an embodiment there is provided an image processing method, and the method comprises acquiring the image to be processed, acquiring a noise intensity feature of the image to be processed, denoising the image to be processed according to the noise intensity feature of the image, and obtaining the denoised image.

According to another aspect of an embodiment there is provided an electronic device, including a processor and a memory, wherein a computer program is stored in the memory, and performs, when executed by the processor, the method provided in the embodiment of the present application.

According to another aspect of an embodiment there is provided a computer-readable storage medium, having a computer program stored thereon that performs, when executed by a processor, the method provided in the embodiment of the present application.

According to an aspect of an embodiment, there is provided an image processing method to process an image, the method including acquiring a plurality of channel images of the image to be processed, acquiring a noise intensity corresponding to the each of the plurality of channel images of the image to be processed, denoising the image to be processed based on the noise intensity corresponding to the each of the plurality of channel images of the image, and obtaining the denoised image.

The method may further include acquiring a brightness channel image of the image to be processed, and acquiring a noise spatial distribution of the image to be processed based on the brightness channel image of the image, wherein the denoising of the image to be processed based on the noise intensity corresponding to the each of the plurality of channel images of the image includes denoising the image to be processed based on the noise intensity and the noise spatial distribution of the image.

The acquiring of the noise spatial distribution of the image to be processed based on the brightness channel image of the image may include acquiring the noise spatial distribution of the image to be processed based on a noise spatial feature network based on the brightness channel image of the image.

The acquiring of the noise intensity corresponding to the each of the plurality of channel images of the image to be processed may include acquiring the noise intensity corresponding to the each of the plurality of channel images based on a cascaded noise intensity network.

The denoising of the image to be processed based on the noise intensity corresponding to the each of the plurality of channel images of the image may include concatenating the noise intensity of the each of the plurality of channel images of the image to be processed, and acquiring a noise residual by a denoising network according to the concatenated noise intensity of the each of the plurality of channel images of the image to be processed, wherein the denoising of the image based on the noise intensity corresponding to the each of the plurality of channel images of the image to be processed includes denoising the image to be processed based on the noise residual.

The method may further include acquiring a brightness channel image of the image to be processed, and acquiring a feature of the image to be processed based on the brightness channel image of the image and the concatenated feature of the each of the plurality of channel images of the image to be processed, wherein the denoising of the image to be processed based on the noise residual includes denoising of the image to be processed based on the noise residual and the feature of the image to be processed.

The denoising of the image to be processed based on the noise residual and the feature of the image to be processed may include weighting the noise residual based on the feature to obtain a weighted noise residual, and denoising the image to be processed based on the weighted noise residual.

The obtaining of the denoised image may include obtaining the denoised image by fusing the weighted noise residual and the image to be processed.

A structure of the denoising network may be a UNet-like structure.

According to another aspect of an embodiment, there is provided an electronic device configured to process an image, the electronic device including a memory configured to store one or more instructions, and at least one processor configured to execute the one or more instructions stored in the memory to acquire a channel image of the image to be processed, acquire a feature corresponding to the each of the plurality of channel images of the image to be processed, denoise the image to be processed based on the feature corresponding to the each of the plurality of channel images of the image to be processed, and obtain the denoised image.

The at least one processor may be further configured to execute the one or more instructions stored in the memory to acquire a brightness channel image of the image to be processed, and acquire a feature of the image to be processed based on the brightness channel image of the image, wherein the denoising of the image to be processed based on the feature corresponding to the each of the plurality of channel images of the image includes denoising the image to be processed based on the feature corresponding to the each of the plurality of channel images and the feature of the image.

To acquire the feature of the image to be processed based on the brightness channel image of the image, the at least one processor may be configured to execute the one or more instructions stored in the memory to acquire the feature of the image to be processed based on a noise spatial feature network based on the brightness channel image of the image to be processed.

To acquire the feature corresponding to the each of the plurality of channel images of the image to be processed, the at least one processor may be configured to execute the one or more instructions stored in the memory to acquire the feature corresponding to the each of the plurality of channel images based on a cascaded feature network.

To denoise the image to be processed based on the feature corresponding to the each of the plurality of channel images of the image to be processed, the at least one processor may be configured to execute the one or more instructions stored in the memory to concatenate the feature of the each of the plurality of channel images of the image to be processed, and acquire a noise residual by a denoising network based on the concatenated feature of the each of the plurality of channel images of the image to be processed, wherein the denoising of the image based on the feature corresponding to the each of the plurality of channel images of the image includes denoising the image based on the noise residual.

According to another aspect of an embodiment, there is provided a computer-readable storage medium, having a computer program stored thereon that performs, when executed by a processor, an image processing method to process an image, the method including acquiring a plurality of channel images of the image to be processed, acquiring a noise intensity corresponding to the channel image of the image to be processed, denoising the image to be processed based on the noise intensity corresponding to the channel image of the image, and obtaining the denoised image.

BRIEF DESCRIPTION OF THE DRAWINGS

These and/or other aspects will become apparent and more readily appreciated from the following description of the example embodiments, taken in conjunction with the accompanying drawings in which:

FIG. 5H shows a schematic flowchart of an image texture enhancement provided in an embodiment of the present application;

DETAILED DESCRIPTION

Figure 1:
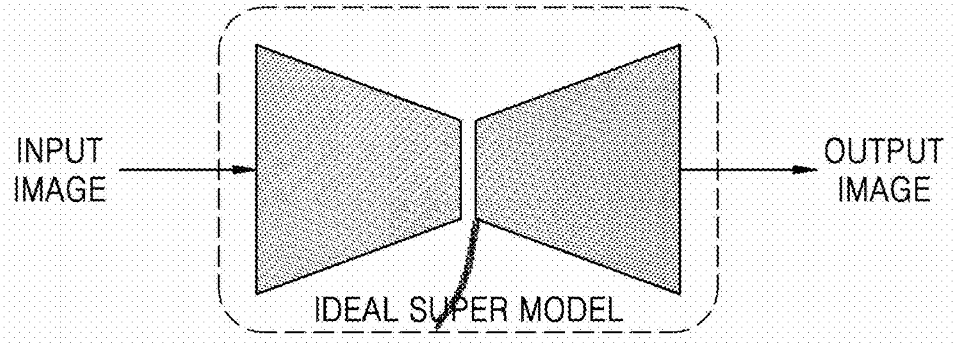
FIG. 1 shows a schematic diagram of the principle of a super model.

Embodiments of the present disclosure are described in detail below, and the examples of the embodiments are illustrated in the drawings, where throughout the drawings, the same or similar reference numbers are used to depict the same or similar elements or elements having the same or similar functions. The embodiments described below with reference to the accompanying drawings are illustrative, and are only used to explain the present disclosure, rather than being construed as limiting the present disclosure. Throughout the disclosure, the expression "at least one of a, b or c" indicates only a, only b, only c, both a and b, both a and c, both b and c, all of a, b, and c, or variations thereof.

Those skilled in the art should understand that the singular forms "a", "an", "said" and "the" include plural referents unless the context clearly dictates otherwise. It should be further understood that the expression "including" or "includes" used in the specification of the present disclosure indicates the existence of the features, integers, steps, operations, elements and/or components, but does not preclude the existence or addition of one or more other features, integers, steps, operations, elements, components and/or combinations thereof. It should be understood when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

In order to better understand and explain the alternative solutions provided in the present application, the related technologies involved in the present application and the problems existing in the existing image quality enhancement solutions are described firstly below.

Image quality enhancement generally is a broad concept, including image denoising, deblurring, image restoration, super-resolution, texture enhancement and many other low-level image understanding subtasks. Each task is used to solve a specific sub-problem. For example, the image denoising is mainly used to remove useless noise information in the image, the image restoration mainly repairs and reconstructs damaged images or removes redundant objects in the image, and the image super-resolution refers to recovery the high-resolution image from a low-resolution image or image sequence, and the image deblurring mainly involves how to eliminate the image blurring caused by the camera shake or out of focus. In addition, there are still some image quality improvement solutions that focus on the brightness, tone, and contrast of the image to make the image more vivid.

For the image quality enhancement, the most common practice in the industry is to concatenate various subtasks into a workflow, and perform each subtask in sequence. For example, the image signal processor (ISP) in the camera uses this typical mode. Although the ISPs of the major terminal equipment manufacturers are different, they usually cannot cover all subtasks such as image deblurring, restoration, and texture enhancement. When such tasks are required, additional processing modules are often required.

With the development of artificial intelligence technology, the related deep learning-based image processing technology has made a considerable progress, and the usage of deep learning technology has made image processing a greater quality improvement. However, related deep learning-based image processing technology is usually designed for a specific task, and usually only involves a certain aspect of image quality enhancement.

The related image quality enhancement method may have at least the following disadvantages.

The related image quality enhancement method is usually a holistic image quality enhancement method, which pays more attention to the overall image but pays little attention to the details of the image. This holistic image quality enhancement method mainly focuses on image brightness, tone, contrast, etc., but does not focus on image detail information (such as, image texture detail enhancement, elimination of noise information). With this scheme, one possible situation may occur, in which when the brightness and tone of the image are well improved, the noise in the dark area of the image becomes more obvious. The holistic image quality enhancement method cannot cover specific tasks such as image denoising and texture enhancement.

In some of the related solutions, some specific methods for specific tasks are simply concatenated to achieve various enhancements to image quality, but this simple concatenation does not take into account the characteristics of the task itself. For example, the image denoising tends to reduce information, while the texture enhancement tends to increase information, and it is impossible to determine their topological correlation in the overall concatenation process.

Simple concatenation of multitasks will inevitably lead to poor real-time performance, since regardless of the quality of an image, the image will go through a pre-set concatenation process. For example, a possible situation is that a high-quality photo, which does not require additional processing, still needs to go through all the processing process, resulting in unnecessary waste of time and space resources.

For the image quality enhancement, the most ideal solution is to establish an ideal super model (ISM), which can solve all the subtasks of image quality enhancement at the same time.

As shown in FIG. 1, an input image to be enhanced in quality will be input into the ideal super model, in order to obtain an output image after quality enhancement processing in various aspects. However, this ideal model is difficult to achieve the optimal improvement of image quality, since this model does not consider the characteristics of various tasks and the correlation between them. For example, a possible and more general task combination is image denoising, color (colour)/brightness adjustment (that is, tone adjustment) and texture enhancement. Where the denoising model tends to remove the information in the input image, while the texture enhancement tends to add extra information to the input image. These two subtasks with inverse image spatial operation features often make the model difficult to operate, and finally the model makes a trade-off between noise elimination and texture enhancement, which may neither achieve the optimal denoising effect nor a good detail enhancement goal. It is more likely to happen a situation in which a little noise is regarded as texture to be enhanced and even the image quality is reduced.

As shown in FIG. 1, an input image to be enhanced in quality will be input into the ideal super model, in order to obtain an output image after quality enhancement processing in various aspects. However, this ideal model is difficult to achieve the optimal improvement of image quality, since this model does not consider the characteristics of various tasks and the correlation between them. For example, a possible and more general task combination is image denoising, color (colour)/brightness adjustment (that is, tone adjustment) and texture enhancement. Where the denoising model tends to remove the information in the input image, while the texture enhancement tends to add extra information to the input image. These two subtasks with inverse image spatial operation features often make the model difficult to operate, and finally the model makes a trade-off between noise elimination and texture enhancement, which may neither achieve the optimal denoising effect nor a good detail enhancement goal. It is more likely to happen in a situation in which a little noise is regarded as texture to be enhanced and even the image quality is reduced.

The purpose of the present application is to solve at least one of the above technical problems related in the related technology. However, the present application is not limited thereto. The technical solutions of the present application and how the technical solutions of the present application solve the above technical problems will be described in detail below with specific embodiments. The following specific alternative embodiments may be combined with each other, and the same or similar concepts or processes may not be repeated in some embodiments. Hereinafter, various embodiments of the present application will be described with reference to the accompanying drawings.

Figure 2:
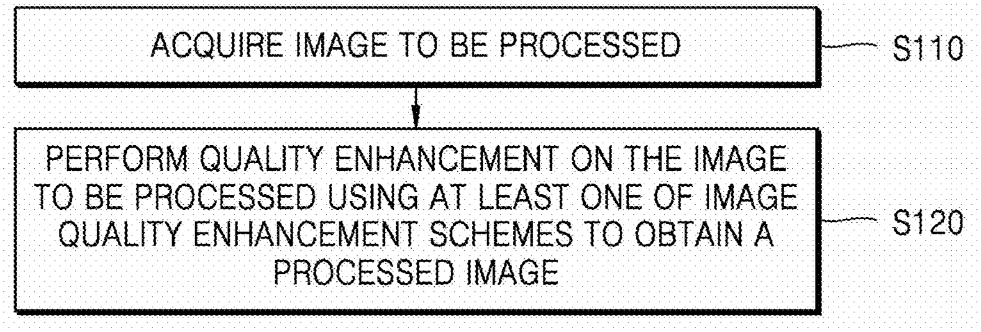
FIG. 2 shows a schematic flowchart of an image processing method provided in an embodiment of the present application.

FIG. 2 shows a schematic flowchart of an image processing method provided in an embodiment of the present application.

The method may be executed by any type of electronic device, for example, a mobile terminal of a user, such as a smart phone. Based on this method, the user may perform real-time enhancement processing on photos taken by a smart phone, and may also process photos stored in the smart phone, to obtain higher quality photos. As shown in FIG. 2, the method provided in the embodiment of the present application may include the following steps:

At step 110, an image to be processed is acquired.

At step 120, the quality enhancement is performed on the image to be processed using at least one of image quality enhancement schemes to obtain a processed image.

Wherein, the image to be processed may be any image that needs to be enhanced in image quality. For example, it may be an image captured by the user's mobile phone in real time, or an image stored in the mobile phone, or an image obtained from another device or storage space.

The above-mentioned at least one of image quality enhancement schemes refers to a solution for image quality enhancement processing from at least one dimension. In this embodiment of the present application, the at least one of image quality enhancement schemes may include, but is not limited to, one or more of image denoising, image tone adjustment, and image texture enhancement, wherein the image tone adjustment includes image brightness adjustment and/or image color adjustment.

The image processing method provided in the present application will be described in detail below in conjunction with various embodiments.

In an embodiment of the present disclosure, the above-mentioned at least one of image quality enhancement schemes includes image denoising.

The performing quality enhancement on the image to be processed using at least one of image quality enhancement schemes includes obtaining the noise intensity of the image to be processed and denoising the image to be processed according to the noise intensity.

Wherein, the noise intensity of the image to be processed (also referred to as the noise intensity distribution feature) represents the noise distribution feature corresponding to the device hardware environment of the image acquisition device that collects the image to be processed. The noise intensity of the image to be processed may be the strength or the degree of the noise in the image. The higher the noise intensity of the image, the stronger the noise reduction may be needed. The noise intensity of the image to be processed may be predicted by a neural network model (which may be referred as a noise feature estimation model, or a noise intensity network, or a noise intensity estimation network, or a noise intensity prediction network, or a noise intensity prediction network), that is, the image to be processed is input into the pre-trained neural network model to obtain the noise intensity features of the image to be processed.

Blind denoising for real image denoising is very challenging and has always been a research difficulty in academics. Although the industry has a strong demand for this, the denoising effect of the related technology still needs to be improved. The purpose of image denoising is to eliminate noise information, such as color noise, compression noise and pattern noise. The main difficulty in denoising processing is that it is very difficult to model the real image noise, different from the Gaussian white noise that academia is keen on modeling. Different sensors and environments will cause different noise distributions. This noise may from camera sensors or image processing algorithms, even from the image compression and storage process. The true noise distribution depends not only on software, but also on hardware, and it is difficult to high-quality denoising the noise distribution related to the hardware environment by using a general deep learning model.

In response to this technical problem, in an alternative solution provided in the embodiments of the present application, considering the noise level of the input data (that is, the input image) and the fact that the noise distribution has both intensity feature and spatial feature (for example, for a low-brightness image, the noise in the dark area may be significantly higher than the noise in the bright area), the noise level is evaluated before the eliminating of noise.

As an alternative solution, the noise intensity corresponding to the device hardware environment of the image acquisition device used to collect the image to be processed may be acquired, so as to improve the denoising effect based on the noise intensity corresponding to the device hardware environment. The device hardware environment may refer to one or more of hardware configuration information of the image acquisition device, and may include, but is not limited to, camera sensor configuration information, processor configuration information, available storage space information, and the like, of the device.

In an embodiment of the present disclosure, the denoising of the image which is one of an image processing method for enhancing quality of the image includes acquiring the image to be processed, acquiring a noise intensity of the image to be processed, denoising the image to be processed according to the noise intensity of the image, and obtaining the denoised image.

Specifically, a noise residual map (i.e., noise residual, also referred as a noise map) may be obtained based on the noise intensity and the image to be processed. For example, the noise intensity and the image to be processed are input to a neural network model (also referred as a denoising network, or a denoising model), to obtain the noise residual map. The denoised image is obtained by fusing the image to be processed and the noise residual map, for example, adding the image to be processed and the noise residual map to obtain the denoised image. It may be understood that the size of the noise residual map is the same as the size of the image to be processed. Adding of the image to be processed and the noise residual map refers to the addition of element values of a same pixel in the two images, that is, a pointwise addition operation is performed on the two images to obtain the pixel value at the same position in the denoised image.

In an embodiment of the present disclosure, the noise intensity of the image to be processed includes a noise intensity corresponding to each of the plurality of channel images of the image to be processed.

In an embodiment of the present disclosure, the denoising of the image which is one of an image processing method for enhancing quality of the image includes acquiring each of the plurality of channel images of the image to be processed, acquiring a noise intensity corresponding to the each of the plurality of channel images of the image to be processed, denoising the image to be processed according to the noise intensity corresponding to the each of the plurality of channel images of the image, and obtaining the denoised image.

In an embodiment, the image denoising further comprises acquiring a brightness channel image of the image to be processed, and acquiring a noise spatial distribution of the image to be processed according to the brightness channel image of the image. The denoising of the image to be processed according to the noise intensity corresponding to the each of the plurality of channel images of the image of the image comprises denoising the image to be processed according to the noise intensity corresponding to the each of the plurality of channel images and the noise spatial distribution of the image.

In an embodiment, the acquiring of the noise spatial distribution of the image to be processed according to the brightness channel image of the image comprises acquiring the noise spatial distribution of the image to be processed by using a noise spatial feature network according to the brightness channel image of the image.

In an embodiment, the acquiring of the noise intensity corresponding to the each of the plurality of channel images of the image to be processed comprises acquiring the noise intensity corresponding to the each of the plurality of channel images by using a cascaded noise intensity network.

In an embodiment, the acquiring of the image to be processed according to the noise intensity corresponding to the each of the plurality of channel images of the image of the image comprises concatenating the noise intensity of the each of the plurality of channel images of the image, and acquiring a noise residual by a denoising network according to the concatenated noise intensity of the each of the plurality of channel images of the image. The denoising of the image according to the noise intensity corresponding to the each of the plurality of channel images of the image comprises denoising the image according to the noise residual.

In an embodiment of the present disclosure, the acquiring a noise intensity of the image to be processed includes acquiring each of the plurality of channel images of the image to be processed, acquiring the noise intensity corresponding to each of the plurality of channel images of the image, and concatenating the noise intensity of each of the plurality of channel images to acquiring the noise intensity of the image to be processed.

In an embodiment of the present disclosure, the acquiring the noise intensity of each of the plurality of channel images respectively may includes based on each of the plurality of channel images, acquiring the noise intensity of corresponding channel image using a noise intensity network corresponding to each of the plurality of channel images respectively.

In other words, when acquiring the noise intensity of the image to be processed, the noise intensity of each of the plurality of channel images is acquired one channel by one channel and the noise intensity of the image may be obtained by concatenating the noise intensity corresponding to each channel.

For an image, the noise distribution of different channels is usually different. The noise distribution of each channel has some rules, which is similar to the Gaussian distribution. The Gaussian distribution parameters of different channels are usually different, such as indicates and variances. The noise distribution of each channel may be approximately regarded as Gaussian distribution with different indicates and variances (especially, variances). Based on this rule, the image may be split according to channels, and the noise intensity of each of the plurality of channel images may be estimated respectively, so that the noise intensity of each channel of the image can be evaluated more accurately, the predicted noise intensity is more consistent with the actual noise distribution of each of the plurality of channel images, the noise reduction processing may be more targeted and accurate, and the denoising performance is improved.

It may be understood that for different color space modes, the channel mode of the image may be different. For example, for R (Red) G (Green) B (Blue) color mode, each of the plurality of channel images of the image to be processed includes the red channel image, the green channel image and the blue channel image.

Since that the noise distribution feature of different channel images are different, in order to more accurately estimate the noise intensity corresponding to each channel, the noise intensity network (also referred as a noise feature estimation network, or a noise intensity estimation network, or a noise intensity prediction network, or a noise intensity prediction network) corresponding to each channel may be pre-trained, so when predicting the noise intensity of the image to be processed, the noise intensity corresponding to each channel may be obtained by using the noise intensity network corresponding to each channel respectively.

In an embodiment of the present disclosure, the denoising of the image to be processed according to the noise intensity includes acquiring a brightness channel image of the image to be processed, acquiring a noise spatial distribution of the image to be processed according to the brightness channel image and denoising the image to be processed according to the noise intensity and noise spatial distribution.

In an embodiment, the acquiring a noise spatial distribution of the image to be processed according to the brightness channel image includes determining the noise spatial distribution of the image to be processed using a noise spatial feature network, according to the brightness channel image and noise intensity.

In an embodiment, the denoising of the image to be processed according to the noise intensity and noise spatial distribution may include acquiring the noise residual of the image to be processed according to the noise intensity and the image to be processed, weighting the noise residual according to the noise spatial distribution to obtain a weighted noise residual and obtaining a denoised image according to the weighted noise residual and the image to be processed.

According to the embodiment, the image denoising further comprises acquiring a brightness channel image of the image to be processed, and acquiring a noise spatial distribution of the image to be processed according to the brightness channel image of the image and the concatenated noise intensity of the each of the plurality of channel images of the image. The denoising of the image according to the noise residual comprises denoising the image according to the noise residual and the noise spatial distribution of the image.

In an embodiment, the denoising of the image according to the noise residual and the noise spatial distribution of the image comprises weighting the noise residual according to the noise spatial distribution to obtain a weighted noise residual, and denoising the image according to the weighted noise residual.

In an embodiment, the obtaining of the image comprises obtaining the denoised image by fusing the weighted noise residual and the image to be processed.

In an embodiment, a structure of the denoising network is a UNet-like structure.

From the above mentioned description, it can be seen that in practical applications, for the same image, the noise distribution of the image not only includes the intensity distribution feature, but also has the noise spatial distribution. The different areas in the image generally have different brightness information, some areas are brighter, some areas are darker, and the areas with different brightness usually have different noise. For example, a typical scene is: for a low-light image, the noise in the darker area of the image is significantly larger than the noise in the brighter area of the image. Therefore, in order to better achieve better denoising effects for different areas, in the solution of the embodiment of the present disclosure, the noise spatial distribution of the image may be predicated by extracting the brightness channel (such as L channel) of the image. When performing denoising processing on the image to be processed, by considering both the noise intensity and the noise spatial feature in the image, the denoising processing of the image may be achieved more accurately and effectively. For example, according to the image intensity feature, a larger degree of denoising processing is performed on areas with lower brightness in the image, and a smaller degree of denoising processing is performed on areas with higher brightness in the image, to make denoising more targeted, and achieve different denoising processing for different spatial areas in the image.

In an example, the value of the noise spatial distribution at a pixel ranges from 0 to 1. 1 is the largest weight, which indicates that the denoising ability at this pixel is great, and 0.2 is a relatively small weight, which indicates that the denoising ability at this pixels is relatively small.

As an embodiment of the present disclosure, the noise intensity of the corresponding channel image may be obtained by using the noise intensity network corresponding to each of the plurality of channel images based on each of the plurality of channel images of the image to be processed. Correspondingly, the noise residual corresponding to each channel may be obtained through the image denoising network based on the noise intensity of each of the plurality of channel images and the image to be processed. For the noise residual of each channel, the noise residual of each channel is weighted by using the noise spatial distribution, to obtain the weighted noise residual corresponding to each channel. And then, according to the weighted noise residual and the image to be processed, the channel image of each channel of the image to be processed and the noise residual of this channel are added, to get the denoised image corresponding to each channel.

In an embodiment, when predicting the noise spatial distribution of the image based on the brightness channel image and the noise intensity of the image, specifically, a noise spatial distribution network (also referred to as a noise spatial feature prediction network, or a noise spatial distribution prediction network, or a noise spatial distribution estimation network, or a noise spatial feature estimation network) may be used for prediction. Since the noise spatial distribution reflects the distribution of the noise intensity of the image in space, the noise spatial distribution may be used as the weight of the noise map (that is, the noise residual) to weight the noise map, so as to obtain a noise map that is more in line with the actual situation. Therefore, a better denoising effect is achieved based on the weighted noise intensity.

In an embodiment, the noise spatial distribution may include the noise spatial distribution corresponding to each pixel in the image to be processed, the noise residual map includes the noise intensity distribution information of each point in the image to be processed, and the noise spatial distribution is used as the noise processing weight feature map of the image to be processed. The element value of each element point in the noise processing weight feature map is a noise weight of the corresponding position point in the noise residual map. The noise residual map may be weighted based on the noise processing weight feature map to obtain a noise residual map related to image brightness information that is more in line with the actual situation (that is, a noise feature that fuses noise intensity and noise spatial distribution), and an image with better denoising effect is obtained based on the weighted result and the image to be processed.

In an embodiment, if the image to be processed is an RGB image, the image to be processed may be converted from the RGB color space to the LAB color space firstly, and the converted L channel image is the brightness channel image of the image to be processed.

In an embodiment of the present disclosure, the noise intensity of the image to be processed may be obtained through a noise intensity network (also referred as noise feature estimation model), specifically, it may be obtained through a noise intensity estimation model. Similarly, the noise spatial feature of the image to be processed is determined according to the brightness channel image and noise intensity, which may also be obtained through a denoising network (also referred to as neural network model). The brightness channel image and noise intensity of the image to be processed are cascaded and input into the noise spatial feature model to obtain the noise spatial distribution (also referred to as the noise spatial feature distribution or obtain the noise processing weight feature).

Wherein, the noise feature estimation model (also referred to as noise intensity network) is a model corresponding to the device hardware environment. In other words, different device hardware environments may correspond to different noise feature estimation models. In practical applications, noise feature estimation models corresponding to various device hardware environments may be trained respectively. When image enhancement processing is required, corresponding models may be used to estimate noise feature information based on the device hardware environment corresponding to the image to be processed. For example, for smart phones, the corresponding noise estimation models may be pre-trained according to different mobile phone brands and mobile phone types. When the image enhancement is performed, the model corresponding to the brand and type of the mobile phone used to shoot the image to be processed may be selected to estimate the noise feature. It may be understood that if the hardware environments of different brands or types of mobile phones are the same or approximately the same, the mobile phones may also correspond to the same model.

The above-mentioned noise intensity estimation method provided in the embodiment of the present application is a method mainly based on the previous estimation of the noise intensity based on the deep learning method. This estimated information can provide prior information for the subsequent denoising process, thereby helping to remove image noise in line with the true distribution.

Wherein, the specific model architecture of the noise feature estimation model is not limited in the embodiments of the present application. For example, an estimation model based on a convolutional neural network may be used. When the noise feature information of the image to be processed is predicted through the model, the image to be processed may be directly input the estimation model, to obtain the noise feature information corresponding to the image. The estimation model may include a noise feature estimation module corresponding to each channel of the image. During image processing, the image of each channel of the image to be processed may be input to the estimation module corresponding to each channel to obtain the noise feature information corresponding to each channel. Specifically, for example, for an image to be processed in the RGB color mode, R, G, and B channels of the input image (i.e., the image to be processed) may be input into a convolutional neural network with the same or different network structures, the noise intensity maps of the three channels are output respectively, and the noise intensity maps corresponding to the three channels are concatenated to obtain the noise intensity map of the image to be processed. After that, the noise intensity map and the image to be processed may be input into a denoising model (a denoising network) to obtain the noise residual map of the image to be processed (also referred to as a noise map), that is, the noise feature.

In an embodiment of the present disclosure, the above-mentioned noise feature estimation model is trained in the following scheme: acquiring each training sample image, wherein the training sample image carries a label, which represents the labeled noise intensity of the training sample image, training the initial neural network model based on each training sample image until the loss function of the model converges, and using the model after training as the above-mentioned noise feature estimation model, wherein the input of the initial neural network model is the training sample image, and the output is the predicted noise intensity of the training sample image, the value of the loss function represents the difference between the predicted noise intensity and the labeled noise intensity of the training sample image.

Wherein, the above training sample images used to train the noise feature estimation model are obtained in the following scheme of acquiring the initial sample image and the reference image containing noise collected in the device hardware environment, based on the reference image, determining the reference noise intensity, concatenating the reference noise intensity and the initial sample image to obtain the training sample image, wherein the labeled noise intensity of the training sample image is the reference noise intensity.

It may be understood that the device hardware environment is a hardware environment corresponding (same or substantially same) to the device hardware environment of the image acquisition device used to acquire images to be processed, that is, belong to the same type of hardware environment as the image acquisition device.

Wherein, the specific method of acquiring the initial sample image is not limited in the embodiments of the present application. The initial sample image may be an image in a public data set or a generated sample image. For example, a Gaussian white noise data set may be generated, and each image in the data set is used as the initial sample image.

Wherein, the reference image may be one or more image (s). In an embodiment, the reference image may usually be multiple, and the multiple reference images may be images containing noises of different intensities. Based on each reference image, one or more reference noise intensity(s) may be obtained. When the reference noise intensity is fused with the initial sample image, a reference noise intensity may be randomly selected to fuse with the initial sample image, and the selected reference noise intensity is used as the labeled noise intensity of the training sample image.

In an embodiment of the present disclosure, determining reference noise feature information based on the reference image includes performing filtering processing on the reference image to obtain a filtered image, obtaining a noise image based on the reference image and the filtered image and determining at least one target image area from image areas based on the total variation of image areas in the noise image, and using the pixel information of the at least one target image area as the reference noise intensity.

It may be understood that the area size of the target image area is usually the same as the size of the initial sample image, so that the training sample image is obtained by fusing the pixel information of the target image area with the initial sample image. The specific fusion method is not limited in this embodiment of the application, such as, superimposing.

Wherein, when there are multiple selected target image areas, the pixel information of each target image area may be used as a reference noise intensity. When fusing the initial sample image and the reference noise intensity, a reference noise intensity may be selected randomly.

In order to use the noise feature estimation model to learn the estimation ability of the above noise intensity, it is necessary to use a true value of the noise intensity related to the hardware environment system (that is, the labeled noise intensity) to supervise and train the model. In the above solution provided in the embodiment of the present application, such true value data (that is, training sample image) may be obtained through a data degradation model, that is, data degradation processing is performed on the initial sample images to obtain training sample image.

The above-mentioned image denoising solution provided in the embodiments of the application provides a deep learning denoising method related to the hardware environment of the image acquisition device, which does not mean that the method is only applicable to a specific hardware environment, but mean that the method may be applied to any hardware environment. In practical applications, for different hardware environments, the correlation between the noise feature estimation model and the specific hardware environment may be established in advance. Once this correlation is established, a targeted high-quality denoising may be performed. In other words, the noise feature estimation model corresponding to the hardware environment to be applied may be trained in advance. When the image enhancement is performed on the image acquired in the hardware environment, the model corresponding to the hardware environment may be used to perform the noise intensity estimation.

In order to realize the deep learning-based noise estimation, it may mainly include two key points. One key point is to evaluate the noise intensity related to the hardware (which reflects the image noise distribution feature in the hardware environment) in advance, and the other key point is to establish the data degradation model related to the hardware environment system to obtain training sample images for training the model. In order to better explain the denoising solution provided in the embodiments of the present application, the following further describes in detail in conjunction with two specific examples.

In order to more simply and conveniently describe the neural network structure provided in each alternative example of the present application, some parameters that may be involved in each example are explained here. [conv k×k, c=C, s=S] may be used to represent a convolution layer in the network structure, where cony k×k represents the kernel size of the convolution layer (that is, the convolutional kernel) being k×k, the number of channels c is C, and the stride s is S. All convolution layers may be followed by the ReLU layer (an activation function layer) without batch normalization. As an example, it is assumed that a convolution layer is expressed as [conv 3×3, c=32, s=1], where the convolution kernel size of the convolution layer is 3×5, the number of output channels is 32, and the convolution stride is 1. If it is expressed as [conv 3×3, c=32, s=1]×n, it indicates cascading of n convolution layers.

Figure 3A:
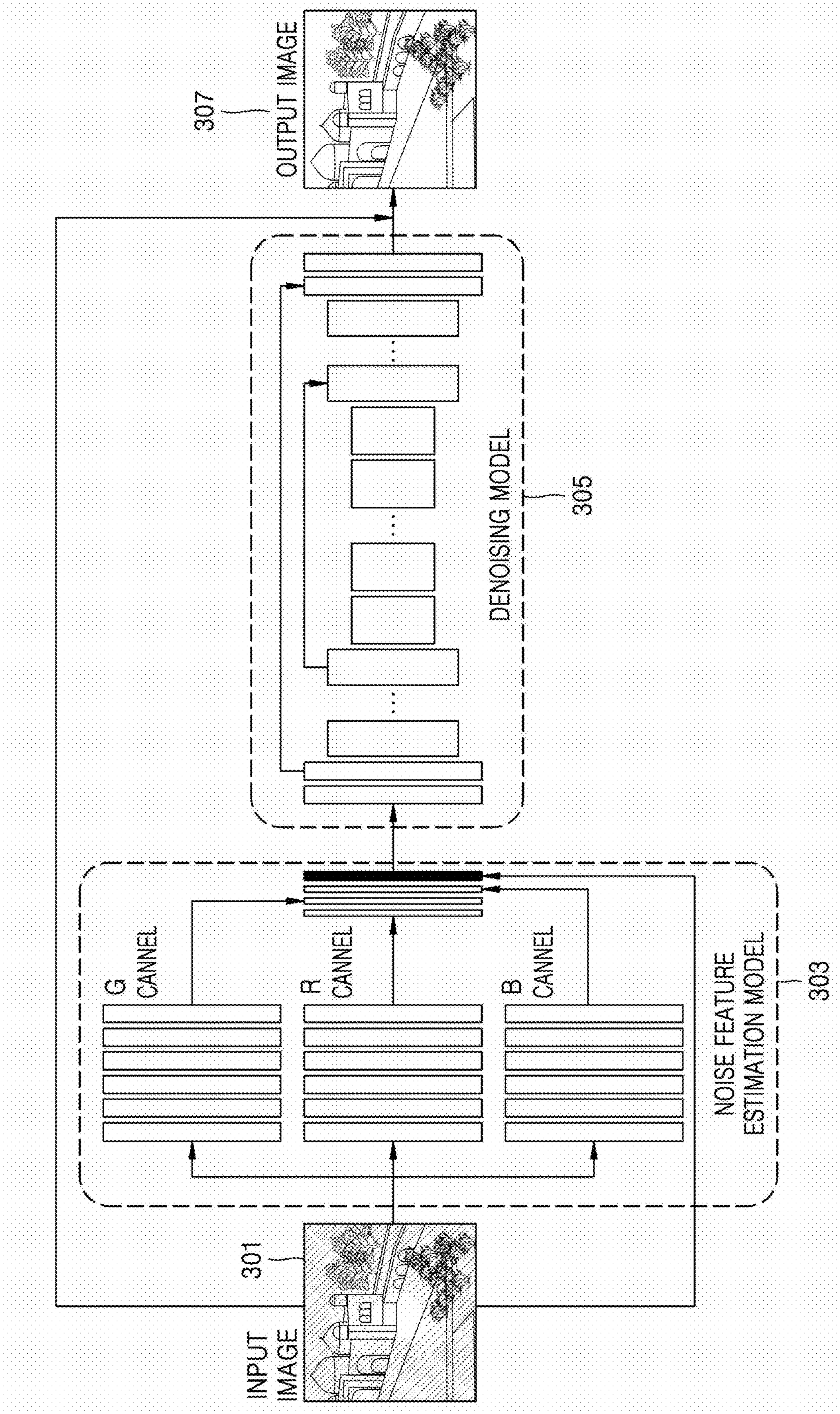
FIG. 3A shows a schematic diagram of the principle of image denoising through an image denoising model provided in an embodiment of the present application.

As an example, FIG. 3A shows a schematic structural diagram of an image denoising model provided in an embodiment of the present application. As shown in the figure, the image denoising model may include cascaded noise feature estimation model 303 (i.e., a noise intensity estimation model/network or a noise intensity network) and denoising model 305 (i.e., a denoising network). In this example, the noise feature estimation model includes network structures corresponding to the R, G, and B channels of the image (for example, convolutional neural networks) respectively. The input of the noise feature estimation model 303 is the image to be processed (i.e., the input image). Specifically, the R, G, and B channels of the input image 301 are input into the convolutional neural network with the same network structure (the network parameters corresponding to each channel are different, that is, the convolution processing parameters are different), and the noise intensity features of the three channels are output respectively. The noise intensity features of the three channels and the input image (301) are input into the denoising model 305. The denoising model 305 obtains the noise residual map based on the noise intensity of the input image 301 and the input image 301, and then obtains a denoised image, that is, an output image 307, based on the noise residual map and the input image 301. The specific network structure of the denoising model 305 is not limited in this embodiment of the application. The denoising model 305 may generally include an encoding network and a decoding network. The encoding network is used to encode input information of the model to obtain an encoding result, and the decoding network obtains an output result based on the encoding result, that is, the noise residual map.

It may be understood that in practical applications, for the example shown in FIG. 3A, the obtaining of the output image based on the noise residual map and the input image may be implemented inside the denoising model shown in the figure, or may be implemented outside the denoising model shown in the figure.

Figure 3B:
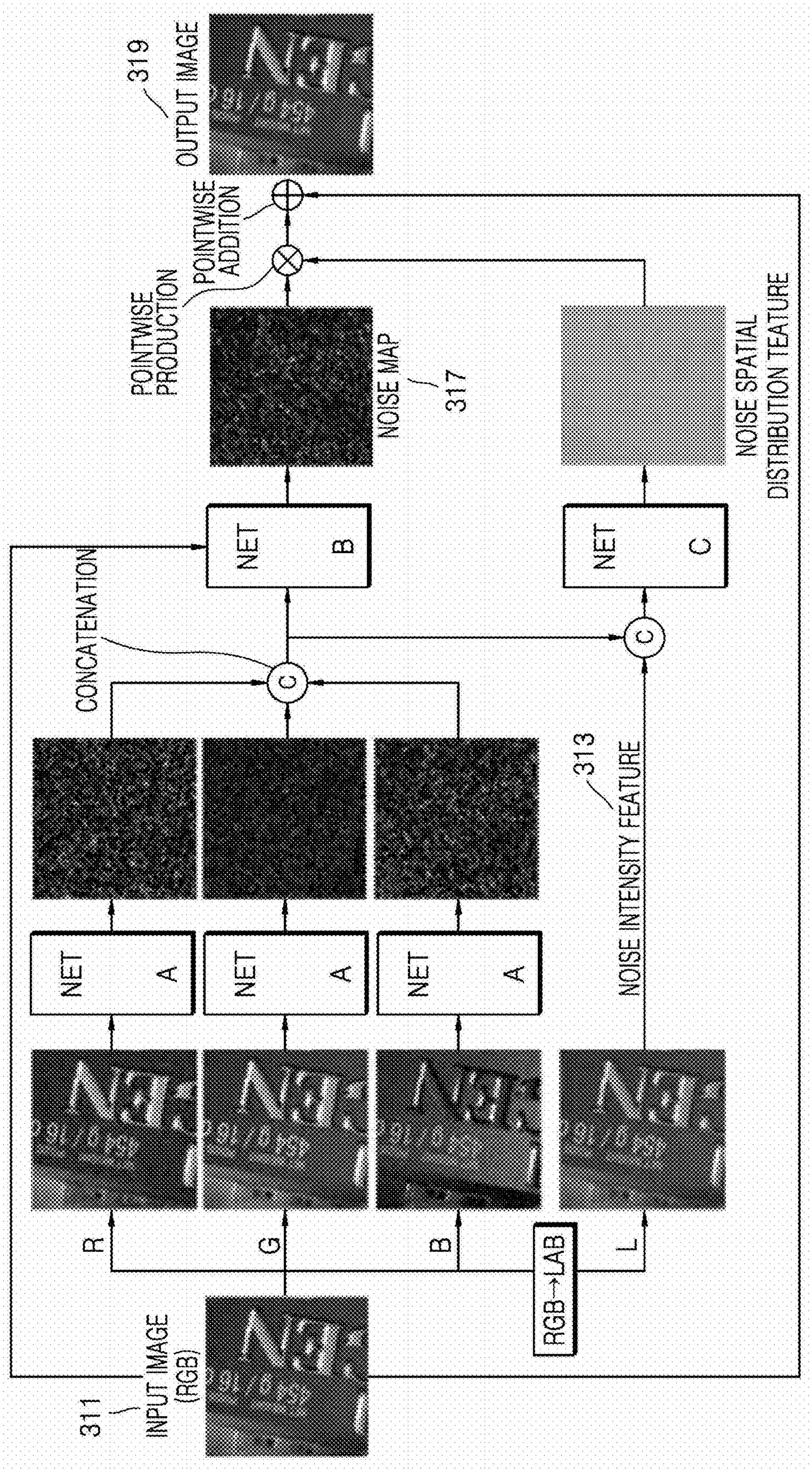
FIG. 3B shows a schematic flowchart of an image denoising processing method provided in an embodiment of the present application.

As an example, FIG. 3B shows a schematic flowchart of an image denoising method provided in an embodiment of the present application. As shown in FIG. 3B, in this example, the input image 311, that is, the image to be processed, is an RGB image, and the network A in FIG. 3B is a noise feature network. The three channels of R, G, and B have their own noise intensity network. The network B is a denoising model (i.e., denoising network), and the network C is a noise spatial distribution network. During denoising processing the image to be processed, the R, G, and B channel images are input into the network A corresponding to each channel to obtain the noise intensity 313 of the three channels, and then the noise intensity 313 of the three channels and the input image 311 are concatenated and input to network B to obtain a noise map 317.

In order to obtain the noise spatial distribution 315 of the input image 311, the RGB image may be converted into a LAB image (RGB LAB shown in the figure). The brightness channel image, that is, the L channel image, and the concatenated noise intensity 313 of the image are input to the network C, to obtain the noise spatial distribution map (the noise spatial feature 315 shown in the figure), and then a pointwise production operation is performed on the noise spatial feature map and the noise map 317 to obtain the weighted noise map. A pointwise addition operation is performed on the weighted noise map and the input image 311 to obtain a denoised image, that is, the output image 319.

Figure 3C:
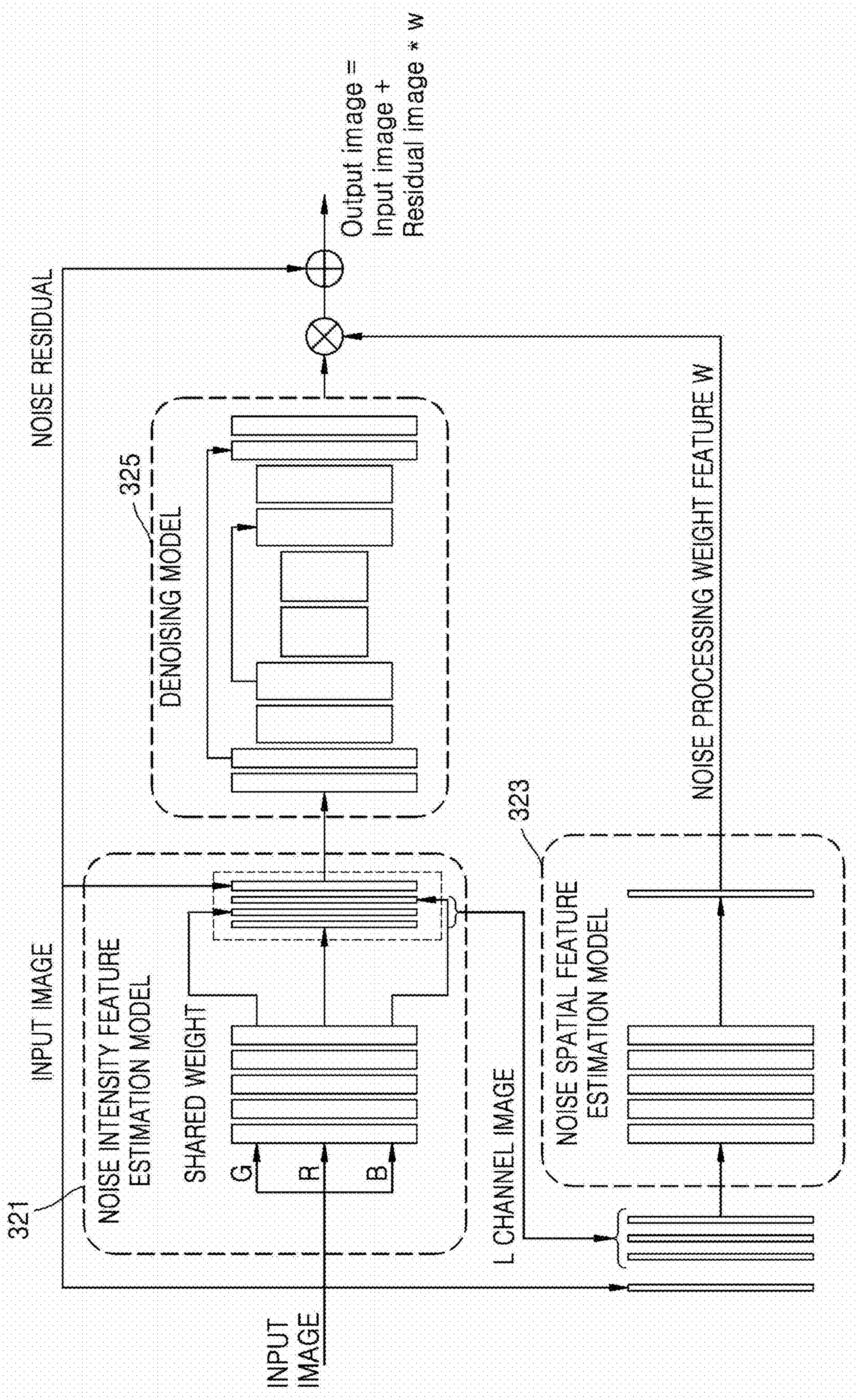
FIG. 3C shows a schematic diagram of the principle of image denoising through an image denoising model provided by another embodiment of the present application.

As another example, FIG. 3C shows a schematic structural diagram of an image denoising model provided in an embodiment of the present application. As shown in the figure, the image denoising model may include a noise intensity estimation model, a noise spatial estimation model, and a denoising model. The following describes each part of the image denoising model in this example.

Noise intensity estimation model 321 (i.e., noise intensity network): in order to reduce the complexity of the model and realize the lightweight of the model thereby better deploying the model on the mobile terminal, in this part, a same model composed of five convolution layers may be used to process R channel, G channel and B channel, that is, a same model structure may be used for the three channels to extract the noise intensity corresponding to each channel. The five convolution layers may be expressed as: [conv 3×3, c=32, s=1]×4; [conv 3×3, c=1, s=1]. Through these five convolution layers, the noise intensity extraction is performed on the channel images of R channel, G channel and B channel respectively, and the noise intensity map of each channel is obtained. Three independent results (i.e., three noise intensity maps) are concatenated as the output of the noise intensity estimation model.

Noise spatial feature estimation model 323 (also referred to as a noise spatial distribution estimation network or noise spatial feature network): the L channel of the input image (by converting RGB into LAB space) and the output of the noise intensity estimation model are cascaded as input of in this part. The result of cascading may also be processed by the five-layer convolution network: for example, [conv 3×3, c=32, s=1]×4 and [conv 3×3, c=1, s=1]. The final output is expressed as w, and w is the noise spatial distribution, that is, the noise processing weight feature.

In an embodiment both the network structures of the noise intensity estimation model and the noise spatial feature estimation model provided in the embodiment of the present application may be implemented using simple convolution networks, thereby realizing the lightweight of the model structure, and making the solutions of the embodiments of the present application better applicable to mobile terminal devices such as smart phones.

Denoising model 325 (also referred to as a noise removing model, or a denoising network): the output of the noise intensity estimation model is regarded as input of this part. The encoder part of the model may be composed of a series of interlaced convolution-pooling layers: [conv 3×3, c=16, s=1]×2; [maxpooling]; [conv3×3, c=32, s=1]×2; [maxpooling]; [conv 3×3, c=64, s=1]×3; [maxpooling]; [conv3×3, c=128, s=1]×6. Where, in the expressions of the above convolution-pooling layers, the description order of the convolution layers and the pooling layers (maxpooling) represents a cascading order between respective layers. Taking [conv3×3, c=16, s=1]×2; [maxpooling] as an example, it represents that a maximum pooling layer (or another pooling layer structure, such as average pooling) is cascaded between the two cascaded [conv3×3, c=16, s=1] convolution layers.

For the decoder part of the denoising model, the decoder part may be composed of the following sequential layers: [upsampling] (sampling rate of 2); [conv 3×3, c=64, s=1]×4; [upsampling] (sampling rate of 2); [conv3×3, c=32, s=1]×3; [upsampling] (sampling rate of 2); [conv3×3, c=16, s=1]×2; [conv3×3, c=3, s=1].

In addition, in order to accelerate model training, the model structure of this part may adopt a UNet-like, to fuse the output feature map of the encoder and the output feature map of the decoder at a same level, and use the fused feature map as decoding feature extraction of the next level (corresponding to the arrow shown in the figure).

Figure 3D:
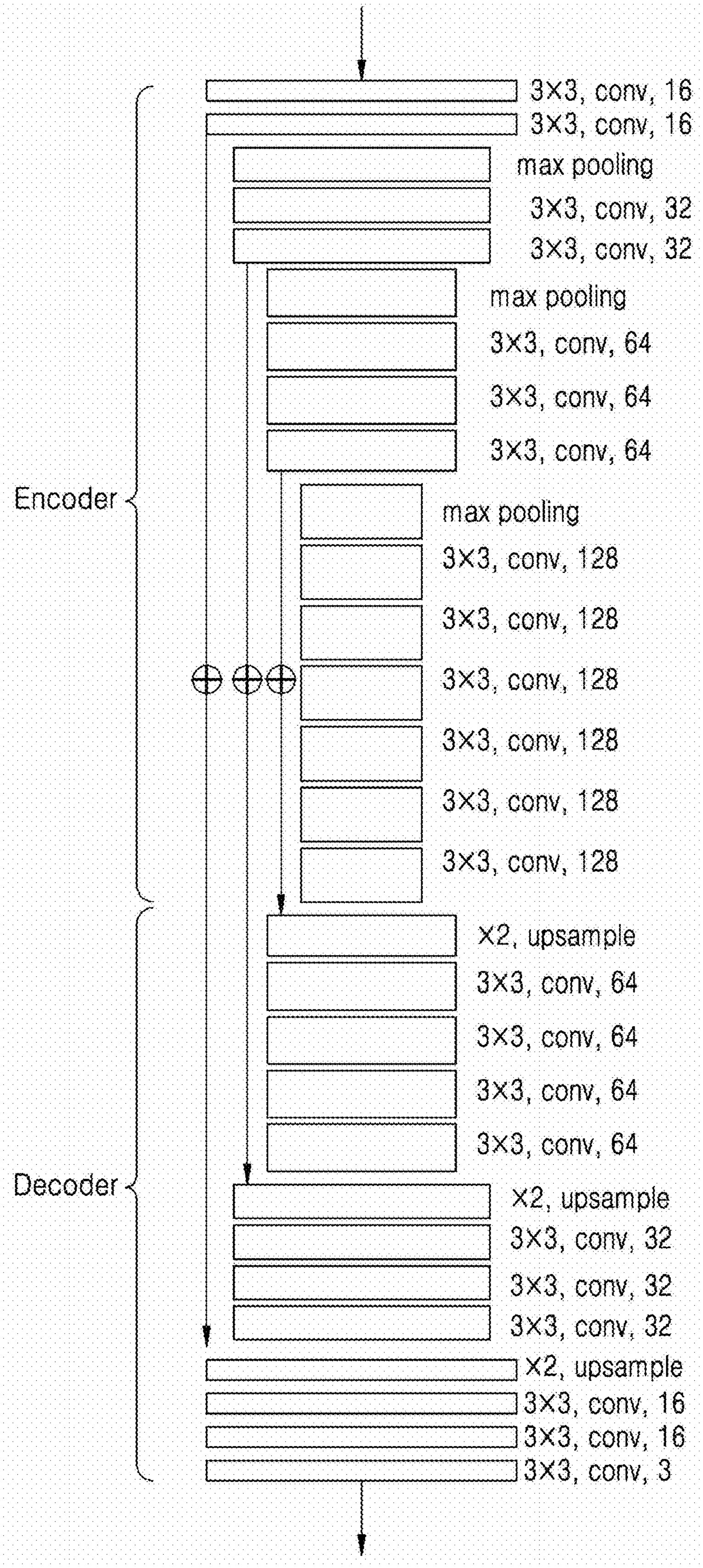
FIG. 3D shows a schematic structural diagram of a denoising model provided in an example of the present application.

As an alternative solution, FIG. 3D shows a schematic structural diagram of a denoising model provided in an embodiment of the present application. The network parameters shown in the figure are the parameters of each hidden layer of the model, which may refer to FIG. 3C. Taking 3×3, cony, 16 as an example, it represents a convolution layer with a convolution kernel size of 3×3 and a number of output channels of 16, and ×2 upsample represents an upsampling process with a sampling rate of 2. It can be seen from FIG. 3D that the network structure of the denoising model is similar to that of UNet, but the difference between them is that this network structure uses fewer channels and smaller convolution kernel in each convolution layer. In the feature fusion processing between the encoder and the decoder, the concatenation operation is replaced by the addition operation, as shown by the arrows with the plus sign in the figure, which indicates adding of the corresponding coding feature and the decoding feature. In the premise of concatenation of the shallow feature and deep feature, using of addition processing instead of concatenation processing may increase the efficiency of forward inference, that is, improving the data processing efficiency of the model. The output of the encoder is three noise maps corresponding to the three channels of RGB (the noise residual of the image shown in FIG. 3C).

The final output of the decoder is denoted as R. Therefore, the final image denoising result may be expressed as:

$$y=x+R*W$$

Wherein, x, y respectively represent the input image and output image, that is, the image to be processed and the denoised image, R and W are the noise residual of the image and noise processing weight feature (also referred to as a noise spatial distribution) respectively.

The alternative solutions for obtaining training sample images provided in the embodiments of the present application will be further described below in conjunction with examples.

In this example, the training sample image for training the noise feature estimation model may be obtained by establishing a data degradation model. The main purpose of establishing a data degradation model is to simulate the hardware-related noise data distribution. The specific data degradation processing is described as follows:

(1) Acquiring the image noise pattern (Pattern) in the specific hardware environment. The noise pattern, which may also be referred as a noise distribution feature, may be understood as the sampling of the noise distribution dependent on the hardware environment. The sampling has a certain typicality and universality. The determined hardware environment is a specific hardware environment where the image denoising processing is applied to the image. For example, if the image enhancement processing method is applied to the image captured by of a certain type of mobile phone, the specific hardware environment may be the hardware environment of phone of the type.

In a specific hardware environment, it is possible to obtain an image I (that is, a reference image) that include different levels of noise in this environment, and the image I may be subjected to a mean filtering processing, for example, the image I may be subjected to a mean convolution operation f with a fixed kernel size, where the kernel size of the convolution kernel may be configured according to actual needs, for example, the typical kernel size may be selected as 11×11, and the convolution result of image I is recorded as f(I) (that is, the filtered image). Based on the image I and f(I), a noise image P may be obtained. It is assumed that P=1−f(I)+128, that is, the pixel value of the pixel at the corresponding position on the noise image P is obtained by subtracting the pixel values of the pixels at the corresponding positions of the image I and the image f(I) and then adding 128.

After the noise image P is obtained, several image areas may be intercepted on P, and image areas of the intercepted several image areas whose total variation (also referred as whole variation) is less than a certain threshold t are used as target image areas (denoted as P'), where P may be used as a candidate noise Pattern. The total variation is defined as the integral of the gradient amplitude, which may be expressed as:

$$J(u)=\int_{D_n}\sqrt{u_x^2+u_y^2}\,dxdy$$

Wherein, P' satisfying the following equations:

$$tv(P')=\int_{P'}\sqrt{P_x'^2+P_y'^2}\,dxdy<t$$

$$P_x'=\partial P'/\partial x,\ P_y'=\partial P'/\partial y$$

Wherein, $u_x=\partial u/\partial x$, $u_y=\partial u/\partial y$, $D_u$ is a support domain of the image, which is the intercepted image area, u represents an image area (the image may be understood as a two-dimensional (the abscissa direction is the x direction and the coordinate direction is the y direction) function), $u_x$ represents the gradient of any pixel in $D_u$ in the x direction, $u_y$ represents the gradient of any pixel in $D_u$ in the y direction.

tv(P') represents the total variation of P', $P'_x$ represents the gradient of any pixel in the target image area in the x direction, and $P'_y$ represents the gradient of any pixel in the target image area in the y direction.

(2) Generating a Gaussian white noise data set or directly introducing a public data set. On the noise data set, the noise Pattern generated in step (1) may be randomly superimposed to obtain a training sample image data set. Specifically, as a solution, the training sample image may be obtained in the following equations:

$$I_{new\_noise}=n\cdot I_{noise}+I_{noise}$$

$$n=\delta\cdot P'/255$$

Where, n is a noise level, δ is an intensity of the superimposed noise, which is a random number in the specified range, $I_{noise}$ is an introduced noise data set, and $I_{new\_noise}$ is a degraded noise data set. Specifically, $I_{noise}$ may be understood as any image in the noise data set (that is, the initial sample image), and $I_{new\_noise}$ is the corresponding training sample image. Based on the pixel value of each pixel in P', through n=δ·P'/255, the noise level corresponding to each pixel may be calculated. The image size of P' and $I_{noise}$ are the same. Through multiplying the noise level of each pixel in P' and the pixel value of the pixel at the corresponding position in $I_{noise}$, and then adding to the pixel value of the pixel in $I_{noise}$, the pixel value of the pixel at the position in $I_{new\_noise}$ may be obtained.

In this example, for each training sample image $I_{new\_noise}$, the corresponding real noise intensity information is the real noise feature distribution (that is, the labeled noise intensity). Based on each training sample image, the initial neural network model may be trained so that the noise intensity of the training sample images output by the model are close to its real noise intensity, so that the noise feature estimation model is obtained.

For the image denoising processing, it may be specifically implemented through a pre-trained image denoising model. In an embodiment of the present application, for the training of the image denoising model, in order to obtain good training data, training data that approximates the actual noise distribution may be synthesized based on the above-mentioned noise distribution feature of different channels in the image. For a clean image that do not contain noise, the parameters of the Gaussian distribution of each channel (such as mean and variance, etc.) may be simulated to add noise to the clean image, so that an image containing noise distribution is obtained. The model training is performed based on the image containing noise and the corresponding clean image. Based on this method, the training process of the model may be more controllable and the model is easier to converge.

Specifically, the training data may include sample image pairs, each sample image pair includes a clean image that does not contain noise, and a noisy image obtained by performing noise processing on the clean image, where the noisy image is obtained by adding noise to the image of each channel of the clean image according to the noise distribution feature (also referred as a noise intensity) of each channel. For example, the clean image is an RGB image. For the R channel, the parameters of the Gaussian noise distribution of the channel may be fitted to synthesize the noisy image of the R channel.

When training the image denoising model based on training data, as an alternative, a training method based on multi-scale Gram loss may be used to better maintain the texture details of the image (texture details may be maintained at different scales). During training, the noisy image in the sample image pair is input into the image denoising model to obtain the denoised image (also referred to as the output image). The clean image and the output image may be cropped at different scales, to obtain cropped image pairs of multiple sizes (the cropped image of the clean image and the cropped image of the output image), and the cropped image of each size may be adjusted to the resolution of the original image, that is, resizing of the image to get an image with the original size (i.e., the size of the clean image and noisy image). The corresponding Gram loss is calculated for cropped image pair of each size. For a sample image pair, the corresponding Gram loss, that is, Loss, may be L1 loss, and may be expressed as follows:

$$\text{Loss} = \frac{1}{n}\sum_{i=1}^{n}\left|\text{Gram}_{real\_scale\_i} - \text{Gram}_{predict\_scale\_i}\right|$$

Where, n represents the number of images of different sizes obtained by cropping, i represents image pairs of the i-th size, real_scale_i represents the cropped image of the clean image of the i-th size, predict__scale_i represents the cropped image of the output image of the i-th size, and $|\text{Gram}_{real\_scale\_i}-\text{Gram}_{predict\_\_scale\_i}|$ represents the L1 loss between real_scale_i and predict__scale_i.

By adding loss of each sample image, the mixing loss corresponding to the model is obtained, and the model is iteratively trained based on the mixing loss and training data, so that the denoised image output by the model approaches a clean image.

Figure 3E:
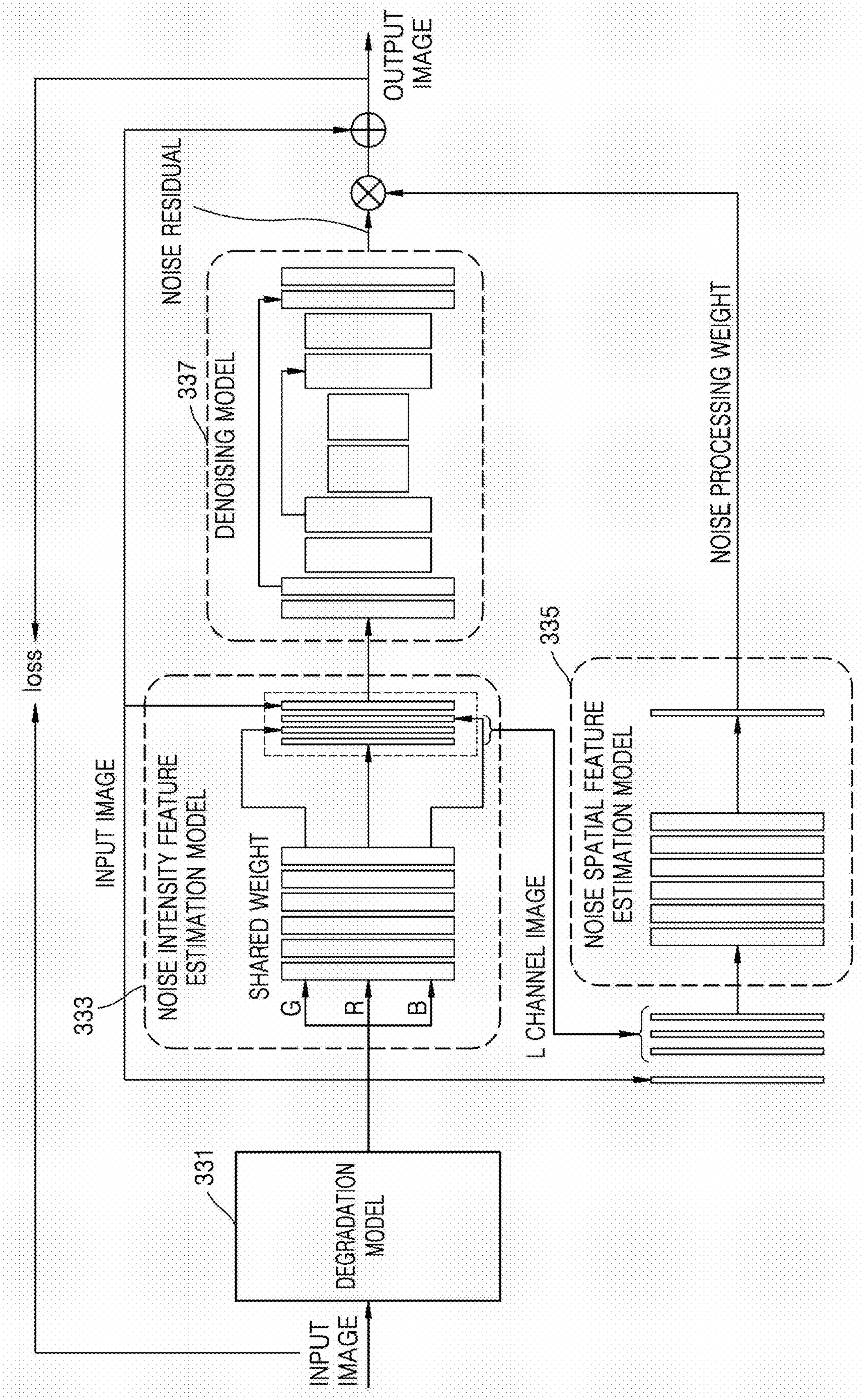
FIG. 3E shows a schematic diagram of the training principle of an image denoising model provided in an example of the present application.

As an example, FIG. 3E shows a schematic diagram of the training principle of an alternative image denoising model 337. As shown in the figure, during training, a clean image without noise is input, and the clean image is subjected to the above-mentioned image degradation process through a degraded model 331 (i.e., degradation model), to obtain a noisy image (i.e., training sample image). After the image is input to the image denoising model 337, the denoised output image is obtained. Based on the input image and output image, the training loss may be calculated (loss shown in the figure). In an embodiment, the training loss may be the multi-scale Gram loss. Based on the training loss, the image denoising model 337 is iteratively trained to optimize the model parameters, until the training loss converges and the trained image denoising model 337 is obtained. It may be understood that the method of obtaining the noisy image may include, but not limited to, the method which uses a degradation model 331 processing method, and may also be a method of adding noise to the clean image according to the noise distribution feature (also referred as a noise intensity) of each channel of the image (such as Gaussian distribution parameters).

As an example, the loss function during training the denoising model 337 may be L2 loss, that is, the value of the loss function=minimize $(\text{groundtruth}-\text{output})^2$. Where, minimize refers to minimization, ground truth refers to the clean image without noise in the training sample images, output refers to the result image obtained after an image containing noise in the training sample images goes through the denoising model 337, that is, the denoised image, and $(\text{groundtruth}-\text{output})^2$ is the L2 loss between the clean image among the sample images and the denoised image.

The image denoising method provided in the embodiments of the application can predict the corresponding noise intensity of each channel by using the noise intensity estimation model 333 according to the different feature of each of the plurality of channel images in the image, so that the denoising model 337 may predict the noise residual corresponding to each channel according to noise intensity corresponding to each channel. In addition, considering the difference in image noise spatial distribution (the brighter pixels in the image (such as the pixels near the light source in the image) and the darker pixels in the image have different noise distributions), the noise spatial distribution of the image is predicted through the noise spatial feature estimation model 335, and the noise residual of each channel is weighted by using the noise spatial distribution to obtain a noise residual that is more in line with the actual noise distribution, which is based on the weighted residual, so that an output image with significantly improved denoising effect is obtained.

Figure 3F:
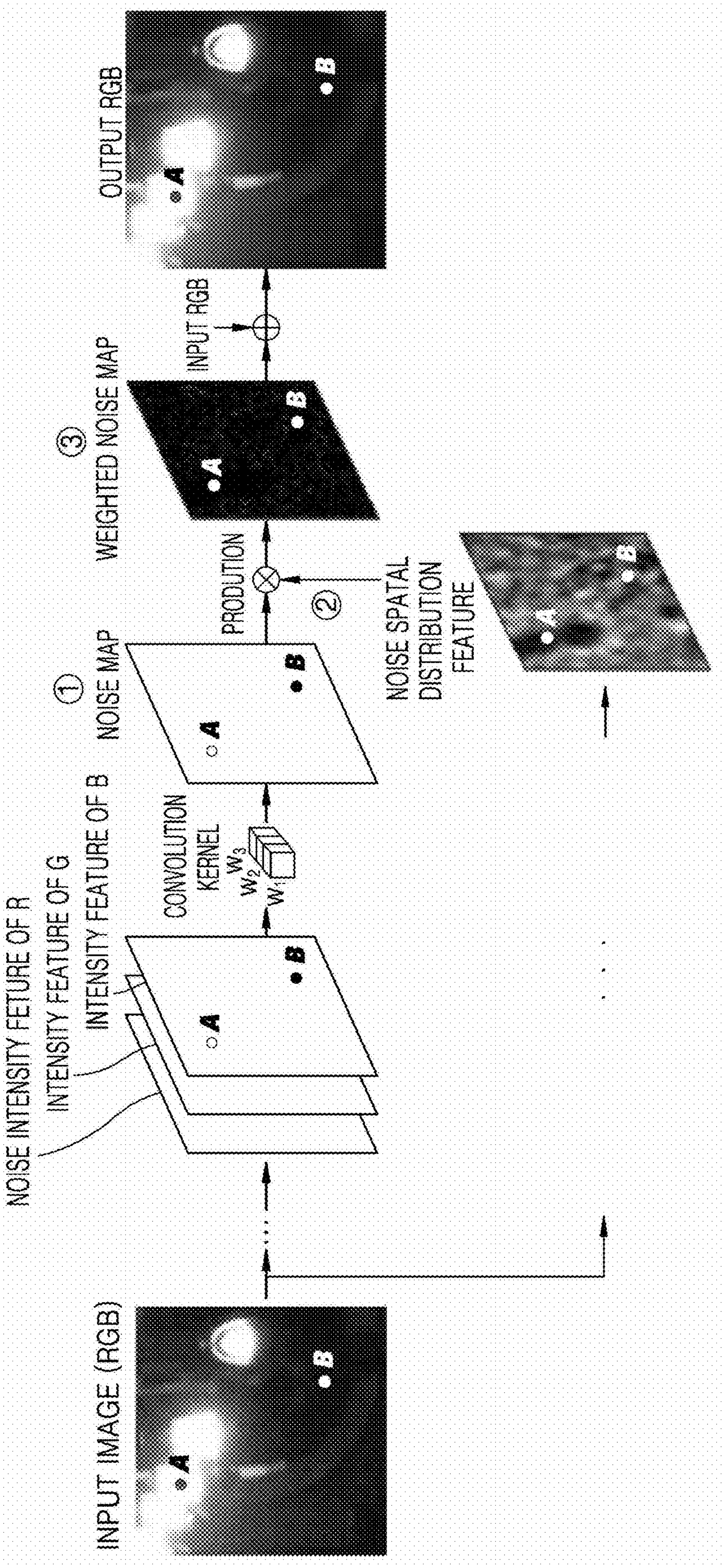
FIG. 3F shows a schematic illustration of an image denoising processing method provided in an example of present application.

As an example, FIG. 3F shows schematic illustration of an image denoising processing method. It is assumed that the image to be processed is an image taken at night, and there is a bright light or light source in the image, point A is a point near the light source in the image, and point B is a weak point in the input image. Based on the solution provided in the embodiment of the present application, in the predicted noise residual map (i.e., noise map), the noise value of the point A is a small value, and the noise value of the point B is a large value. In the noise spatial distribution map, the noise spatial feature value of the point A has a small value, approaching 0, and the noise spatial feature value of the point B has a large value, approaching 1, after the noise map is weighted by the noise spatial feature map, the weighted value corresponding to point A is very small, indicating that the noise corresponding to point A is weak, while the weighted value corresponding to point B is relatively large, indicating that noise corresponding to point B is strong. Therefore, the solution of the embodiment of the present application may achieve targeted denoising processing for different parts of the image, and achieve a good denoising effect. The weighted value corresponding to point A and B may be a weighted noise map (also referred as a weighted noise residual).

Weighted value corresponding to point A and B are denoted as $WSR_A$ and $WSR_B$. Therefore, the weighted value corresponding to point A and B may be expressed as:

$$WSR_A=(W_1*IR_A+W_2*IG_A+W_3*IB_A)*S_A$$

$$WSR_B=(W_1*IR_B+W_2*IG_B+W_3*IB_B)*S_B$$

Wherein, $IR_A$ to $IB_B$ respectively represent noise intensity of each channel at the point A. Similarly, $IR_B$ to $IB_B$ respectively represent noise intensity of each channel at the point B. And, $S_A$, $S_B$, $W_1$, $W_2$ and $W_3$ are the noise spatial distribution of the point A, noise spatial distribution of the point B and weight corresponding to each R, G and B channel.

Figure 3G:
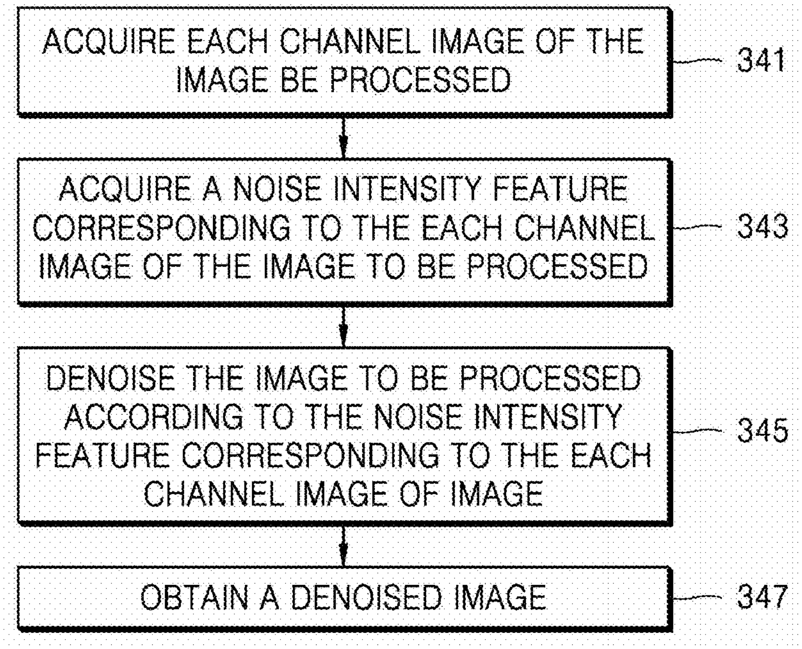
FIG. 3G shows a schematic flowchart of an image denoising provided in an embodiment of the present application.

As an example, FIG. 3G shows a schematic flowchart of an image denoising provided in an embodiment of the present application.

The image denoising may be executed by any type of electronic device, for example, a mobile terminal of a user, such as a smart phone. Based on this method, the user may perform real-time enhancement processing on photos taken by a smart phone, and may also process photos stored in the smart phone, to obtain higher quality photos. As shown in FIG. 2, the image denoising provided in the embodiment of the present application may include the following steps:

At step 341, an electronic device acquires each of the plurality of channel images to be processed, At step 343, the electronic device acquires a noise intensity corresponding to the each of the plurality of channel images of the image to be processed, At step 345, electronic device denoises the image to be processed according to the noise intensity corresponding to the each of the plurality of channel images of the image, and At step 347, electronic device obtains the denoised image.

In an embodiment of the present disclosure, the at least one of image quality enhancement schemes includes image brightness adjustment (also referred as an adjusting brightness of the image), and the performing quality enhancement on the image to be processed using at least one of image quality enhancement schemes includes determining a brightness enhancement parameter of the image to be processed, and performing image brightness adjustment on the image to be processed based on the brightness enhancement parameter.

It may be understood that for different color space modes, the name of the brightness channel of the image may also be different. For example, for the YUV mode, the brightness channel of the image is the Y channel, and for the LAB mode, the brightness channel of the image is the L channel. Of course, different modes may also be switched between them.

For an image, improving of the tone (including brightness and/or color) of the image, especially for the dark areas of the image, can most directly improve the user's photographing experience, since the visual impact brought by brightness and/or color is greater than the texture details. Therefore, the adjustment of the image tone is also one of the commonly used schemes to improve the image quality, which is very important for image enhancement.

The related image tone adjustment methods mainly tend to provide a global color enhancement effect, which may make the image more informative, but also introduces the effects of oversaturation and overexposure at the same time. In order to alleviate these problems, the solution provided in an embodiment of the present application conducts a more in-depth study on the color details and brightness details of the image, and proposes a two-branch network that is able to respond to brightness enhancement and color enhancement respectively. That is to say, in an embodiment of the present application, when adjusting the image tone, the image brightness adjustment and image color adjustment are treated as two separate processing methods, that is, the brightness adjustment and color adjustment are separated into two independent tasks, rather than a task. By separating the image brightness adjustment and image color adjustment, a better processing effect may be achieved for the reasons below: when the brightness adjustment and color adjustment are not processed respectively, it is a complicated composite task, and when processing the brightness information or color information respectively, only a single task may be considered, which simplifies the task. By separating brightness information and color information, the processing results may be more natural when adjusting color, and the problem of excessive brightness enhancement may be reduced to a certain extent when adjusting the brightness. Furthermore, by separating the brightness adjustment and color adjustment and treating each of them as one task, the processing method of each task may be adjusted respectively according to the feature of the task and actual needs to achieve a better processing effect.

In practical applications, for different images to be processed, the brightness information of different images is likely to be different. If the same brightness adjustment processing method is used for all images, there may be a problem of excessive brightness enhancement for some images. In addition, it will not only waste resources and time, but may also degrade the image quality, if some images, which not need to be brightened, are still brightened. In order to solve this problem, the brightness adjustment solution provided in the embodiment of the present application introduces the brightness enhancement parameter, which is an enhancement intensity control parameter. This parameter is used for the user to control the brightness adjustment processing. For images to be processed with different brightness information, they may correspond to different brightness enhancement parameters, so as to achieve the purpose of different degrees of brightness adjustment for different images, better meet actual needs and improve image processing effect.

The specific value form of the brightness enhancement parameter is not limited in this embodiment of the application. In an embodiment, the parameter may be a value within a set range, such as an integer not less than 1. The greater the value of the parameter, the greater the intensity of brightness enhancement. When the parameter value is 1, it may not necessary to enhance the brightness.

In an embodiment of the present disclosure, An image processing method for enhancing quality for the image comprises: acquiring a brightness channel image of the image to be processed, determining a brightness enhancement parameter of the image to be processed, performing image brightness adjustment on the image to be processed based on the brightness enhancement parameter, and obtaining the brightness-adjusted image.

In an embodiment of the present disclosure, the determining a brightness enhancement parameter of the image to be processed includes at least one of acquiring brightness information of an image to be processed and determining a brightness enhancement parameter based on the brightness information, and acquiring brightness adjustment instruction information input by a user, and determining a brightness enhancement parameter based on the instruction information.

In an embodiment, the brightness enhancement parameter determined based on the instruction information, may be the brightness enhancement parameter of each pixel of the image to be processed.

In an embodiment, the determining of the brightness enhancement parameter of the image to be processed comprises acquiring brightness adjustment instruction information input by a user, and determining the brightness enhancement parameter of each pixel of the image to be processed based on the brightness adjustment instruction information input by the user.

In an embodiment, the determining of the brightness enhancement parameter of the image to be processed comprises acquiring global brightness information of the image to be processed and local brightness information of the image to be processed based on the brightness channel image. The determining of the brightness enhancement parameter of the image to be processed further comprises the determining of the brightness enhancement parameter of each pixel of the image to be processed based on the global brightness information and the local brightness information.

That is to say, the brightness enhancement parameter may be determined based on the brightness information of the image to be processed, or may be determined based on the user's instruction information. For example, the user may input the brightness adjustment instruction information according to his/her own needs, and the final brightness enhancement parameter may be a parameter value corresponding to the instruction information.

In an embodiment, a mapping correlation between the brightness information and the brightness enhancement parameter may be configured. For an image to be processed, the corresponding brightness enhancement parameter may be determined based on the brightness information of the image and the mapping correlation. When determining the brightness parameter based on the user's instruction information, a corresponding determination strategy may be configured according to different needs. For example, the range of the brightness enhancement parameter may be provided to the user, and the user may directly determine a value in the range to be the brightness enhancement parameter of the image to be processed, that is, the instruction information may directly be the value of the parameter.

In practical applications, if the user inputs instruction information, the brightness enhancement parameter may be determined based on the user instruction information, or the brightness enhancement parameter may be determined based on the user instruction information and the brightness information of the image to be processed, if the user does not give an instruction, the device may determine the brightness enhancement parameter by itself according to the brightness information of the image to be processed.

In addition, it should be noted that for an image to be processed, one image may correspond to one value of brightness enhancement parameter, each pixel in the image may be correspond to one value of brightness enhancement parameter, or one area may correspond to one value of brightness enhancement parameter after dividing the image into areas. In other words, the brightness enhancement parameter may be one value or multiple values. For example, a brightness enhancement parameter of the image to be processed may be determined according to the average brightness information of the image to be processed, or the value of the brightness enhancement parameter of each pixel may be determined according to the brightness value of the pixel.

As an alternative method of the present disclosure, according to the image to be processed, a brightness adjustment intensity prediction network may be used to predict a brightness enhancement parameter map of the image to be processed, in which an element value of each element in the brightness parameter map is the brightness enhancement parameter of corresponding pixel in the image to be processed.

In other words, a neural network model may be used to predict the brightness enhancement parameter of each pixel in the image to be processed, so as to achieve more detailed brightness adjustment processing on the image.

In an embodiment, the determining a brightness enhancement parameter of the image to be processed may include acquiring a brightness channel image of the image to be processed, acquiring global brightness information of the image to be processed and local brightness information of the image to be processed based on the brightness channel image, and determining a brightness enhancement parameter of each pixel of the image to be processed, based on the global brightness information and the local brightness information.

In an embodiment, the acquiring of the local brightness information of the image to be processed based on the brightness channel image comprises estimating a semantical related-local brightness information using a local brightness estimation network, based on the brightness channel image.

*184 In an embodiment, a structure of the local brightness estimation network is a UNet-like structure.

In an embodiment, the acquiring of the global brightness information of the image to be processed comprises acquiring the global brightness information of the image to be processed through a global brightness statistic and predefined functions.

In an embodiment, the performing image brightness adjustment on the image to be processed based on the brightness enhancement parameter includes performing image brightness adjustment on the image to be processed, using a brightness enhancement network according to the brightness enhancement parameter and the brightness channel image of the image to be processed.

The alternative solution provided by the present disclosure considers the global brightness information and local brightness information of the image. The global brightness information may guide whether to enhance the brightness of the image wholly, and the intensity to be enhanced, that is, the brightness adjustment is considered in a coarser granularity (the entire image). The local brightness information considers the local brightness information of each area and even each pixel in the image in detail, and the brightness adjustment in each area, each pixel of the image is guided in a finer granularity.

Wherein, the above-mentioned global brightness information may be a global brightness statistic of the image to be processed, such as a global brightness mean, which is an average of the brightness values of all pixels in the image, or may be a brightness value after further processing of the brightness mean, such as a value after processing the brightness mean through a predefined function. Wherein the specific processing method may be selected according to experimental results or experience, so that the image with enhanced brightness is more in line with the actual perception of human.

In an embodiment, the determining of the brightness enhancement parameter of each pixel of the image to be processed, based on the global brightness information and the local brightness information comprises determining the brightness enhancement parameter of each pixel of the image to be processed based on pointwise production of the global brightness information and local brightness information.

For the local brightness information of the image to be processed, it may be the brightness value of each pixel in the image to be processed. As another alternative, considering the semantic relevance between pixels in the image (such as whether the pixels are pixels of the same object, or whether the pixels have other semantic relevance), a neural network (i.e., a local brightness estimation network) may be used to obtain the local brightness information of the image to be processed. For example, the brightness channel image of the image to be processed is input to an encoder part of the neural network, an encoding feature of the image is extracted by the encoder part, and then the encoding feature is decoded by a decoder part of the neural network, to obtain a feature map with the same size as the image to be processed. The element value of each element point in the feature map is the local brightness information of the pixel at the corresponding position of the image to be processed. In an embodiment, the global brightness information and local brightness information may be fused, such as pointwise production of the global brightness information and local brightness information to obtain a brightness enhancement parameter map (that is, brightness enhancement parameter of each pixel). After that, the brightness enhancement processing is performed on the brightness channel image based on the brightness enhancement parameter map, for example, the brightness enhancement parameter map and the brightness channel image are input to the brightness enhancement network, and the network performs enhancement processing on the brightness channel image based on the brightness enhancement parameter map, to obtain an image with enhanced brightness.

Based on this alternative solution, the global brightness information may control the overall brightness adjustment through statistics and predefined functions, and the local brightness information may control the local adjustment. According to the global brightness information and the local brightness information, the brightness adjustment may be better controlled to avoid the problem of overexposure.

In an embodiment of the present disclosure, the at least one of image quality enhancement schemes includes image color adjustment, and the performing quality enhancement on the image to be processed using at least one of image quality enhancement schemes includes acquiring color channel image of the image to be processed, reducing resolution of the color channel image and adjusting the color of the color channel image after reducing the resolution.

In practical applications, considering that the human eye is less sensitive to color details, in order to reduce the resource consumption of the device and improve the efficiency of image processing, when adjusting the color of the image, the resolution of the image may be reduced firstly, the color adjustment process is performed on the image with reduced resolution, and then the resolution of the processed image is increased to the resolution before the reduction.

It may be understood that when adjusting the brightness and color of the image to be processed, a brightness component (an image of the brightness channel (Y channel)) and a color component (an image of the color channel (UV channel)) of the image to be processed may be separated firstly, the brightness adjustment on the brightness component and color adjustment processing on the color component are performed, after the processing is completed, the images of two parts are fused to obtain the image processed in brightness and color.

It is clear to those skilled in the art that the realization of brightness adjustment and/or color adjustment may be directly realized by using a neural network model. Specifically, a brightness adjustment model may be used to achieve brightness adjustment, and a color adjustment model may be used to achieve color adjustment.

In order to better explain the solution and effect of the brightness adjustment and color adjustment provided in the embodiment of the present application, alternative solutions are further explained in conjunction with examples below.

In an embodiment, the performing of image brightness adjustment on the image to be processed based on the brightness enhancement parameter comprises performing the image brightness adjustment on the image to be processed, using a brightness enhancement network according to the brightness enhancement parameter and the brightness channel image of the image to be processed.

In an embodiment, the obtaining of the brightness-adjusted image comprises acquiring at least one of non-brightness channel image of the image to be processed, obtaining a brightness-adjusted bright channel image according to the brightness enhancement parameter and the brightness channel image of the image to be processed, and obtaining the brightness-adjusted bright channel image based on the at least one of non-brightness channel image and the bright-adjusted bright channel image.

Figure 4A:
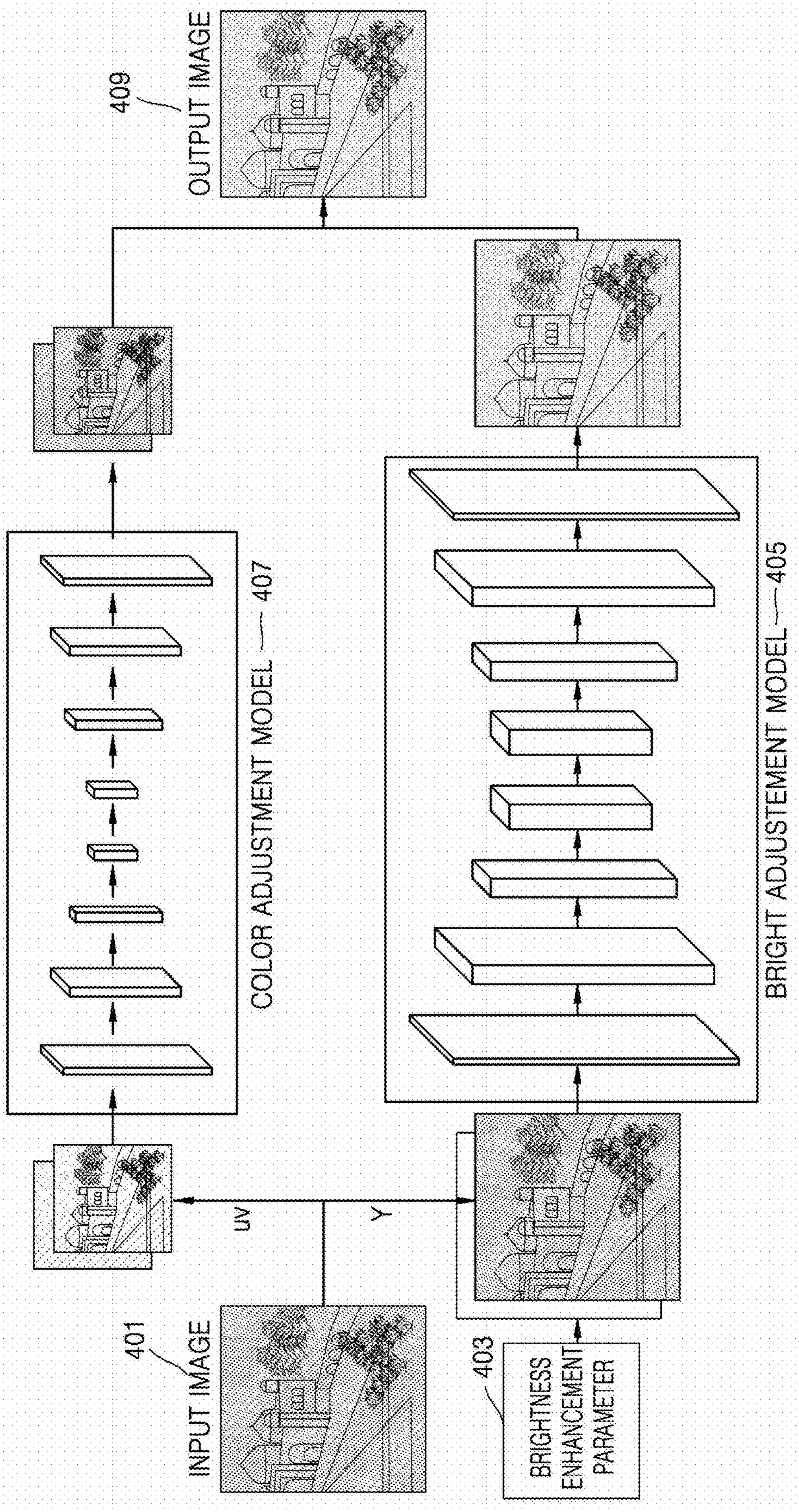
FIG. 4A shows a schematic diagram of the principle of image tone adjustment through an image tone enhancement model provided in an embodiment of the present application.

As an example, FIG. 4A shows a schematic diagram of the principle of image tone (including brightness information and color information) adjustment processing provided in an embodiment of the present application. The image tone enhancement processing in this example may be implemented using an image tone adjustment model. As shown in FIG. 4A, the image tone adjustment model includes two branches, that is, a brightness adjustment branch (namely, a brightness enhancement network) and a color adjustment branch, which also be referred to as a brightness adjustment model and a color adjustment model. The specific model architectures of the brightness adjustment model and the color adjustment model are not limited in this embodiment of the application.

In an embodiment, the above two branches adopt the same or different encoder-decoder structures, and the inputs for them are the UV (i.e., color information) channel and the Y (i.e., brightness information) channel respectively. Specifically, for an image to be processed (that is, an input image 401), the UV channel image may be input to the color adjustment model to obtain the image processed in color, and the Y channel image may be input to the brightness adjustment model to obtain the image processed in brightness, and then the processed images of the two branches are fused to obtain an output image. It can be seen that from the above-mentioned description, separating of the brightness component and the color component has the following advantages:

1. A complex task of brightness adjustment and color adjustment is split into two single tasks, which simplifies the task, and makes the color of the processing result more natural while maintaining contrast and saturation, and reduces excessive brightness enhancement to a certain extent.

2. The dual-branch strategy allows the sub-modules to be adjusted respectively according to task characteristics and actual needs, that is, the brightness adjustment model and the color adjustment model may be adjusted respectively according to the characteristics.

For example, the brightness branch additionally has a parameter to adjust the intensity of the enhancement, namely the brightness enhancement parameter 403. For the actual needs and characteristics of the brightness enhancement processing, when training the brightness adjustment model, a dark-bright image pair (that is, an image pair composed of a dark image and a bright image) and a bright-bright image pair are simultaneously used as samples for training, resulting in effectively reducing the problem of excessive enhancement of bright areas. It should be noted that the image contents of the two images contained in the above image pair are the same, but the difference lies in the brightness of the images. When training the model, for the dark-bright image pair, the image with lower brightness is input in the model, the model outputs an image with enhanced brightness, and the training loss corresponding to the image pair is calculated by the difference between the output image 409 and the image with higher brightness. The color branch considers that the human eye is less sensitive to color details, so the UV channel may be processed after reducing its resolution, to increase the speed and reduce the memory consumption.

For the dual-branch strategy, when training the model, different data sets may be used to train the brightness adjustment model 405 and the color adjustment model 407 respectively, to reduce training costs and improve training efficiency. For example, low-light image data sets (such as SID (See-in-the-Dark) data set) includes many light-dark image pairs, but have insufficient color saturation often, therefore the data sets may be used to train the brightness branch respectively. There are many image enhancement data sets including high definition images with strong color saturation collected during the day, but lacking of night images, the data sets may be used to train the color branch respectively.

An enhancement intensity control parameter, namely the brightness enhancement parameter 403, introduced to the brightness adjustment branch, has the following two functions including first, the model may adaptively control the brightness enhancement intensity according to the scene brightness of the input image 401, that is, determines the value of the parameter according to the brightness information of the image to be processed, and second, the parameter may be manually adjusted to meet the user's specific needs for brightness, that is, the value of the parameter is determined according to the instruction information input by the user.

In order to achieve the purpose of variable brightness enhancement parameter 403, the following mechanisms may be adopted when the brightness adjustment model is trained and the image to be processed is processed through the model *209 During training, the average brightness ratio of bright images and dark images (that is, the images with high brightness and images with low brightness contained in the above-mentioned dark-bright image pair) may be used as the value of this parameter (the value of the parameter corresponding to the image pair may also be set by user), which enables the network model to make different enhancement responses to the sizes of the parameters, but there may still be excessive brightness enhancement. For this reason, the bright-bright image pair may also be introduced into training. At this time, the value of the parameter corresponding to the bright-bright image pair may be set to 1. This strategy adds an explicit constraint to the network model, that is, when the value of the parameter is 1, the model should not enhance the brightness.

In inferring, that is, when the trained model is used to process the image to be processed, in conjunction with the training mechanism, a segmentation function of the average brightness of the input image 401 may be designed to determine the value of the enhancement parameter of the current image (i.e., the image to be processed). That is to say, a mapping correlation between brightness and parameter value may be configured. Different brightness values or different brightness ranges may correspond to different parameter values. For an image to be processed, a current value of the brightness enhancement parameter 403 during image processing may be determined based on the average brightness of the image and the mapping correlation.

As another example, FIG. **4*b*** shows a schematic diagram of the result and working principle of an image tone adjustment model provided in an embodiment of the present application. As shown in the figure, the image tone adjustment model includes a brightness adjustment branch (a brightness branch shown in the image) and the color adjustment branch (a color branch shown in the figure). The brightness branch is designed to make the image brighter, while the color branch is dedicated to adjust color saturation. As shown in the figure, in an embodiment, the input part of the brightness adjustment branch includes not only the brightness channel image (i.e., Y channel image), but also a guidance map sub-network shown in the figure. The input of the guidance map sub-network is the brightness channel image and the output is a brightness enhancement parameter feature map of the image. The specific network structures of the brightness adjustment branch and the color adjustment branch are not limited in the embodiment of the present application. For example, the two branch structures may both adopt a UNet-like structure (see the above description).

In order to achieve a good trade-off between speed and accuracy, as an alternative solution, each network structure part in the example of the present application may adopt the network structure described below. Each part of the image tone adjustment model will be described respectively below.

Color branch (UV channel) 411: The model of this branch may include an encoder and a decoder. In an embodiment, the encoder for feature extraction may be composed of six convolution layers: [conv 3×3, c=4, s=2]×4; [conv 3×3, c=8, s=1]×2. Therefore, the encoder generates a feature of output stride 16. The decoder adopts a UNet-like structure, which may consist of three up-sampling convolution layers [conv 3×3, c=12, s=1]×3 and one pointwise convolution layer [conv 1×1, c=2, s=1]. It should be noted that each up-sampling convolution layer in the decoder is followed by an up-sampling operation. Then, the up-sampled output, which is concatenated with the encoder feature map of the same spatial size (that is, the feature map size), forms the input of the next decoding layer. The final output of the encoder is an image adjusted in color.

Guidance map sub-network 413: it may have two branches of brightness local semantic and global brightness prior, to adaptively obtain pixel-by-pixel brightness control parameter, that is, brightness enhancement parameter.

Brightness branch (Y channel) 415: The brightness branch has the same network structure as the color branch, except the first convolution layer, where the color branch uses [conv 3×3, c=4, s=2], and the brightness branch uses [conv 3×3, c=4, s=1], in which the stride being 1 may achieve more finer image brightness feature extraction. The input of this branch includes the output of the guidance map sub-network and the Y channel image, and the output is the image after brightness enhancement processing.

Then, the output images of the brightness branch and the color branch are concatenated to obtain a tone-adjusted image.

Figure 4B:
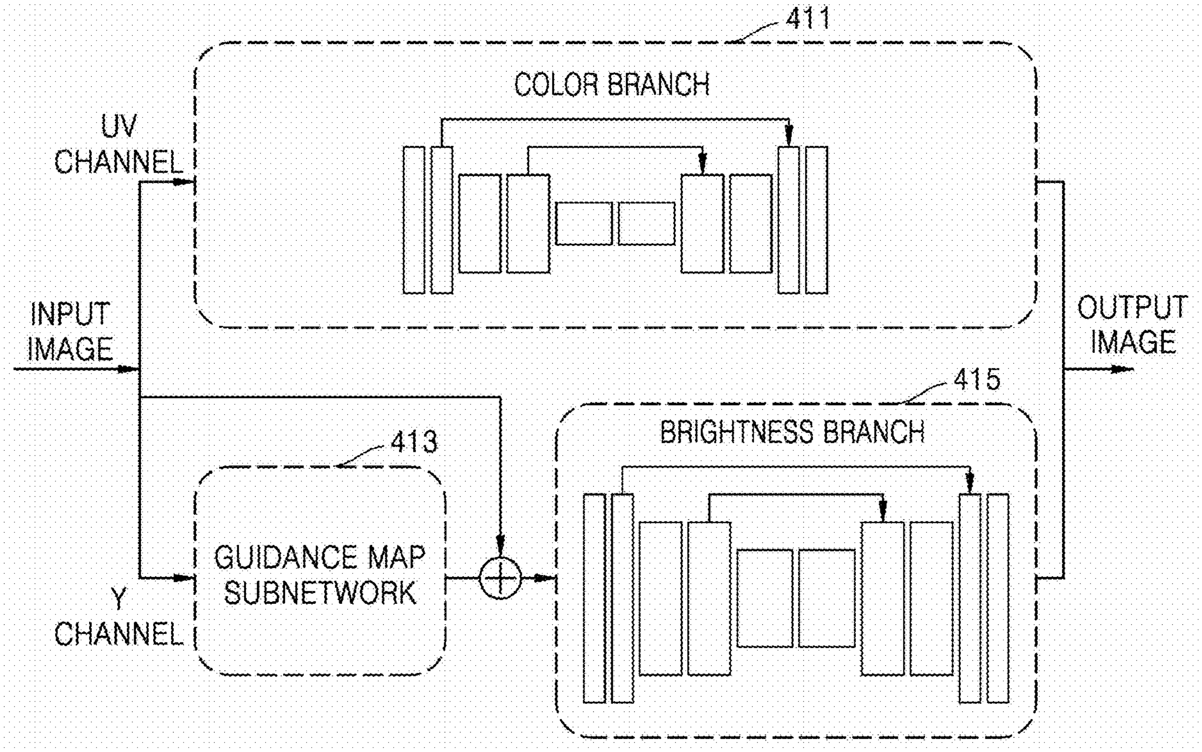
FIG. 4B shows a schematic diagram of the principle of image tone adjustment through an image tone enhancement model provided in another embodiment of the present application.
Figure 4C:
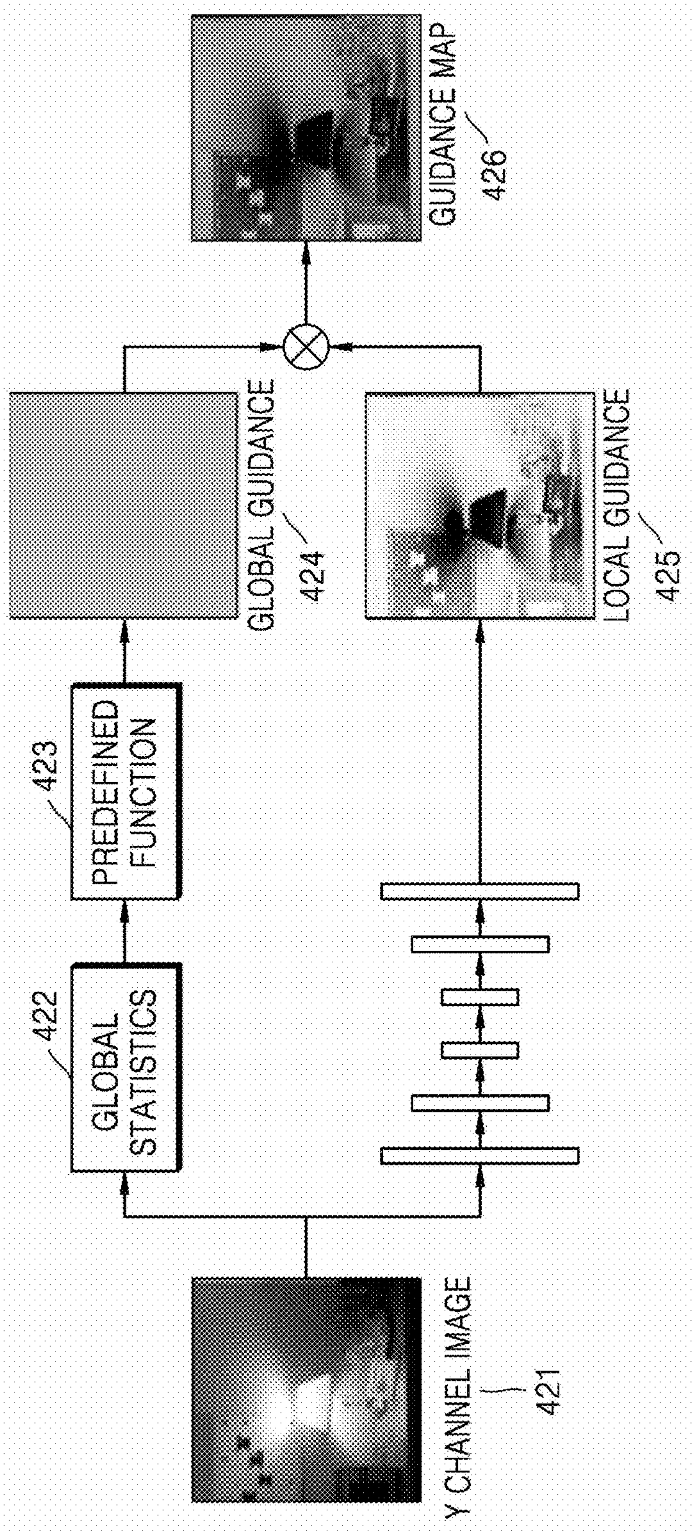
FIG. 4C shows a schematic diagram of the principle of a guidance map sub-network provided in an example of the present application.

As an example, FIG. 4C shows a schematic structural diagram of a guidance map sub-network provided in an embodiment of the present application. As shown in FIG. 4C, the sub-network includes two branches, where the upper branch is the global brightness information processing branch (may also be referred to as a global branch), and the lower branch is the local brightness information processing branch (may be referred to as the local branch, that is, the local brightness estimation network). Specifically, when the sub-network is used to obtain the brightness enhancement parameter feature map of the image, the inputs of the two branches of the sub-network are Y channel images 421. For the global branch, the global brightness mean of the image may be obtained by statistics, corresponding to the global statistics 422 shown in the figure, after the global brightness mean is processed by a predefined function 423, to obtain a global brightness information map shown in the global guidance map. The processed global brightness information, which essentially is a global brightness adjustment indicator. The predefined function 423 may be a predefined non-linear mapping function. The size of the map is equal to the size of the image to be processed, and each element value in the map is the same value, which is a value obtained after the mean processed by the function. For the local branch, a local guidance 425 (i.e., local brightness information, which is essentially the brightness adjustment indicator of each pixel) may be extracted through a neural network (also referred a, a local brightness estimation network), and then the point-wise production is performed on the global guidance 424 and local guidance 425 to obtain the brightness adjustment guidance map 426 of the image, which is the brightness enhancement parameter map.

As an alternative solution, the above-mentioned pre-configured parameters may be as follows:

$$f(x)=1+\mathrm{ReLU}(0.4-\mathrm{mean})\times 0.25$$

Wherein, mean represents brightness mean of all pixels of the Y channel image (normalized brightness mean), ReLU( ) represents an activation function and f(x) represents the above-mentioned global guidance 426. The larger the value of f(x), the larger the overall brightness enhancement intensity of the image.

Figure 4D:
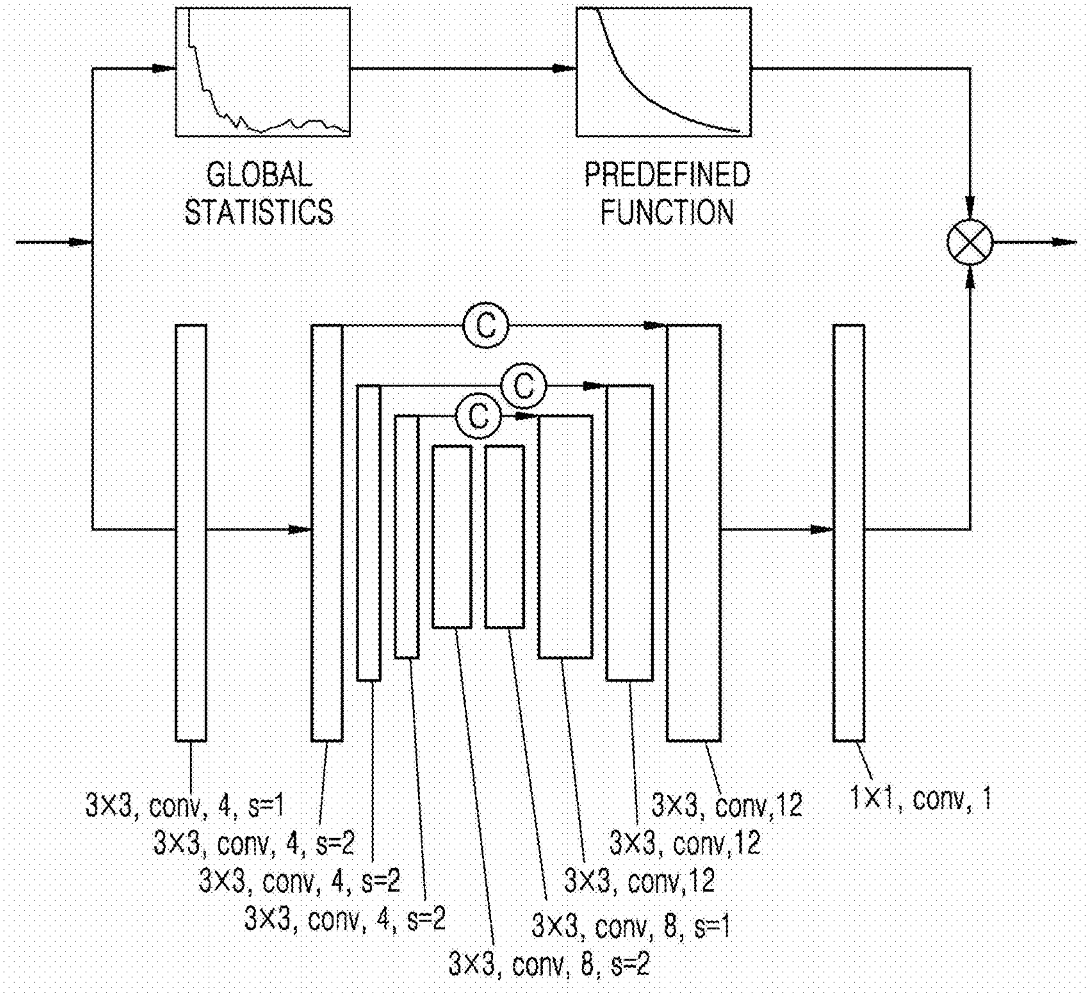
FIG. 4D shows a schematic structural diagram of a guidance map sub-network provided in an example of the present application.

As an example, FIG. 4D shows a schematic structural diagram of an optional guidance map sub-network provided in an embodiment of the present application. As shown in the figure, the local brightness estimation network of the sub-network may adopt a neural network based on a convolution structure. Through the network, the brightness adjustment information related to the semantics of the image may be predicted. For example, in the image shown in FIG. 4C, the image area with a light source may not be adjusted or slightly adjusted in brightness. The input of the network may also be used for local guidance of image brightness adjustment. The neural network may also adopt a UNet-like structure. As shown in the figure, the encoder part of the network may be composed of six convolution layers: [conv 3×3, c=4, s=1] (3×3, conv4, s=1 as shown in the figure), [conv 3×3, c=4, s=2]×3, and [conv 3×3, c=8, s=1]×2; the decoder may be composed of three up-sampling convolution layers [conv 3×3, c=12]×3 and one pointwise convolution layer [conv 1×1, c=1], and the output of the decoder is the local brightness information map. © shown in the figure represents that the coding feature and the decoding feature of the corresponding layer are concatenated. For the global branch, the global brightness information may be obtained through global statistics and a preconfigured function. The global information is used for brightness adjustment of the entire image and is a global guidance for brightness adjustment. Based on global guidance and local guidance, the brightness adjustment of each pixel in the image may be accurately controlled, thereby solving or reducing the problem of overexposure or underexposure, and improving brightness adjustment performance.

Since that the brightness channel image (such as Y channel image) and color channel image (such as UV channel image) of the image focus on different aspects, specifically the brightness channel focuses on the brightness information of the image, and the color channel focuses on the color information of the image. Therefore, the brightness channel and the color channel are processed respectively to avoid the influence between the color channel and the brightness channel, so that the brightness adjustment and color adjustment may be more targeted.

In addition, the semantic information of brightness branch and color branch is different. Color adjustment may only need local semantic information, and may not need to pay attention to global semantic information. For example, the red of flowers in the image has nothing to do with the blue of the sky in the image. Therefore, the color branch may be realized by using a shallower neural network (such as a UNet structure of shallow type). On the contrary, the brightness adjustment needs to pay attention to the global semantic information of the image (such as an image taken at night, the brightness of which is low) and the local semantic information (such as a light source in the image with low brightness). Therefore, the brightness adjustment needs to be more detailed. The brightness adjustment scheme based on global brightness information and local brightness information provided in the embodiments of the present application may achieve a good image brightness adjustment effect.

Figure 4E:
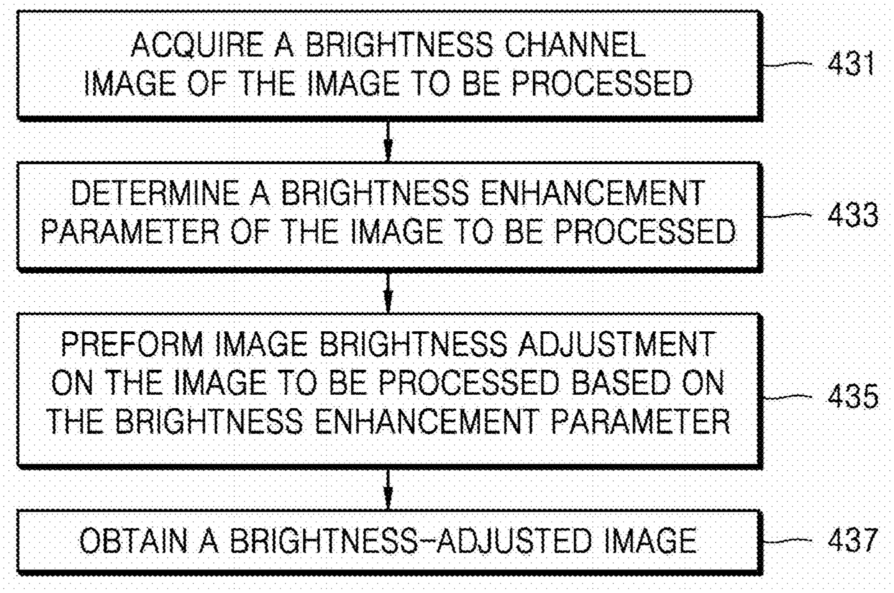
FIG. 4E shows a schematic flowchart of an image brightness adjustment provided in an embodiment of the present application.

As an example, FIG. 4E shows a schematic flowchart of an image brightness adjustment provided in an embodiment of the present application.

The image brightness adjustment may be executed by any type of electronic device, for example, a mobile terminal of a user, such as a smart phone. Based on this method, the user may perform real-time enhancement processing on photos taken by a smart phone, and may also process photos stored in the smart phone, to obtain higher quality photos. As shown in FIG. 2, the image brightness adjustment provided in the embodiment of the present application may include the following steps.

At step 431, an electronic device acquires a brightness channel image of the image to be processed, at step 433, the electronic device determines a brightness enhancement parameter of the image to be processed, at 435, electronic device performs image brightness adjustment on the image to be processed based on the brightness enhancement parameter, and at 437, electronic device obtains the brightness-adjusted image.

In an embodiment of the present disclosure, the at least one of image quality enhancement schemes includes image texture enhancement (also referred as a adjusting a texture of the image), and the performing quality enhancement on the image to be processed using at least one of image quality enhancement schemes includes acquiring a texture enhancement residual and a noise suppression residual of the image to be processed using an image texture enhancement network, and fusing the texture enhancement residual and the noise suppression residual to obtain a texture residual and obtaining a texture-enhanced image according to the texture residual and the image to be processed.

The goal of image texture enhancement is to enhance the texture details of the input image (that is, the image to be processed). The main difficulties of image texture enhancement are as follows: firstly, how to correctly distinguish between noise and fine texture. When enhancing texture, it is necessary to enhance the texture while ensuring or trying to avoid the noise to be boosted, secondly, in the process of texture enhancement, the overshoot and noise boosting are very easy to occur, since when using neural network models for image texture enhancement, it is difficult to enhance the strong and weak edges in the same model to different degrees.

In view of the above-mentioned problems in image texture enhancement processing, the alternative solution provided in the embodiment of the present application may first obtain a texture enhancement residual map based on the image to be processed, and obtain a noise suppression residual map based on the image to be processed image. Specifically, based on the image to be processed, the texture enhancement residual map and the noise suppression residual map of the image may be obtained through a pre-trained neural network (i.e., the image texture enhancement network). For example, the texture enhancement residual map may be obtained through a first convolution processing module based on the image to be processed, and a noise suppression residual map may be obtained through a second convolution processing module based on the image to be processed. In other words, the image to be processed are processed respectively from two levels of the texture enhancement and denoising (noise suppression).

By obtaining the noise suppression residual map and the texture enhancement residual map of the image to be processed, the noise suppression residual map is subtracted from the texture enhancement residual map, and the difference result (that is, the final texture residual map used for texture enhancement processing) and the image to be processed are superimposed to obtain the processed image. Since the noise suppression residual is removed from the texture enhancement residual, the method avoids the enlargement of the noises while enhancing the small textures, to obtain a better texture enhancement effect. In addition, in practical applications, for different texture areas in the image, such as a strong edge area and a weak edge area, the noise information of the image is usually different. Therefore, by obtaining the difference of texture enhancement residual map and noise suppression residual map of image, the texture residual of the strong edge area may be weakened and the texture residual of the weak edge area may be enhanced, so as to effectively avoid the excessive texture enhancement of the strong edge area, and the weaker texture enhancement of the weak edge area, to improve the texture enhancement processing effect.

In an embodiment of the present application, the above-mentioned image texture enhancement network may include at least one dual convolution module, and one dual convolution module includes a first branch for obtaining the texture enhancement residual of the image to be processed, a second branch for obtaining the noise suppression residual of the image to be processed, and a residual fusion module for fusing the texture enhancement residual and the noise suppression residual to obtain the texture residual, where network parameters of the first branch and the second branch are different.

In an embodiment of the present application, the method comprises acquiring a brightness channel image of the image to be processed, acquiring a texture enhancement residual and a noise suppression residual of the image using an image texture enhancement network according to the brightness channel image of the image, fusing the texture enhancement residual and the noise suppression residual to obtain a texture residual, performing image texture enhancement on the image according to the texture residual of the image, and obtaining the texture-enhanced image.

In an embodiment, the image texture enhancement network comprises at least one dual convolution module, one dual convolution module comprises a first branch for obtaining the texture enhancement residual of the image to be processed and a second branch for obtaining the noise suppression residual of the image to be processed, and a residual fusion module for fusing the texture enhancement residual and the noise suppression residual to obtain the texture residual.

In an embodiment, different dual convolution modules in the image texture enhancement network have different convolution network types and/or convolution processing parameters.

For a dual convolution module, the fusing the texture enhancement residual and the noise suppression residual to obtain the texture residual includes subtracting the noise suppression residual from the texture enhancement residual to obtain the texture residual. Correspondingly, the obtaining a texture-enhanced image according to the texture residual and the image to be processed includes superimposing the texture residual corresponding to each dual convolution module with the image to be processed to obtain the texture-enhanced image.

Wherein, the image texture enhancement processing may be implemented by a texture enhancement model (also referred as an image texture enhancement model), that is, an image texture enhancement network (also referred as a texture enhancement network). In order to achieve the above effects provided in the embodiment of the present application, the texture enhancement model may specifically include at least two branches, that is, one enhancement branch (the first branch), and one suppression branch (the second branch). The enhancement branch is used to predict the enhancement residual, that is, the above-mentioned texture enhancement residual (enhancement of useful texture and useless noise). The suppression branch is used to predict the suppression residual, that is, the above-mentioned noise suppression residual, which may suppress or reduce the boosted noise and reasonably adjust the problem of over-enhancement. Through the combination of enhancement branch and suppression branch, the enhanced texture may be more real and natural, thereby improving the performance of texture enhancement.

In an embodiment of the present disclosure, for a dual convolution module, the first branch includes a first convolution module for acquiring the texture enhancement residual of the image to be processed, and a first non-linear activation function layer for non-linear processing of the texture residual output from the first convolution module, the second branch includes a second convolution module for acquiring the noise suppression residual of the image to be processed, and a second nonlinear activation function layer for performing non-linear processing of the noise suppression residual output by the second convolution module, wherein, the convolution processing parameters of the first convolution module and the second convolution module are different.

The specific network structure of the texture enhancement model is not limited in this embodiment of the application. As an alternative, the texture enhancement model may be a neural network model based on a convolution structure, and may include two convolution branches, each branch having different processing parameters. When processing the image, for different texture areas, different convolution branches will have different effects. Specifically, one of the branches may obtain the texture enhancement residual map of the image to be processed through convolution processing based on the image to be processed, the other branch may obtain the noise suppression residual map of the image to be processed through convolution processing based on the image to be processed, then the difference image of the texture enhancement residual map and noise suppression residual map is used as the texture residual map finally used for the image to be processed, and the texture enhanced image is obtained by superimposing the texture residual map and the image to be processed.

Further, for different texture areas in the image to be processed, the texture information and noise information of different areas may be different. For different texture areas, some convolution branches may produce effects, and some convolution may not affect the enhancement effect. The texture enhancement model may distinguish noise and fine texture in the image, as well as strong and weak edges, by selecting different branches. In other words, the texture enhancement focuses on the local details of the image and is very sensitive to image noise. Therefore, there are two main challenges in texture enhancement tasks: a small texture problem, which requires to accurately distinguish noise from small textures, an overshoot problem, which require processing of strong and weak edges with different intensities simultaneously. Therefore, the texture enhancement model using the multi-branch structure can handle the above two difficult problems well.

As an alternative solution of the present disclosure, the texture enhancement model may specifically adopt a residual network-based model, that is, a multi-branch residual network. The network parameters of each branch are different. For different texture areas in the image to be processed, the multi-branch residual network may play the role of "branch selection", that is, make different branches play different roles according to the characteristics of the texture areas, or make some branches work and some do not work.

In an embodiment, the at least one dual convolution module is dilated convolution module respectively and the at least one dual convolution module has different dilation ratios.

In an embodiment, the fusing of the texture enhancement residual and the noise suppression residual to obtain the texture residual comprises subtracting the noise suppression residual from the texture enhancement residual to obtain the texture residual corresponding to each of the at least one dual convolution module. The performing image texture enhancement on the image according to the texture residual of the image comprises superimposing the texture residual corresponding to each of the at least one of dual convolution module with the image to be processed.

In an embodiment, a dual convolution module comprises the first branch comprises a first convolution module for acquiring the texture enhancement residual of the image to be processed, and a first non-linear activation function layer for performing nonlinear processing on the texture residual output by the first convolution module. The second branch comprises a second convolution module for acquiring the noise suppression residual of the image to be processed, and a second non-linear activation function layer for performing nonlinear processing on the noise suppression residual output by the second convolution module.

In an embodiment, the acquiring the texture enhancement residual and the noise suppression residual of the image to be processed using an image texture enhancement network comprises acquiring at least one of non-brightness channel image of the image to be processed, and acquiring the texture enhancement residual and the noise suppression residual of the image to be processed, using an image texture enhancement network, based on the brightness channel image. The obtaining of the texture-enhanced image comprises obtaining a texture-enhanced brightness channel image according to the texture residual and the brightness channel image, and fusing the texture-enhanced brightness channel image and the at least one of non-brightness channel image to obtain the texture-enhanced image.

Figure 5A:
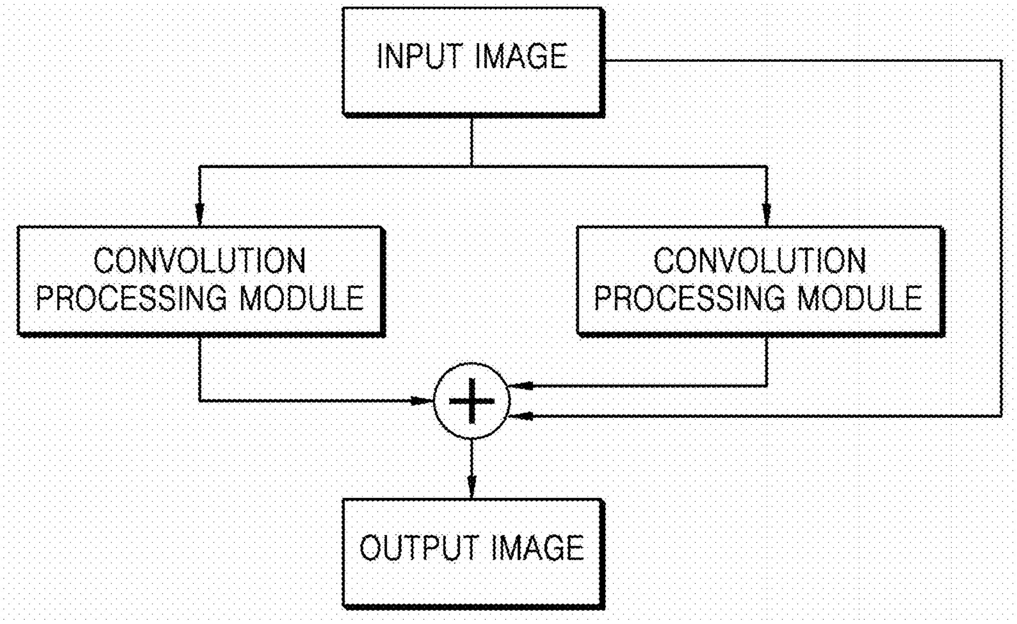
FIGS. 5A, 5B, and 5C respectively show schematic diagrams of the principle of texture enhancement models provided in the three examples of the present application.

As an example, FIG. 5A shows a schematic structural diagram of a multi-branch residual network provided in an embodiment of the present application. In this example, the multi-branch residual network includes a dual convolution module, which is a network composed of two convolution branches (the convolution processing module shown in the figure). The convolution processing parameters of the two convolution branches are different. Where each convolution branch may include, but is not limited to, a convolution layer, and may also include an activation function layer (i.e., a non-linear activation layer, such as a ReLU activation function), etc. After convolution processing the input image through the convolution layer, the activation function layer may perform the non-linear processing on the convolution processing result, and the convolution processing result of the convolution branch and the input image are superimposed to obtain the final texture-enhanced image. In the figure, one branch obtains the texture residual map of the image based on the image to be processed, and the other branch obtains the noise residual map based on the image to be processed, then the difference image of the texture residual map and the noise residual image is used as the final texture residual map, and it is superimposed with the image to be processed to get the final image.

It may be understood that the subtraction or superposition of the maps (images or feature maps) involved in the embodiments of the present application refers to the subtraction or addition of the element values at corresponding points in the two images or maps.

In an embodiment, at least two texture enhancement residuals of the image to be processed may be obtained through at least two first convolution processing parameters based on the image to be processed, and at least two noise suppression residuals corresponding to the texture residual respectively are obtained based on the at least two second convolution processing residuals.

At least two difference results, that is, at least two texture residual, are obtained based on the corresponding texture enhancement residual and noise suppression residual.

An image with enhanced texture is obtained according to at least two difference results and the image to be processed.

In other words, the image texture enhancement model, that is, the image texture enhancement network, may include multiple texture enhancement branches (i.e., the above-mentioned dual convolution module), and the convolution network types and/or convolution processing parameters of texture enhancement branches (including but not limited to, convolution kernel size, etc.) are different. Each texture enhancement branch includes two branches. For each texture enhancement branch, one branch of which is used to obtain the texture enhancement residual map, and the other branch of which is used to obtain the noise suppression residual map. The noise suppression residual map of the branch is subtracted from the texture enhancement residual map to obtain the difference result corresponding to the branch. Finally, the texture residual result corresponding to each texture enhancement branch may be superimposed with the image to be processed to obtain a texture-enhanced image. A better processing effect may be obtained through multiple texture enhancement branches.

In an embodiment, the image texture enhancement network may include at least two dilated convolution network based dual convolution modules, wherein the dilation ratios of the dilated convolution networks of the dilated convolution network based dual convolution modules are different.

Figure 5B:
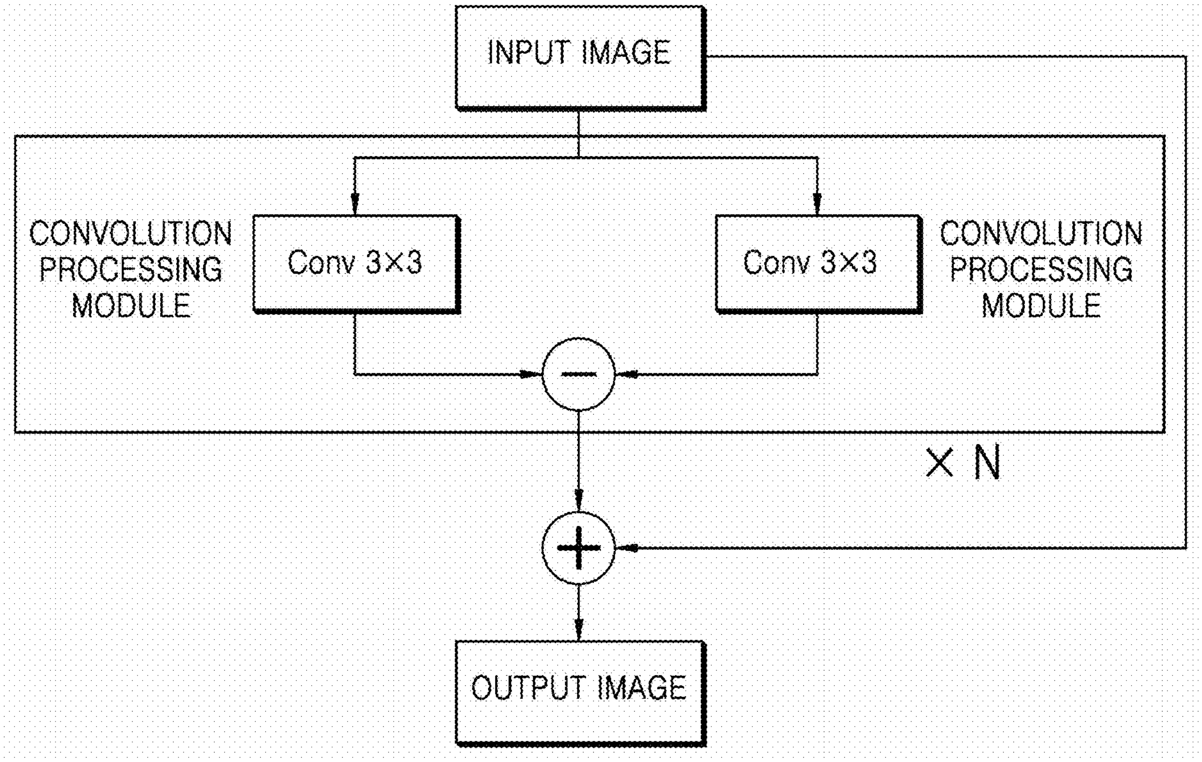
Figure 5C:
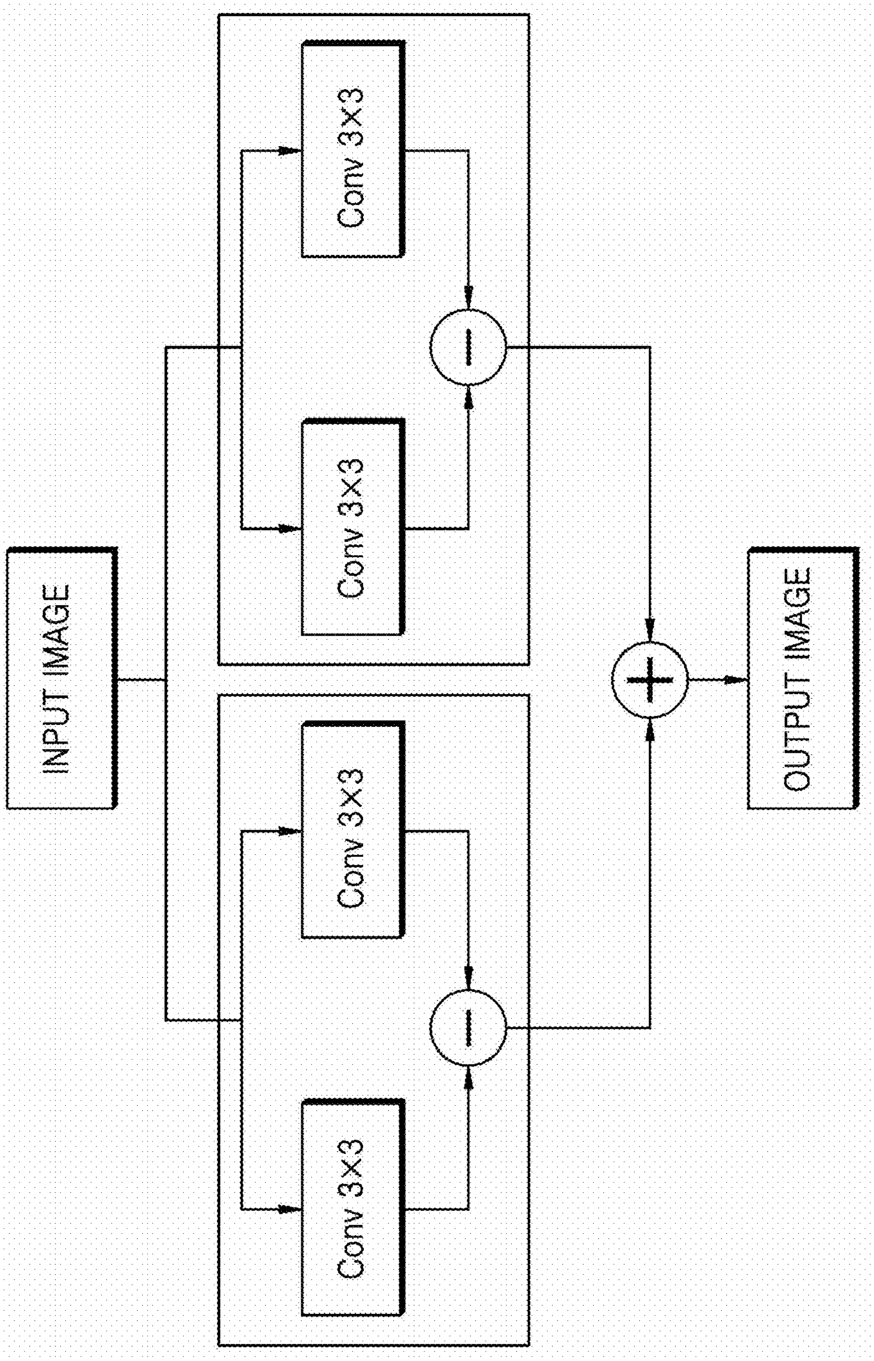

As an example, FIG. 5B shows a schematic structural diagram of a texture enhancement model provided in an embodiment of the present application. The two convolution processing modules (Cony 3×3 shown in the figure) in the figure consist of one texture enhancement branch. Each texture enhancement branch includes two convolution branches. The convolution processing parameters of the two convolution branches may be different. As shown in FIG. 5B, the size of the convolution kernel for each convolution processing parameter in this example may be 3*3, but the model parameters of different convolution kernels are different. For each texture enhancement branch, subtracting of the processing results corresponding to the two convolution processing parameters of the branch (i.e., texture enhancement residual and noise suppression residual) obtains the processing result corresponding to the texture enhancement branch. In an embodiment of the present application, the texture enhancement model may include the processing results of N (N≥1) texture enhancement branches, the processing results of the N branches and the input image are superimposed to obtain the output image, that is, the image with enhanced texture. As an example, FIG. 5C shows a schematic structural diagram of a texture enhancement model (i.e., an image texture enhancement network including two dual convolution modules) when N=2 in FIG. 5B.

It is clear to those skilled in the art that for each convolution branch, for different application requirements, a convolution layer (Cony shown in the figure) may be followed by an activation function layer, and a pooling layer may be interposed between the convolution layer and the activation function layer.

As an alternative, an pixel value of the pixel in the input image is denoted as x (0≤x≤1, that is, the normalized pixel value), and a pixel value of the pixel in the output image (that is, the image obtained after texture enhancement) is denoted as y (0≤y≤1). When the multi-branch residual network is used for texture enhancement, the residual res corresponding to the output image and the input image may be expressed as: res=y−x. If the value range of res is −1≤res≤1, the following multi-branch residual network may be designed according to the value range:

$$y = x + \sum_{i=1}^{N}\left[ReLU\left(conv_{i_1}(x)\right) - ReLU\left(conv_{i_2}(x)\right)\right]$$

Where, N represents the number of branches of the residual network branch (i.e., the texture enhancement branch), $i_1$ and $i_2$ respectively represent two convolution processing parameters of the i-th branch, conv( ) represents a convolution layer, $conv_{i_1}(x)$ represents that the first convolution processing parameter (i.e., the first branch) of the i-th branch is used for convolution processing, and $conv_{i_2}(x)$ represents that the second convolution processing parameter (i.e., the second branch) of the i-th branch is used for convolution processing, and ReLU( ) represents an activation function.

When the multi-branch residual network based on the principle of above expression is used for image texture enhancement processing, when $ReLU(conv_{i_1}(x))=0$, it represents the first branch of branch i (that is, dual convolution module i) (that is, the branch that uses the first convolution processing parameter to perform convolution processing) does not work in texture enhancement, only when $ReLU(conv_{i_1}(x))>0$, the first branch of branch i can work in texture enhancement process. Using this network, for different texture areas, in the texture enhancement process, the branches that play the role of enhancement are different. In this scheme, the multi-branch structure model is able to distinguish noise and fine texture, as well as strong and weak edges, through different combinations of branches, so as to obtain better texture enhancement effect.

Figure 5D:
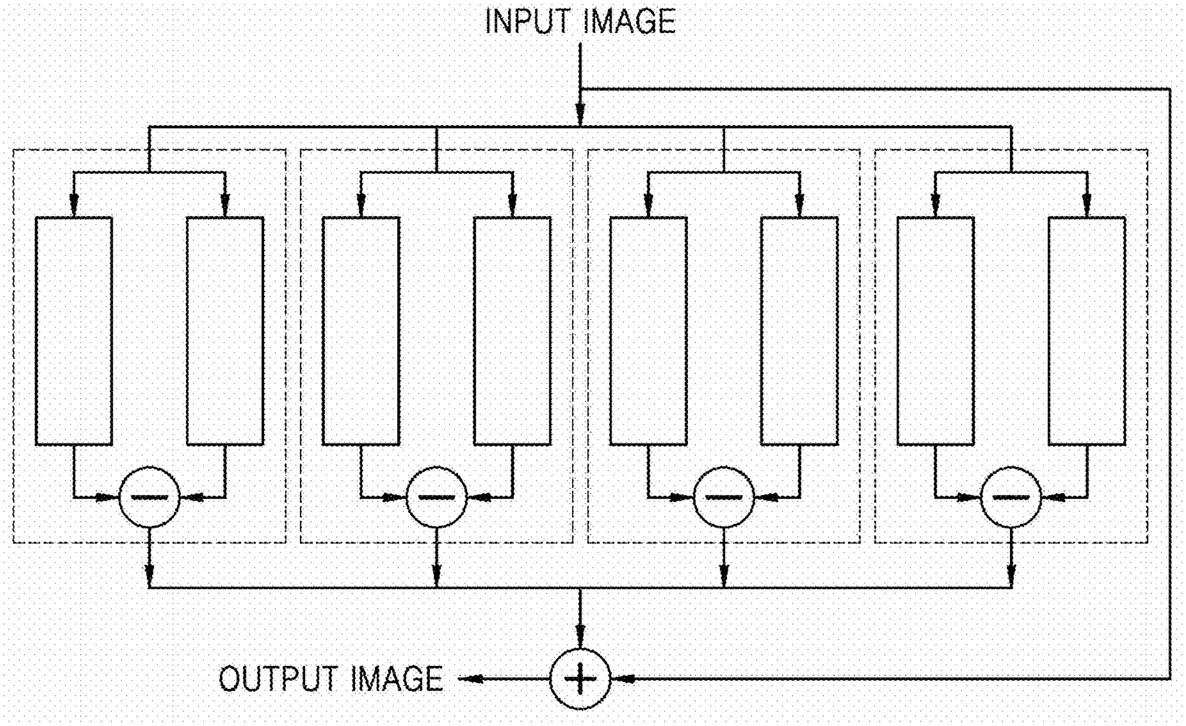
FIG. 5D shows a schematic structural diagram of an image texture enhancement network provided in an example of the present application.

As another example, FIG. 5D shows a schematic structural diagram of a texture enhancement model provided in another embodiment of the present disclosure. This example shows a texture enhancement model, when N=4 (that is, the number of residual branches/the number of dual convolution modules is 4), where each dashed box in the figure corresponds to a texture enhancement branch. In an embodiment, the convolution processing module in each branch may use the dilated convolution module, where the dilated convolutions corresponding to the 4 branches have different dilation ratios (i.e., expansion rates), that is, four dual convolution modules with different dilation ratios (a dual convolution module is one branch) are applied to the input image (for example, the dilation ratios of convolution modules of the four branches may be set to 1, 2, 5, 7 respectively), and the two dilated convolutions in the same module may have the same dilation ratio.

Different branches using different dilation ratios may achieve different enhancement processing on the texture details of different scales in the image. Since the small dilation ratio focuses on short-distance information, and the large dilation ratio focuses on long-distance information, convolution modules with different dilation ratios may reflect texture details of different scales. Textures have different scales, the noise enhancement and overshoot will also occur at different scales. Texture features of different scales may be extracted by using different dilation ratios. The branch structure of the dual convolution module may effectively overcome the problem of noise boosting and texture overshoot in different scales while achieving texture enhancement. Each convolution layer in the model can be cascaded with a ReLU layer, and there may be no batch normalization layer (or there is a batch normalization layer). Based on the solution of the embodiment of the present application, by interleaving a set of dual convolution blocks with different dilation ratios, the texture enhancement module can capture both short-range context information (to guide the enhancement of small textures) and long-range context information (to guide the enhancement of stronger textures) to get a better texture enhancement effect.

The specific network structure of each convolution processing model is not limited in the embodiment of the present application. For example, each convolution processing module may adopt a dilated convolution structure with a convolution kernel size of 3×3, and the dilation ratios of the four branches shown in the figure may be set to 1, 2, 5, and 7, respectively.

In the image texture enhancement network that includes at least one dual convolution module provided in the embodiment of the present application, each dual convolution module may include two branches with the same structure, that is, the first branch and the second branch mentioned above. The convolution processing parameters of the two branches are different, for example, the parameters of the convolution kernel are different. Different convolution processing parameters may predict different features, and the texture enhancement network may be obtained through training. The first branch of a dual convolution module is used for predicting the global texture residual (i.e., texture enhancement residual) for texture enhancement on the image to be processed, but it is likely to cause the problem of noise boosting and excessive image texture enhancement when performing the global texture enhancement of the image.

Regarding this problem, the second branch of the dual convolution module is used for predicting a noise suppression residual for adjusting the global texture residual, which is used for the local adjustment of the global texture residual, to suppress or reduce the boosted noise and the over-enhanced texture. In other words, the global texture residual is used to enhance the overall texture of the image, and the noise suppression residual is used to adjust the local enhancement amount, wherein one is the coarse-grained overall adjustment, one is the fine-grained local correction, thereby avoiding or reducing the problems of over-enhancement and noise boosting. The output of the dual convolution module is the difference between the first branch and the second branch, and the difference, as the final texture residual, is superposed to the image to be processed.

It is clear to those skilled in the art that the "residual" in each embodiment of the present application is a concept of adjustment amount, that is, how much increases or decreases, for example, 16 is the enhanced residual, if a pixel value of an image is increased from 150 to 166.

In an embodiment of the present disclosure, the acquiring a texture enhancement residual and a noise suppression residual of the image to be processed using an image texture enhancement network includes acquiring the brightness channel image and the non-brightness channel image of the image to be processed and obtaining the texture enhancement residual and the noise suppression residual of the image to be processed, using an image texture enhancement network, based on the brightness channel image. Correspondingly, the obtaining a texture-enhanced image according to the texture residual and the image to be processed includes obtaining a texture-enhanced brightness channel image according to the texture residual and the brightness channel image and obtaining the texture-enhanced image by fusing the texture-enhanced brightness channel image and the non-brightness channel image.

Since the color channel image of the image does not affect the texture of the image, when performing the image texture enhancement, only the brightness channel image can be used. Therefore, when predicting the texture enhancement residual and noise suppression residual of the image, only the brightness channel image may be used. The input of the dual convolution module is the brightness channel image, the texture-enhanced brightness channel image is obtained by adding the output of each dual convolution module and the brightness channel image, and then the texture-enhanced brightness channel image and the non-brightness channel image (that is, the color channel image) are fused to obtain the texture-enhanced image.

Figure 5E:
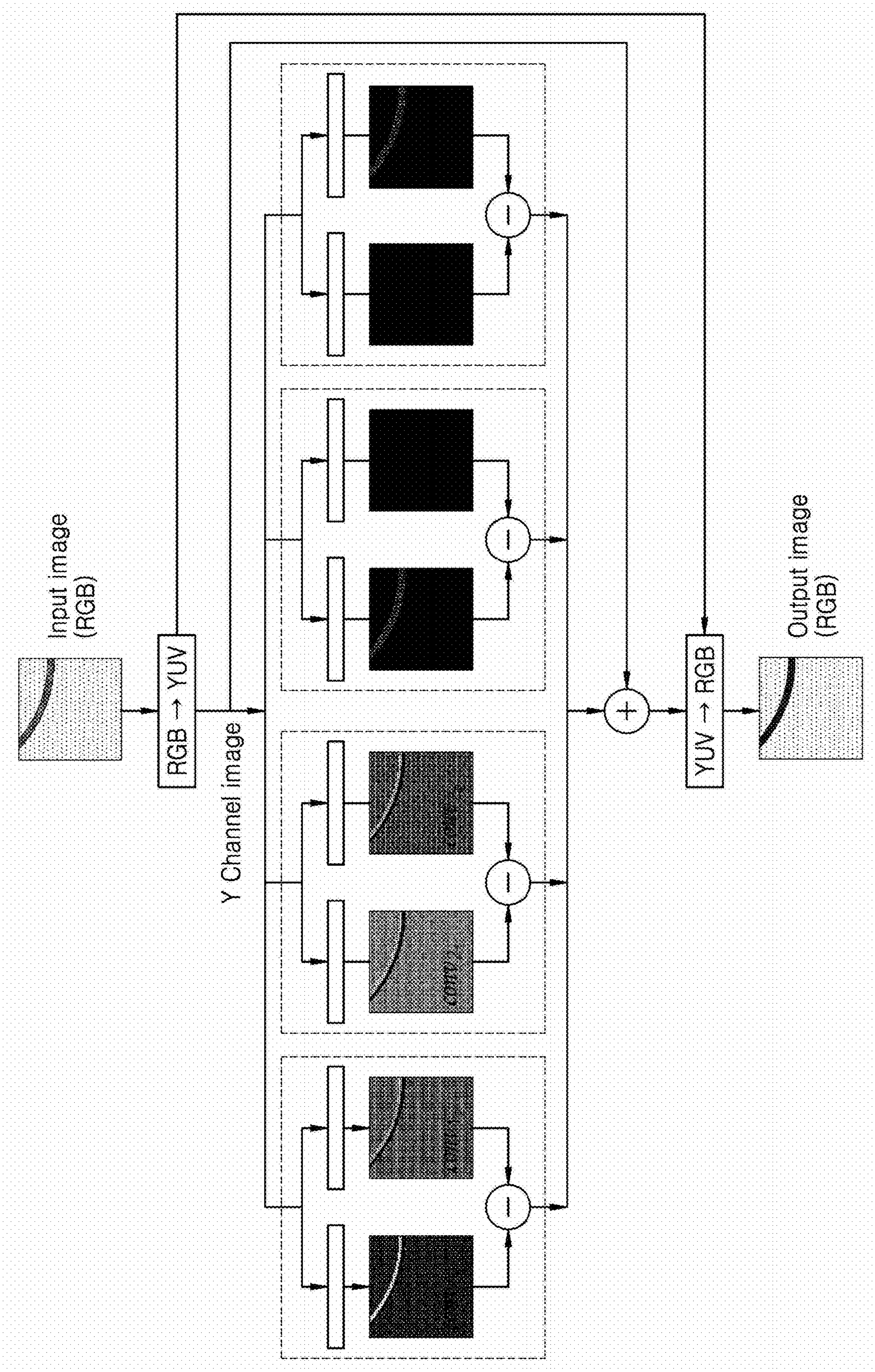
FIG. 5E shows a schematic flowchart of a texture enhancement processing method provided in an example of the present application.

As an example, FIG. 5E shows a schematic diagram of the principle of an image texture enhancement processing solution provided in an embodiment of the present application. As shown in the figure, the input image in this example, that is, the image to be processed, is an RGB image, and the image texture enhancement network includes four dual convolution modules. Each dual convolution module includes two convolution branches, each of which may include a cascaded convolution layer and a ReLU layer. The convolution in this example uses a dilated convolution, where the size of the convolution kernel of each convolution layer of the four dual convolution modules may be 3×3, and the dilation ratios of the four dual convolution modules are 1, 2, 5, and 7, respectively. It can realize the prediction of texture enhancement residual and noise suppression residual of different scales and different ranges by using different dilation ratios. A small dilation ratio focuses on a small range of information, and a large dilation ratio focuses on a larger range of information. Therefore, the dual convolution modules having multiple dilation ratios may obtain texture detail information of multiple scales.

Specifically, based on the network structure shown in FIG. 5E, the input image may be converted from an RGB image to a YUV image (RGB YUV shown in the figure), the Y channel image is the brightness channel image, and the UV channel image is the non-brightness channel image. The Y channel image is input into each dual convolution module. Taking the first dual convolution module on the left in the figure as an example for further description. The texture enhancement residual $conv_{1_1}$ may be obtained through its first branch, the noise suppression residual $conv_{1_2}$ may be obtained through its second branch, then the texture residual corresponding to the first dual convolution module is $conv_{1_1}$-$conv_{1_2}$ Similarly, the texture residual corresponding to the other three dual convolution modules may be obtained. After that, the texture residual and the brightness channel images corresponding to the four dual convolution modules are added pixel by pixel to obtain the texture-enhanced brightness channel image, and then the texture-enhanced brightness channel image and the non-brightness channel image are fused into an RGB image (YUV→RGB shown in the figure), and the RGB image is the texture-enhanced output image.

Figure 5F:
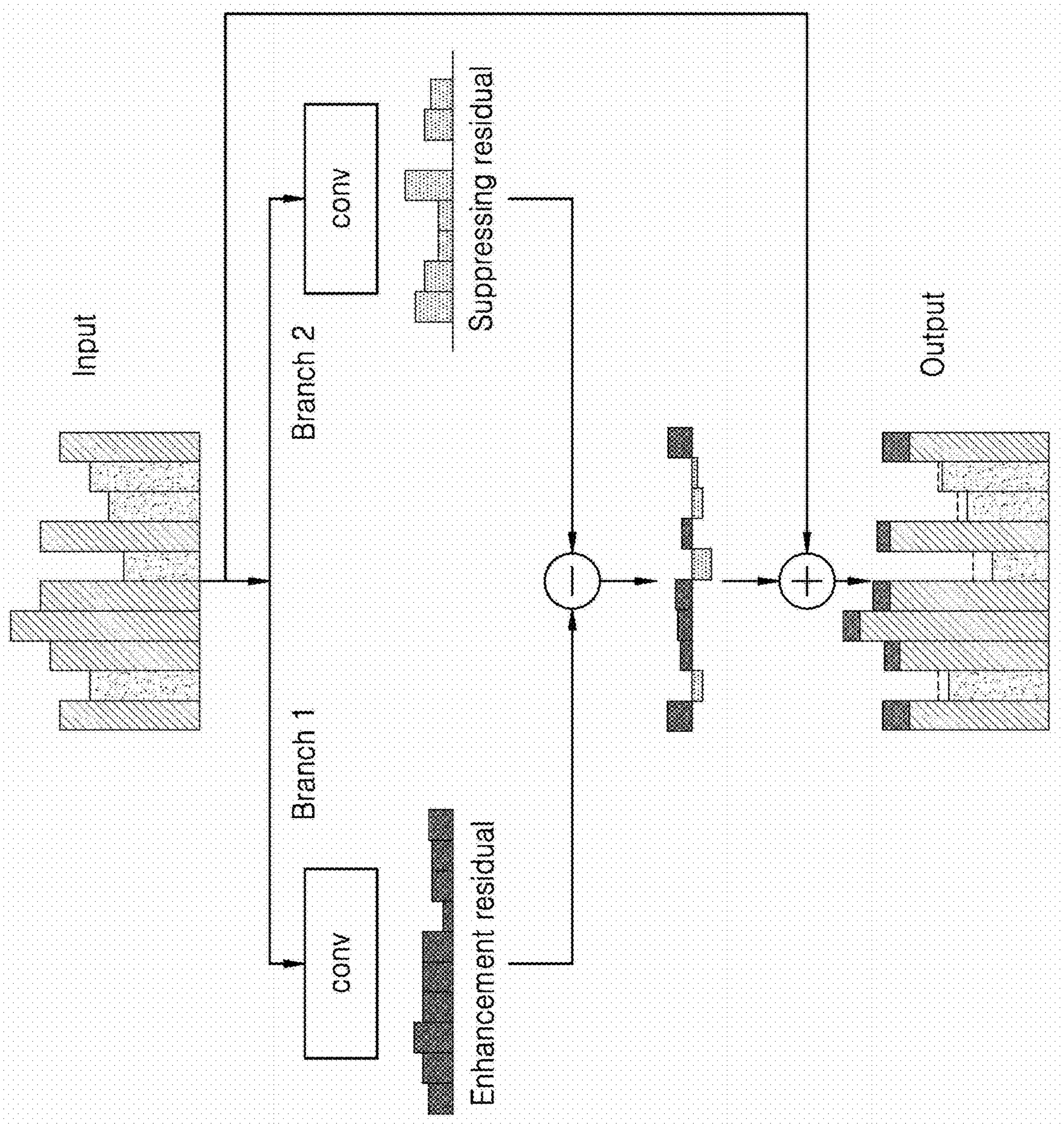
FIG. 5F is a schematic diagram of a data processing principle of a dual convolution module provided in an example of the present application.

In order to better understand the principle of the dual convolution module provided in the embodiment of the present application, it will be described below in conjunction with the data processing principle of a dual convolution module in FIG. 5F. As shown in FIG. 5F, the branch 1 in the figure is the first branch used to obtain the texture enhancement residual (the enhanced residual shown in the figure) of the image to be processed, and the branch 2 is the second branch used to obtain the noise suppression residual (the suppression residual shown in the figure) of the image to be processed. The input in the figure corresponds to the brightness channel image of the image to be processed, and the output is the texture-enhanced brightness channel image. It may be understood that the input and output in FIG. 5F are illustrated only for facilitating the understanding of the principle of the dual convolution module. Each bar of the bar graph is understood as the value of a pixel in the image. As shown in the figure, for the input image, the enhancement residual may be predicted through branch 1, which will enhance the useful texture and useless noise in the image, and the suppression residual may be predicted through branch 2, which may suppress or reduce the noise to be boosted (that is, enhanced), and may adjust the texture to be over-enhanced. The suppression residual is subtracted from the enhancement residual (e as shown in the figure, that is, the enhancement residual subtracts the suppression residual pixel by pixel) to obtain a difference that is used for image texture enhancement, then the difference is added to the image (⊕ as shown in the figure, that is, the difference and the image are added pixel by pixel) to get the output image, in which the texture is reasonably enhanced and the noise is effectively suppressed.

Figure 5G:
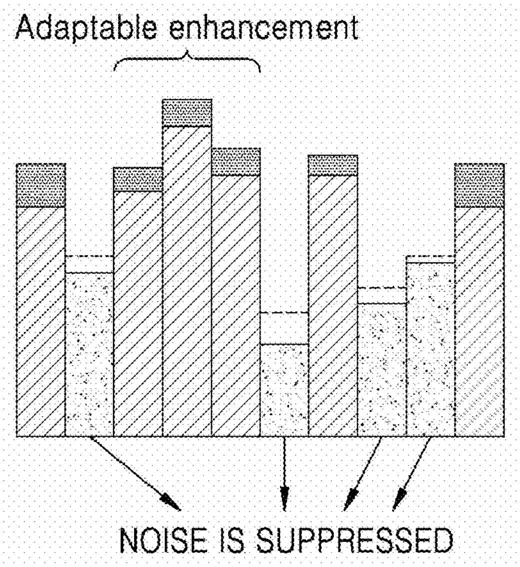
FIG. 5G is an enlarged schematic diagram of the output in FIG. 5F.

FIG. 5G shows an enlarged schematic diagram of the output part in FIG. 5F. The bars filled with pure black in the figure are pixels with enhanced texture, and the pure black part indicates the enhanced intensity. The bars filled with the dotted lines in the figure are the pixels where noise is suppressed, the space between the dotted line and the corresponding bar indicates the suppressed intensity. It can be seen from this figure that based on the texture enhancement network provided in the present application, it is possible to achieve adaptive texture enhancement on the image, that is, it can effectively suppress the noise in the image while achieving reasonable texture enhancement.

When training the image texture enhancement network based on the training sample image, the training sample image may include sample image pairs, which include an image with clear texture, and an image corresponding to the image with clear texture that needs to be texture-enhanced, that is, the contents of the image in the image pair are the same, but the textures are different. When training the texture enhancement network, the loss function may be L1 loss, and the value of the loss function=minimize (|groundtruth−output|). Where, minimize refers to minimization, ground truth refers to images with clear texture of training sample images, and output is a result image obtained after the image that needs to be texture-enhanced in training sampling images going through the image texture enhancement network, that is, a texture-enhanced image, and |groundtruth−output| represents the L1 loss between the texture-enhanced image after network processing and the corresponding image with clear texture.

As an example, FIG. 5H shows a schematic flowchart of an image texture enhancement provided in an embodiment of the present application.

The image texture enhancement may be executed by any type of electronic device, for example, a mobile terminal of a user, such as a smart phone. Based on this method, the user may perform real-time enhancement processing on photos taken by a smart phone, and may also process photos stored in the smart phone, to obtain higher quality photos. As shown in FIG. 2, the image texture enhancement provided in the embodiment of the present application may include the following steps.

At step 501, an electronic device acquires a brightness channel image of the image to be processed, at step 503, the electronic device acquires a texture enhancement residual and a noise suppression residual of the image using an image texture enhancement network according to the brightness channel image of the image, at step 505, electronic device fuses the texture enhancement residual and the noise suppression residual to obtain a texture residual at step 507, electronic device performs image texture enhancement on the image according to the texture residual of the image, and at 509, electronic device obtains the texture-enhanced image.

In an embodiment of the present disclosure, the at least one of image quality enhancement schemes includes at least two enhancement schemes, and the performing quality enhancement on the image to be processed using at least one of image quality enhancement schemes to obtain a processed image includes performing enhancement processing on the image to be processed by using the at least two enhancement schemes respectively and obtaining the processed image based on a processing result corresponding to each enhancement scheme.

When multiple image enhancement processing schemes are used to process the image to be processed, each scheme may be used to perform corresponding enhancement processing on the image to be processed respectively, and then based on the corresponding processing results of each scheme, the final enhanced processing result may be obtained, such as, the processing results corresponding to the enhancement schemes may be fused to obtain the final image. For example, the image denoising and image texture enhancement may be used to process the image to be processed respectively, and then the processing results corresponding to the two processing schemes may be fused to obtain the final image.

In an embodiment of the present disclosure, the performing quality enhancement on the image to be processed using at least two image quality enhancement schemes includes performing enhancement processing on the image to be processed in sequence in order of the at least two enhancement schemes.

Wherein, for any enhancement scheme other than the first enhancement scheme, the enhancement scheme may process the image to be processed based on the processing result of previous at least one enhancement processing scheme.

For example, when multiple enhancement schemes are used to process the image to be processed, the processing schemes may have a certain processing sequence, and the input information of the first processing scheme is the image to be processed. For any processing scheme other than the first processing scheme, the input information of the processing scheme may include the output information of previous at least one processing scheme.

Wherein, the processing sequence corresponding to multiple enhancement schemes may be determined according to the characteristics and advantages of each processing scheme. Specifically, the processing sequence may be preset, for example, based on experimental data and/or experience, or may be predicted, for example, through a neural network model.

In an embodiment of the present disclosure, the method further includes determining scene information corresponding to the image to be processed and determining the enhancement scheme corresponding to the image to be processed and the processing sequence between different enhancement schemes, according to the scene information.

In an embodiment of the present disclosure, the performing quality enhancement on the image using at least one of image quality enhancement schemes to obtain a processed image comprises: determining scene information corresponding to the image to be processed, determining whether the at least one of image quality enhancement schemes is performed respectively and the processing sequence of the at least one of image quality enhancement schemes which is determined to be performed based on the scene information, and performing the at least one of image quality enhancement schemes by the processing sequence.

In an embodiment, the processing sequence of the at least one of image quality enhancement schemes which is determined to be performed may be the image denoising, the image brightness adjustment, the image color adjustment and the image texture enhancement in sequence.

In practical applications, the image quality is directly related to the characteristics of the scene corresponding to the image. Images acquired in different scenes usually have different image characteristics and require to use different targeted processing schemes. For example, for an image captured in a scene with good light conditions, it may only need to be processed for image texture enhancement, while an image captured in a scene with poor light conditions may need to be processed for brightness adjustment and/or denoising processing.

In order to achieve more targeted image enhancement processing and better meet different practical application requirements, the alternative solution of the embodiment of the present application may determine the image enhancement scheme and the enhancement processing sequence according to the scene information (such as the scene type) of the image to be processed. The image enhancement processing is performed in a scheme that matches the scene information of the image, to achieve the purpose of targeted enhancement and improve the image processing effect.

Figure 6A:
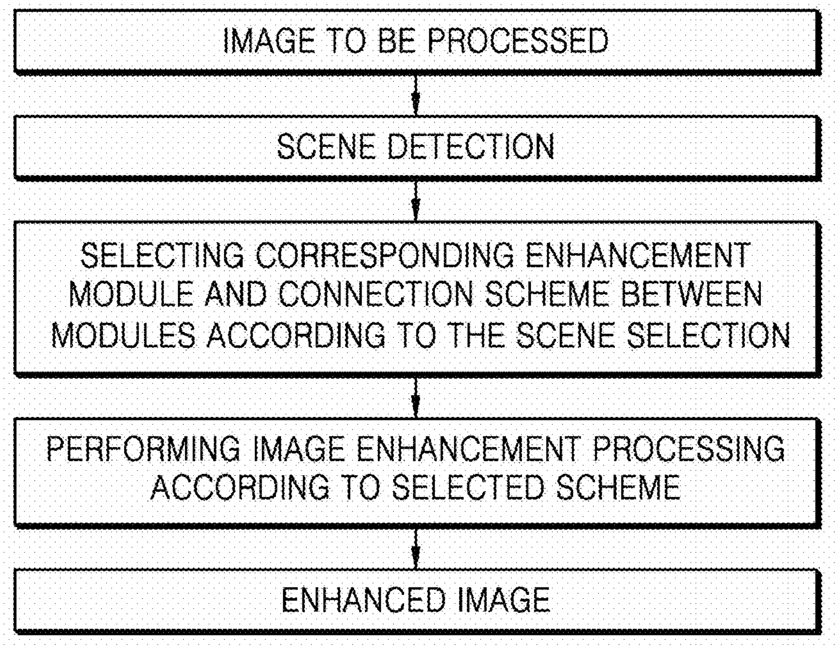
FIG. 6A shows a schematic flowchart of an image processing method provided in an example of the present application.

As an alternative, FIG. 6A shows a schematic flowchart of an image processing method provided in the present application. As shown in FIG. 6A, for an image to be processed, the scene detection may be performed on the image firstly to determine its corresponding scene information, the corresponding enhancement modules and the connection scheme between the modules may be selected according to the determined scene information, and the image enhancement processing may be performed according to the selected scheme to obtain the enhanced image.

In an embodiment, the determining scene information corresponding to the image to be processed includes determining the scene information of the image to be processed through a scene detection network, based on the image to be processed.

As an alternative solution, a pre-trained neural network may be used to predict the scene information of the images.

In practical applications, the scene information of various images may be classified. At this time, the prediction problem of the image scene information may be converted into the classification problem of the scene information. For the image to be processed, the scene type (i.e., category) corresponding to the image, that is, the scene information of the image, may be predicted by the neural network.

Wherein, the method for classifying the scene types is not limited in the embodiment of the present disclosure. The scene types may be classified according to actual needs and various characteristics of the image. In an embodiment, the lighting condition and noise level of the image are two typical descriptors of image, which is helpful for the recognition of the image scene. Therefore, the scene types may be classified according to the lighting conditions and noise levels of the image. As an example, the scene types of the image can be classified into 4 typical scenes: normal light, backlight, low light level 1, low light level 2, and so on. Taking the above four scene types as examples, the problem of image scene type recognition may be converted into four-classification task of image. The pre-trained neural network model (such as convolutional neural network model) may be used to realize the recognition of scene type of the image to be processed.

In addition, when the image enhancement schemes include two or more than two schemes, the processing sequence of the multiple enhancement schemes is different, and the resulting image processing effects are also different. In order to further improve the image processing effects in different scenes, the corresponding enhancement scheme and the processing sequence between different enhancement processing schemes may be pre-configured. After determining the scene type of the image to be processed, the image enhancement processing may be performed by using the corresponding enhancement scheme and processing sequence according to the scene type.

It may be understood that one scene type may correspond to one enhancement scheme. The correspondence between different scene types and enhancement schemes and processing sequences may be configured according to empirical values and/or experimental values. For example, the enhancement scheme corresponding to each scene type may be configured according to empirical values. When there are two or more enhancement schemes, the processing sequence among the multiple enhancement schemes may be determined based on experience or through experiments.

As an example, taking the above four scene types as examples, the following table shows an optional solution of an image enhancement processing scheme provided for different scene types provided in an embodiment of the present application. As shown in the table, different scene types have different image characteristics, and different targeted image enhancement schemes may be used. In the table, ③ represents texture enhancement processing, ② represents brightness and color enhancement processing, ① represents denoising processing, the connection sequence between processing schemes represents the connection sequence between processing schemes, and the arc between processing schemes represents a dense connection scheme used between different processing schemes (see the description below). Taking the scene type of low-light level 1 as an example, the corresponding enhancement schemes may include image denoising processing and texture enhancement processing, where the input of image denoising model is the image to be processed, the input of the texture enhancement module includes the image to be processed and the output of the denoising model, and the enhanced image may be obtained from the input image, the output of the denoising model, and the output of the texture enhancement model.

| Scene type | Image characteristics | Enhancement scheme | Processing sequence of enhancement schemes |
| --- | --- | --- | --- |
| Norm light | Good light condition and low noise | Texture enhancement | 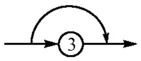 |
| Backlight | Good light condition, but dark area in shadow | Brightness and color enhancement | 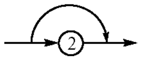 |
| Low-light level 1 | Medium light condition Medium noise | Image denoising, texture enhancement. | 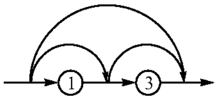 |
| Low-light level 2 | Low light condition Strong noise | Image denoising, brightness and color enhancement, texture enhancement | 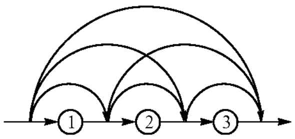 |

In an embodiment of the present disclosure, for any enhancement scheme other than the first enhancement scheme, the enhancement scheme processes the image to be processed based on the processing result of at least one previous enhancement processing scheme and the image to be processed.

That is to say, the various enhancement processing schemes may be connected using a dense connection scheme. For any enhancement scheme other than the first enhancement scheme, the input information of this scheme may include the processing result of at least one previous enhancement scheme, and may also include the image to be processed, that is, the input information of each enhancement scheme includes at least two types of information, so that a better processing effect may be obtained based on diverse input information.

In an embodiment of the present a disclosure, for any enhancement scheme other than the first enhancement scheme, the enhancement scheme processes the image to be processed based on the processing results of all previous enhancement processing schemes. Obtaining the processed image based on the processing results of enhancement schemes includes: fusing the processing results of enhancement schemes to obtain a processed image, or taking the processing result of the last enhancement scheme as a processed image.

Specifically, for the last enhancement scheme, since its input information contains the processing results of various previous enhancement schemes, the processing result thereof can be regarded as the final processing result. The processing results corresponding to the various processing schemes are fused to obtain the final processing result. Where, the specific fusion method is not limited in the embodiments of the present application. For example, it can be superposition or other fusion schemes. For example, various enhancement schemes may correspond to different weights, and the processing results of various enhancement schemes are weighted and fused to obtain the final processing result based on the weights of various enhancement schemes.

In an embodiment of the present disclosure, the above-mentioned at least one image quality enhancement schemes include image denoising, image tone adjustment, and image texture enhancement, and the processing sequence of the image quality enhancement scheme is: image denoising, image tone adjustment and image texture enhancement.

In an embodiment, the image tone adjustment includes the image brightness adjustment and/or the image color adjustment.

As an alternative solution, the image quality enhancement scheme provided in the embodiments of the present application may simultaneously achieve the image denoising, tone adjustment and texture enhancement. For the three specific image quality enhancement subtasks of image denoising, color/brightness adjustment and texture enhancement, the present application proposes a prior topology information, which comes from a large number of experimental examples and experience summaries. In an image processing workflow involving the above three subtasks, the image denoising has the highest priority. Otherwise, if the image denoising is after the color adjustment, it may change the noise distribution and affect the subsequent denoising. If the image denoising is after the texture enhancement, then the noise will be boosted and increased while the texture is enhanced, which is not conducive to subsequent denoising. Therefore, the image may be denoised firstly. Relatively speaking, the coupling between the tone adjustment task and the texture enhancement task is much weaker, but the brightness and color information may help restore texture details, especially for dark areas in the image. Therefore, through a large number of experimental examples and experience summaries, the prior task topology information determined in the embodiment of the present application may be described as: image denoising color enhancement (that is, tone adjustment) texture enhancement, in order to further exploit the potential connections between the subtasks and optimize the combination relationship.

In the alternative solution of the embodiment of the present application, when the image is enhanced in multiple aspects, that is, when the image quality enhancement includes multiple subtasks, a dense connection may be introduced between subtasks, that is, the input information of subsequent subtasks includes the output results of the previous subtasks and images to be processed. For example, the image quality enhancement processing schemes include the image denoising, image tone enhancement and image texture enhancement. According to the prior task topology information, the processing sequence among the three image quality enhancement schemes may be image denoising, image tone adjustment and image texture enhancement in sequence. During image processing, the models of the three subtasks are densely connected.

Specifically, the image to be processed is input to the image denoising model, the output of the image denoising model and the image to be processed are input to the image tone adjustment model, the image tone adjustment model performs further processing based on the output of the image denoising model and the image to be processed, the image to be processed and the output of the image tone adjustment model are input to the texture enhancement model. Finally, the result image after quality enhancement may be obtained based on the image to be processed, the output of the image denoising model, the output of the image tone adjustment model, and the output of the texture enhancement model. Where, the image denoising model, the image tone adjustment model and the texture enhancement model may be implemented by using related models, or at least one of the three models may be the model provided in the previous embodiment of the present application.

In an embodiment of the present disclosure, the above-mentioned at least one image quality enhancement scheme may be at least one of the candidate quality enhancement schemes. Before the at least one of image quality enhancement schemes is used to enhance the quality of the image to be processed, the method may also include according to the image to be processed, determining at least one image quality enhancement scheme corresponding to the image to be processed from the candidate quality enhancement schemes.

That is to say, in practical applications, various candidate quality enhancement processing schemes may be pre-configured. For different images to be processed, due to different image information in aspects of the image, such as the noise and brightness, in order to obtain better processing effects, different images need to be processed in different schemes. If some images have good brightness, the brightness adjustment may not be necessary for them, and some images have very clear textures, the texture enhancement may not be necessary for them. Therefore, in order to achieve personalized processing for different images, the solution provided in this embodiment of the present application may first determine which processing scheme or processing schemes are used to process the image to be processed before processing the image to be processed, and the determined image enhancement scheme performs corresponding processing on the image.

According to the image to be processed, the determining at least one image quality enhancement scheme corresponding to the image to be processed from the candidate quality enhancement schemes may also be implemented through a neural network model. Specifically, the image to be processed may be input to the pre-trained image processing scheme screening model, and the specific image enhancement scheme used is determined based on the output of the model.

In an embodiment of the present disclosure, when determining the at least one of the image quality enhancement schemes is at least two the image quality enhancement schemes, the method further includes determining processing sequence of the at least one of the image quality enhancement schemes.

In an embodiment, when determining the processing sequence of the at least two enhancement schemes, the processing sequence of the at least two enhancement schemes may be determined through a processing sequence predication network based on the image to be processed.

In an embodiment, the processing sequence of the at least one of enhancement schemes may be determined based on preconfigured mapping correlation. For example, a mapping correlation of the different processing schemes and processing sequence may be preconfigured, and when determining the processing schemes corresponding to an image to be processed, a corresponding processing sequence may be determined based on the mapping correlation.

The processing sequence may also be determined through a neural network model. For example, a plurality of determined image quality enhancement schemes are input a sequence determination model (i.e., the processing sequence predication network), or an image to be processed and a plurality of image quality enhancement schemes are input the model together to obtain the corresponding processing sequence based on the output of the model.

It may be understood that the above-mentioned image processing scheme screening model and sequence determination model may be implemented to one model, that is, the two models may be cascaded sequentially to form one model, and the output of the image processing scheme screening model in the cascaded model is the input of the sequence determination model. The image processing method screening model and the sequence determination model may also be two separate models.

In an embodiment of the present disclosure, the above-mentioned processing sequence prediction network includes a decision branch for selecting the current candidate enhancement scheme from at least two enhancement schemes based on input information, and an inference branch for determining whether the current candidate enhancement scheme is a target enhancement scheme, where the input information is the image to be processed or the enhancement processing result of the enhancement schemes in determined order to the image to be processed.

Wherein, the specific network structure of the above prediction network is not limited in this embodiment of the application. In an embodiment, when determining the processing sequence of the at least two enhancement schemes through a neural network model, the neural network model may be a model based on recurrent neural network, for example, may be a model based on Long Short Term Memory (LSTM). Each stride of the recurrent neural network outputs one of the above-mentioned at least two enhancement schemes, and the output sequence of each enhancement scheme is the processing sequence corresponding to the enhancement schemes.

The following describes in detail a solution of determining the processing sequence of multiple enhancement schemes through a neural network model in conjunction with an example.

Figure 6B:
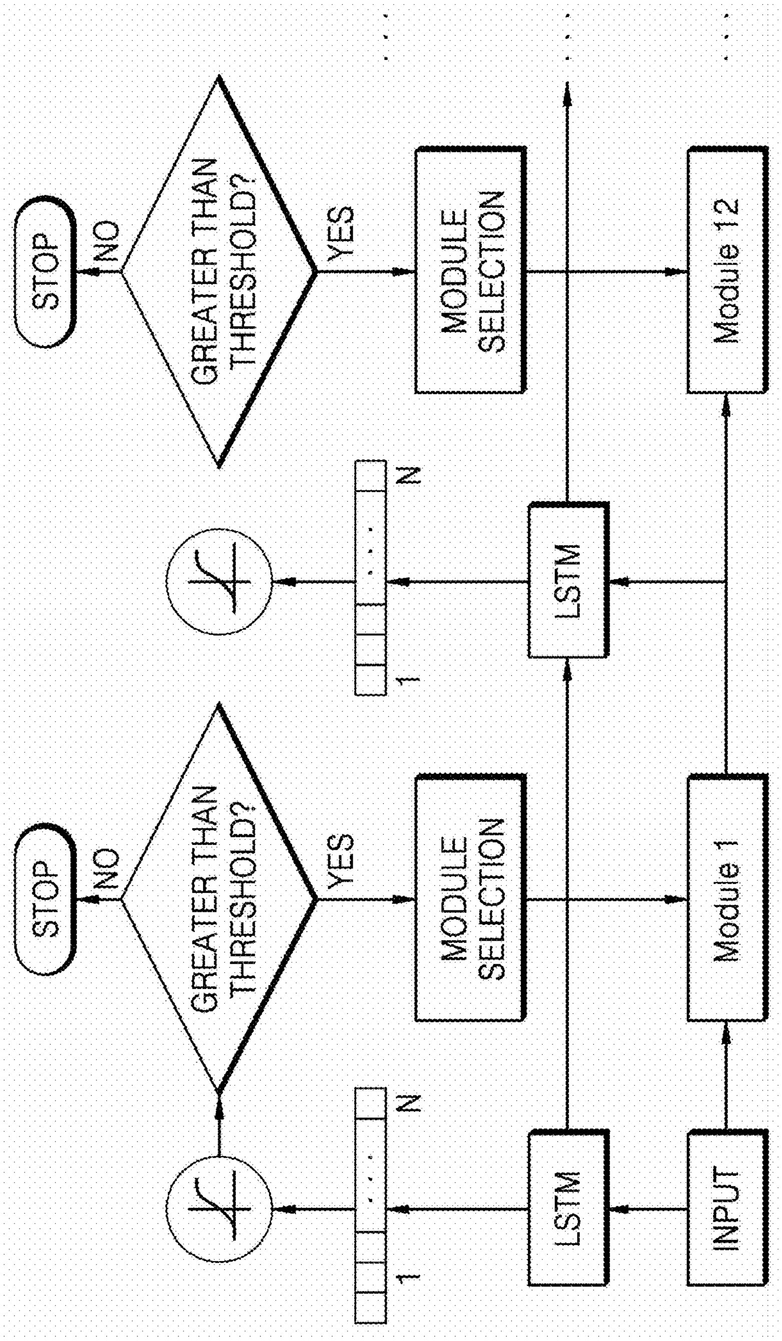
FIG. 6B shows a schematic diagram of the principle of determining the processing sequence of multiple enhancement schemes through a processing sequence prediction network provided in an example of the present application.

For example, FIG. 6B shows a schematic diagram of the principle of determining the processing sequence of multiple enhancement processing schemes using a neural network model based on LSTM in this example. In this example, it is assumed that the enhancement schemes include N enhancement schemes, and each enhancement processing scheme can realize enhancement processing through the neural network model. For example, the image denoising model may be used for denoising processing, the tone adjustment model may be used for tone adjustment and the texture enhancement model may be used for texture enhancement. Determining of the above processing sequence indicates determining the data processing sequence between the models. One of the modules in the figure corresponds to a processing model (that is an enhancement scheme). The processing flow of this example is as follows:

The input of the model shown in FIG. 6B includes the image to be processed. As shown in the figure, the first processing stride of the LSTM is the step 1. The image to be processed is input to the LSTM to obtain a one-dimensional vector of length of N, and each value in the vector represents the probability of a module being selected, that is, the probability of N modules being selected as a module. In an embodiment, in order to determine the first module (module 1 shown in the figure) for enhancement processing, whether there is a probability greater than the set threshold among these N values is determined firstly. If there is, a module 1 may be determined from the modules corresponding to the probabilities greater than the set threshold. For example, the module corresponding to the largest one of probabilities greater than the threshold among the N values is determined to be module 1. If there is no probability greater than the set threshold among the N values, the process ends.

For each processing stride except the first processing stride, the input of LSTM includes the output image after the image to be processed is processed by the modules of the determined sequence and the hidden state vector of the LSTM of the previous processing stride. The output is still a feature vector of length N, and the module corresponding to the stride may be determined using the same processing scheme described above. Take the second stride as an example, the input is the image processed by module 1 on the image to be processed and the hidden state vector of the LSTM of the first stride (as shown by the arrow between the two LSTMs). It should be noted that, for the N probabilities corresponding to each stride except the first stride, if the module corresponding to the largest probability of the probabilities greater than the set threshold among the N probabilities corresponding to the stride is the previous selected module, the module selection result corresponding to the stride may be the module corresponding to the second largest probability among the probabilities greater than the set threshold.

It should be noted that, as an example, the figure only shows the process of determining the first module (module 1) and the second module (module 2). The ellipsis in the figure represents the omission of other processing strides, and the principle of each candidate omitted processing step is the same as that of the second supplementary stride.

In addition, if the processing sequence of the enhancement schemes is not determined at the end of the process, the processing sequence may be determined based on experience or the method of determining the sequence according to the scene type provided in the previous description or other schemes. The above-mentioned set threshold may also not be set, for each processing, the module corresponding to the largest value of the N probabilities corresponding to the current processing may be directly determined as the target module determined by the current processing. If not determining whether to set the threshold, the module corresponding to the largest value among the N probabilities corresponding to the first processing time is determined as module 1.

The specific model structure of the above LSTM may be selected according to actual needs, such as a convolutional structure and a fully connected layer structure that are cascaded in sequence, where the convolutional structure is used to extract the image feature of input (the image to be processed, or the output image of the previous module and the hidden state feature of the LSTM corresponding to the previous processing stride), and the fully connected layer structure is used to fully connect the features output by the convolution structure and output a feature vector of length N. Each feature value of the vector corresponds to an enhancement scheme, that is, a module. Each feature value may represent a confidence that the module corresponding to the feature value is placed in the processing sequence corresponding to the current stride. After that, the feature vector is transformed into N probabilities through a Sigmoid function (corresponding to graph icon in the figure), where N probabilities are the above-mentioned probabilities used to characterize each module being selected.

It is clear to those skilled in the art that the solutions provided in the embodiments of the present application may be implemented by designing an end-to-end image quality enhancement model. The following describes an end-to-end image quality enhancement model provided in the embodiments of the present application in detail in conjunction with an example.

Figure 6C:
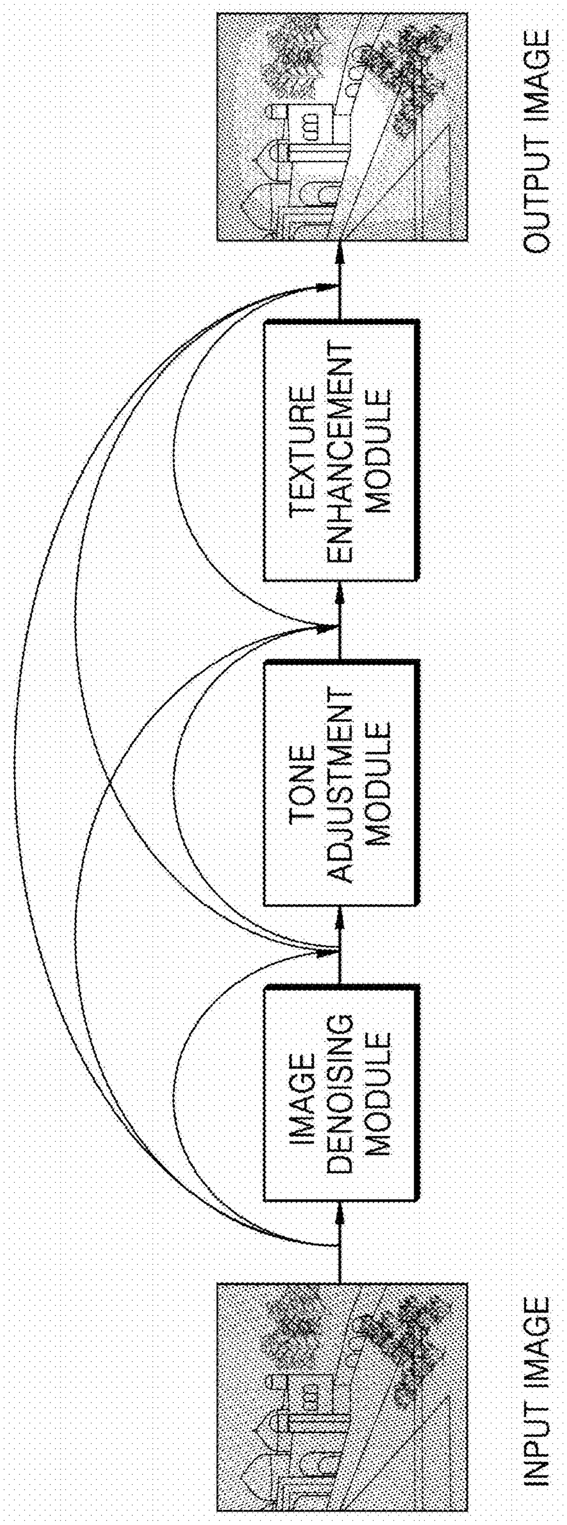
FIG. 6C shows a schematic structural diagram of an image processing model provided in an embodiment of the present application.

As an embodiment, FIG. 6C shows a schematic structural diagram of an image quality enhancement model provided in an embodiment of the present application. As shown in the figure, the image quality enhancement model may include an image denoising model, a tone adjustment model and a texture enhancement model, and the three models may specifically adopt the model structure provided in the previous example of the present application. For example, the image denoising model may adopt the structure shown in FIG. 3A or FIG. 3B, the tone adjustment model may adopt the structure shown in FIG. 4A or FIG. 4B, and the texture enhancement model may adopt the structure shown in FIG. 5A, FIG. 5B, FIG. 5C or FIG. 5D.

It can be seen from FIG. 6C that after a lightweight model of each subtask is established in the embodiment of the application, the overall quality enhancement model may be established end-to-end based on the established prior topology information. However, the overall model is not a simple concatenation of subtasks, due to the potential coupling correlation between subtasks. Through dense connection, the advantages of subtasks and their own characteristics, as well as the optimal combination correlation between subtasks, are effectively exploited. Through the image quality enhancement model, the image quality enhancement task may be completed in one step from the aspects of image noise, image brightness and color, and image texture, and the characteristics and advantages of the subtasks of image denoising, image brightness and color adjustment, and texture enhancement are fully exploited, resulting in ensuring the enhancement effect and the processing real-time of single subtask. Through the dense connection, the advantages of each subtask and the optimal combination correlation between subtasks are effectively exploited, and end-to-end image quality enhancement is realized.

The core idea of dense connection is to establish short connections between tasks. If there are L tasks, then there will be L(L+1)/2 connections. The input of each subtask has the output from all previous tasks. Dense connections may exploit the advantages of various tasks and achieve an optimal combination of tasks. For example, one possible situation is that while the image is denoised, some texture detail information may be lost, but the input of texture enhancement model includes both the output of the denoising task and the input of the original image (i.e., the image to be processed), which helps to maintain the denoising effect, and also helps to restore and enhance the texture details.

Figure 7A:
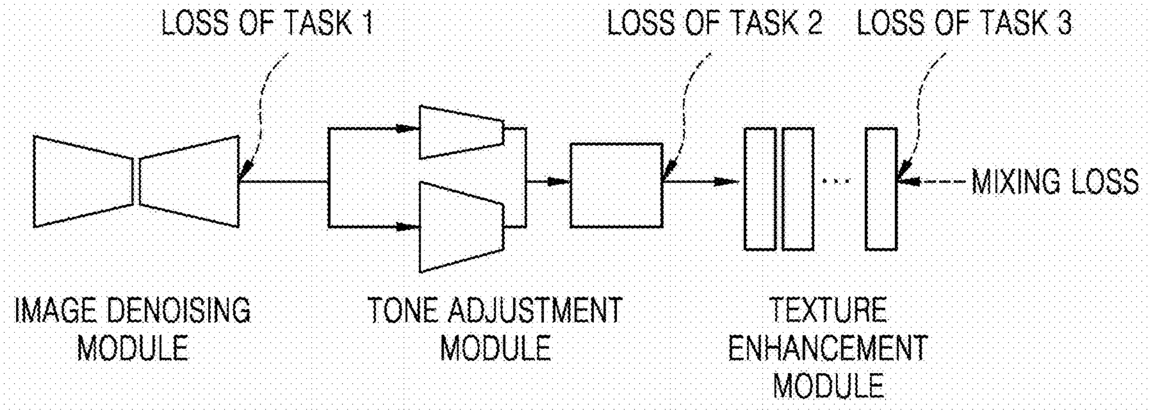
FIGS. 7A, 7B, and 7C show schematic diagrams of the training principles of several image processing models provided in embodiments of the present application.
Figure 7B:
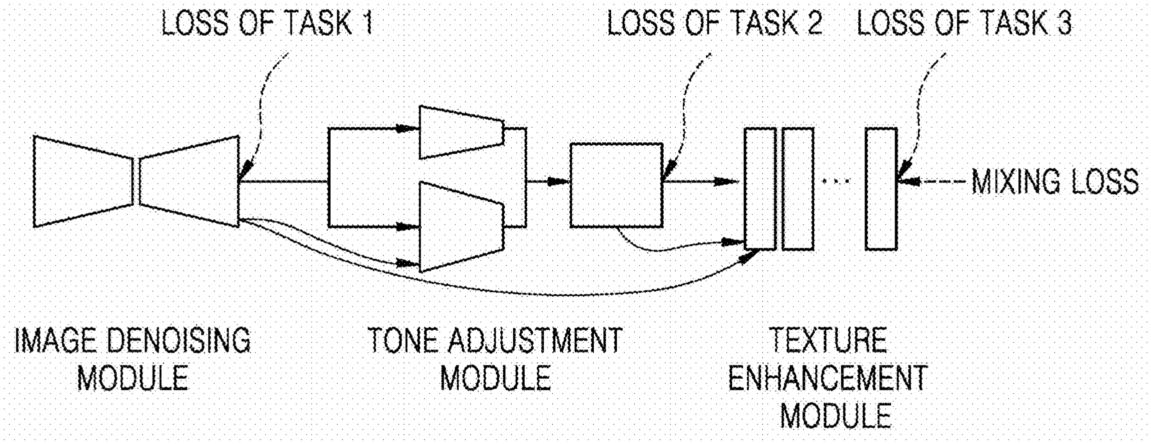

For the above-mentioned end-to-end image quality enhancement model provided in the embodiments of the present application, in the training stage, the embodiment of the present application introduces a multi-stage connection adjustment mechanism, as shown in FIG. 7A and FIG. 7B.

Specifically, during training, the individual training of each subtask may be completed firstly, that is, the image denoising model, the tone adjustment model and texture enhancement model may be trained respectively. After the single task accuracy reaches a certain accuracy, the corresponding subtasks are concatenated in stages. For example, the denoising subtask and the tone enhancement subtask are concatenated firstly, that is, the image denoising model and the tone adjustment model are densely connected, the concatenated image denoising model and tone adjustment model is trained as a whole, after reaching a certain accuracy (that is, obtaining a certain convergence result), the texture enhancement subtask is continued to be concatenated (i.e., dense connection) on this basis, and the entire concatenated image quality enhancement model is trained.

In the multi-stage connection adjustment stage, which is the model training stage after concatenating two or three subtasks, and the model mainly learns the dense connection weights between subtasks. At this stage, the main model weights of some subtask models may be fixed during training. Since in the training of a single subtask, the subtask model reaches a certain training accuracy, therefore, at this stage, only the weights corresponding to the densely connected parts need to be learned. Where, which model weights for each subtask are specifically fixed, may be configured based on experience or experimental results. For example, for the image denoising model shown in FIG. 3A or FIG. 3B, the model parameters of the denoising model part may be fixed. For the tone adjustment model shown in FIG. 4A or FIG. 4B, the model weights of the color adjustment model and the brightness adjustment model may be fixed, that is, the core weight parameters of each subtask model may be fixed. This stage mainly learns the input and output model parameters of each subtask model, that is, the weight parameters of the connection parts between the subtask models.

In an embodiment, during training, the involved loss functions may include a subtask loss function, a stage loss function, and a global loss function, where the subtask loss function is the loss function corresponding to each subtask model. The loss of task 1 as shown in FIG. 7A is the loss of the subtask loss function of the image denoising model part, which represents the difference between the label output result image corresponding to the sample input image and the processing result output by the image denoising model. Similarly, the loss of task 2 is the loss of the subtask loss function of the tone adjustment model part, which represents the difference between the labeled output result image corresponding to the sample input image and the processing result output by the image tone adjustment model. The loss of task 3 is the loss of the subtask loss function of the tone adjustment model part. The stage loss function is the loss function when the subtask models are concatenated for training. After the different subtask models are concatenated, the model also needs to learn the weight parameters of the connection parts between the subtask models, as the contents represented by the connection curve between the different subtask models shown in FIG. 7B and FIG. 7C. The global loss function (the mixing loss shown in the figure) is the model loss function when the entire end-to-end image quality enhancement model is trained.

Figure 7C:
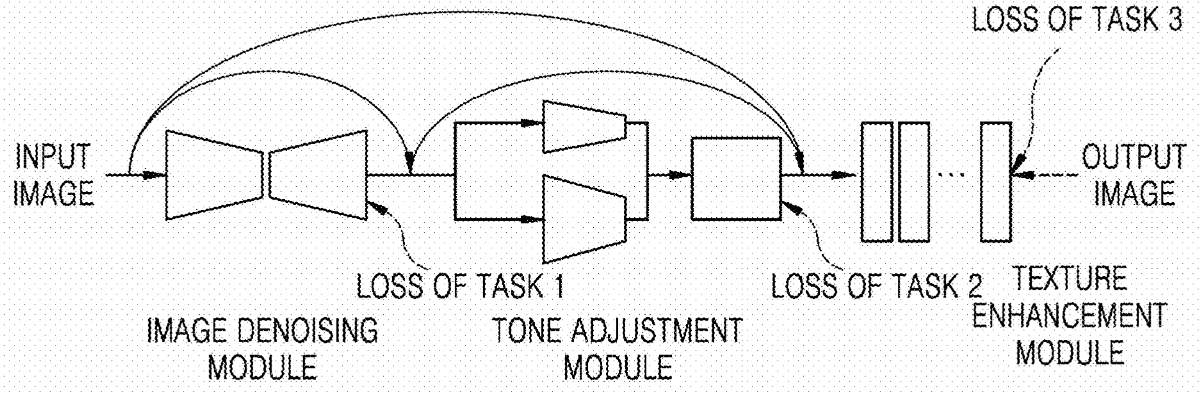

In view of the three subtasks contained in the image quality enhancement task, there should be potential correlations between them. In order to use the advantages of each subtask and strengthen the deep interaction between these subtasks, the above-mentioned task interaction mechanism based on dense connection (intensive connection) may be used, as shown in FIG. 6, FIG. 7B and FIG. 7C. In addition, in order to properly supervise the subtasks and accelerate the training, each subtask may be assigned a loss $L_i(x, x_i^*)$ (optional, the loss uses L1 loss) specific to training task, the final training loss may be expressed as:

$$L_i(x,x_i^*)=\Sigma_i\alpha_i L_i(x,x_i^*)$$

Where, i=1, 2, 3, corresponding to three subtasks respectively, $\alpha_i$ represents the weight of the i-th subtask, and $L_i(x, x_i^*)$ represents the training loss corresponding to the i-th subtask.

The model proposed in the embodiment of the present application may adopt a multi-stage training strategy to accelerate model convergence. First, we train the image denoising subtask network, and then perform tone enhancement and texture enhancement training. In order to strengthen the interaction between subtasks, finally, we use dense connection operations to promote information fusion in different levels, which may alleviate some conflicts in these subtasks. For example, the denoising processing tends to remove some information in the image, while the texture enhancement tends to add some details. Therefore, the dense connection operation may provide some image details, which may be deleted in the denoising module. In addition, dense connections may accelerate model training.

For the training of the model, to supervise the learning of subtasks, a truth value should be generated for each subtask. In an embodiment a regression algorithm may be used to establish a training truth value for each subtask in the model. For example, for a given high-quality image GT3 (that is, a truth value for texture enhancement), firstly, a texture degradation may be applied to it to obtain GT2 to enhance the tone, then a brightness and color degradation may be performed on GT2 using image processing tools to obtain GT1 for image denoising, finally a multi-level noise is added to GT1 to get the low-quality input image of the proposed model. In an embodiment, the above-mentioned degradation processing may adopt the following methods.

In texture degradation for the image GT3, bilinear downsampling and upsampling with different scale factors may be applied sequentially (such as setting the zoom ratio to 2×, 3× and 4×) to obtain GT2, which has the same resolution as GT3, but with degraded texture.

In brightness and color degradation, the GT2 image is processed using an image processing tool to obtain GT1, so that these images look like they were shot in low light condition.

In noise degradation, the noise in the real noisy image is related to the camera sensor. In order to generate real noise, the degradation algorithm provided in the previous embodiment of the present application (the method for obtaining the training image described above) may be used to add the noise in the real noise image to the clean image.

The deep learning-based image quality enhancement method provided in the embodiments of the application may complete the image quality enhancement task from one or more aspect(s) in one step. For example, for the above-mentioned typical processing combination of denoising and entire tone adjustment and texture enhancement of image, this solution may effectively exploit the advantages of each subtask and the optimal combination correlation between tasks on the basis of ensuring the enhancement effect and the real-time processing of single subtasks, so that the overall color tone and detailed information of the input image may be fully improved. The embodiment of the present application decomposes the image quality enhancement task into denoising, brightness enhancement and texture enhancement from both global and local aspects, where brightness enhancement may correspond to the global enhancement, and other parts contribute to the local enhancement.

The image quality enhancement task decomposes into denoising, brightness enhancement and texture enhancement from both global and local aspects, where brightness enhancement may correspond to the global enhancement, and other parts contribute to the local enhancement.

The solution provided in the embodiments of the present application can improve image quality from one or more aspects such as denoising, tone enhancement and texture enhancement, in particular, it may significantly improve the problem of image quality reduced due to the hardware limitations of image acquisition devices (such as mobile phones), and make the image have reduced noise, bright colors and tones and rich texture detail information, which can effectively meet people's requirements for image quality.

In addition, based on the solutions provided in the embodiments of the present application, the design of a lightweight image processing model may be implemented, so that the image processing model may be better adapted to mobile terminals. Specifically, the design of a lightweight model may be implemented from one or more of the following aspects:

In terms of image denoising model, since that more practical prior information (noise intensity, noise spatial distribution, etc.) is predicted as the input of the denoising network, the burden of the denoising network may be effectively reduced and it is possible to reduce the network structure.

In terms of tone adjustment, the color branch of the tone adjustment model may be inferred with a smaller size, thereby reducing the inference time. In addition, with the aid of a prior brightness distribution information (such as global brightness information, local brightness information, etc.), it is possible to design fewer channels and layers.

In terms of texture enhancement, the dual-branch texture enhancement model provides more optimized combination space and gives the model more powerful spatial fitting capability, where a very light structure may be used in each branch.

In the connection of each processing model, a dense connection can be adopted, and network parameters may be greatly reduced through feature reuse and bypass setting.

Figure 8:
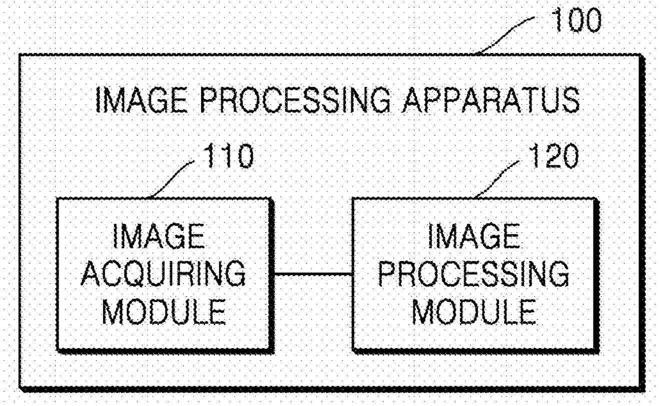
FIG. 8 shows a schematic diagram of an image processing apparatus provided in an embodiment of the present application.

Based on the same principle as the method provided in the embodiment of the present application, an embodiment of the present application further provides an image processing apparatus. As shown in FIG. 8, the image processing apparatus 100 may include an image acquiring module 110 and an image processing module 120.

The image acquiring module 110 is used for acquiring an image to be processed.

The image processing module 120 is used for performing quality enhancement on the image to be processed using at least one of image quality enhancement schemes to obtain a processed image.

In an embodiment, the at least one of image quality enhancement schemes includes image denoising, and when the image processing module 120 performs quality enhancement on the image to be processed using at least one of image quality enhancement schemes, it may be used for acquiring a noise intensity of the image to be processed and denoising the image to be processed according to the noise intensity.

In an embodiment, when the image processing module 120 denoises the image to be processed according to the noise intensity, it may be used for acquiring noise residual of the image to be processed according to the noise intensity and obtaining a denoised image, according to the noise residual and the image to be processed.

In an embodiment, the noise intensity of the image to be processed includes a noise intensity corresponding to each of the plurality of channel images of the image to be processed.

In an embodiment, when the image processing module 120 acquires a noise intensity of the image to be processed, it may be used for acquiring each of the plurality of channel images of the image to be processed, acquiring the noise intensity of each of the plurality of channel images respectively and concatenating the noise intensity of each of the plurality of channel images to obtain the noise intensity of the image to be processed.

In an embodiment, when the image processing module 120 may be used for based on each of the plurality of channel images, acquiring the noise intensity of corresponding channel image using a noise feature estimation network respectively.

In an embodiment, when the image processing module 120 denoises the image to be processed according to the noise intensity, it may be used for, acquiring a brightness channel image of the image to be processed, acquiring a noise spatial distribution of the image to be processed according to the brightness channel image and denoising the image to be processed according to the noise intensity and noise spatial distribution.

In an embodiment, when the image processing module 120 may be used for determining the noise spatial distribution of the image to be processed using a noise spatial feature estimation network, according to the brightness channel image and noise intensity.

In an embodiment, when the image processing module 120 may be used for acquiring the noise residual of the image to be processed according to the noise intensity and the image to be processed, weighting the noise residual according to the noise spatial distribution to obtain a weighted noise residual and obtaining a denoised image according to the weighted noise residual and the image to be processed.

In an embodiment, the at least one of image quality enhancement schemes includes image brightness adjustment, and the image processing module 120 performs quality enhancement on the image to be processed using at least one of image quality enhancement schemes, it may be used for determining a brightness enhancement parameter of the image to be processed and performing image brightness adjustment on the image to be processed based on the brightness enhancement parameter.

In an embodiment, the image processing module 120 determines a brightness enhancement parameter of the image to be processed, it may be used for acquiring brightness information of the image to be processed and determining brightness enhancement parameter based on the brightness information and acquiring brightness adjustment instruction information input by a user and determining the brightness enhancement parameter of each pixel of the image to be processed based on the instruction information.

In an embodiment, the image processing module 120 may be used for acquiring a brightness channel image of the image to be processed acquiring global brightness information of the image to be processed and local brightness information of the image to be processed based on the brightness channel image and determining the brightness enhancement parameter of each pixel of the image to be processed, based on the global brightness information and the local brightness information.

In an embodiment, the image processing module 120 may be used for estimating a semantical related-local brightness information using a local brightness estimation network, based on the brightness channel image.

In an embodiment, the image processing module 120 may be used for performing image brightness adjustment on the image to be processed, using a brightness enhancement network according to the brightness enhancement parameter and the brightness channel image of the image to be processed.

In an embodiment, the at least one of image quality enhancement schemes includes image color adjustment, and when the image processing module 120 performs quality enhancement on the image to be processed using at least one of image quality enhancement schemes, it may be used for acquiring a color channel image of the image to be processed, reducing resolution of the color channel image and performing color adjustment on the resolution-reduced color channel image.

In an embodiment, the at least one of image quality enhancement schemes includes image texture enhancement, and when the image processing module 120 performs quality enhancement on the image to be processed using at least one of image quality enhancement schemes, it may be used for acquiring a texture enhancement residual and a noise suppression residual of the image to be processed using an image texture enhancement network, fusing the texture enhancement residual and the noise suppression residual to obtain a texture residual and obtaining a texture-enhanced image according to the texture residual and the image to be processed.

In an embodiment, the image texture enhancement network includes at least one dual convolution module, and a dual convolution module includes a first branch for obtaining the texture enhancement residual of the image to be processed, a second branch for obtaining the noise suppression residual of the image to be processed, and a residual fusion module for fusing the texture enhancement residual and the noise suppression residual to obtain the texture residual.

In an embodiment, for a dual convolution module, when fusing the texture enhancement residual and the noise suppression residual, the image processing module 120 is used for subtracting the noise suppression residual from the texture enhancement residual to obtain the texture residual. Correspondingly, when the image processing module 120 obtains a texture-enhanced image according to the texture residual and the image to be processed, it is used for superimposing the texture residual corresponding to each dual convolution module with the image to be processed to obtain the texture-enhanced image.

In an embodiment, for a dual convolution module, the first branch includes a first convolution module for acquiring the texture enhancement residual of the image to be processed, and a first non-linear activation function layer for performing nonlinear processing on the texture residual output by the first convolution module. The second branch includes a second convolution module for acquiring the noise suppression residual of the image to be processed, and a second non-linear activation function layer for performing nonlinear processing on the noise suppression residual output by the second convolution module. The first convolution module and the second convolution module have different convolution processing parameters.

In an embodiment, the image texture enhancement module includes at least two dual convolution modules, and different dual convolution modules have different convolution network types and/or convolution processing parameters.

In an embodiment, the image texture enhancement network includes at least two dilated convolution network based dual convolution modules, wherein the dilated convolution networks of each dilated convolution network based dual convolution modules have different the dilation ratios.

In an embodiment, when the image processing module acquires a texture enhancement residual and a noise suppression residual of the image to be processed using an image texture enhancement network, it may be used for acquiring the brightness channel image and the non-brightness channel image of the image to be processed and obtaining the texture enhancement residual and the noise suppression residual of the image to be processed, using an image texture enhancement network, based on the brightness channel image. The obtaining a texture-enhanced image according to the texture residual and the image to be processed, the image processing module may be used for obtaining a texture-enhanced brightness channel image according to the texture residual and the brightness channel image and obtaining the texture-enhanced image by fusing the texture-enhanced brightness channel image and the non-brightness channel image.

In an embodiment, the at least one of image quality enhancement schemes includes at least two enhancement schemes, when the image processing module 120 performs quality enhancement on the image to be processed using at least one of image quality enhancement schemes, it can be used for performing enhancement processing on the image to be processed in sequence in order of the at least two enhancement schemes and obtaining the processed image based on a processing result corresponding to each enhancement scheme.

In an embodiment, the image processing module 120 may be used for performing enhancement processing on the image to be processed in the processing sequence of the at least two enhancement schemes.

In an embodiment, the image processing module 120 may be used for determining scene information corresponding to the image to be processed and determining the enhancement scheme corresponding to the image to be processed and the processing sequence of different enhancement schemes, according to the scene information.

In an embodiment, the image processing module 120 may be used for determining the scene information of the image to be processed through a scene detection network, based on the image to be processed.

In an embodiment, the image processing module 120 may be used for determining a processing sequence of the at least two enhancement schemes through a processing sequence prediction network based on the image to be processed.

In an embodiment, the processing sequence prediction network includes a decision branch for selecting a current candidate enhancement scheme from the at least two enhancement schemes based on input information, and an inference branch for determining whether the current candidate enhancement scheme is a target enhancement scheme, wherein the input information is the image to be processed or an enhancement processing result of enhancement schemes processing on the image to be processed in a determined order.

In an embodiment, when performing enhancement processing on the image to be processed respectively using the at least two enhancement schemes, the image processing module 120 may be used for performing enhancement processing on the image to be processed in sequence, in the processing sequence of the at least two enhancement schemes.

In an embodiment, for any enhancement scheme other than the first enhancement scheme, the enhancement scheme processes the image to be processed based on the processing result of at least one previous enhancement processing scheme and the image to be processed.

In an embodiment, the image quality enhancement schemes include image denoising, image tone adjustment and image texture enhancement. And the processing sequence of the image quality enhancement schemes is: the image denoising, the image tone adjustment and the image texture enhancement, wherein the image tone enhancement includes image brightness adjustment and/or image color enhancement.

It may be understood that each module of the image quality enhancement apparatus provided in the embodiment of the present application may have the function of implementing the corresponding steps in the image quality enhancement method provided in the embodiment of the present application. Where this function may be realized by hardware, or by hardware executing corresponding software. Each of the above-mentioned modules may be software and/or hardware, and each module may be implemented respectively or integrated with multiple modules. For detailed descriptions of the function of each module of the image quality enhancement apparatus, reference may be made to the corresponding description in the image quality enhancement methods in the above-mentioned embodiments, which will not be repeated here.

Based on the same principle as the method and apparatus provided in the embodiment of the present application, the embodiment of the present application also provides an electronic device including a processor and a memory, in which a computer program is stored, and that when executed by the processor, performs any method provided in any alternative solution of the present application.

In an embodiment, the electronic device may specifically be a mobile terminal device (such as a smart phone), and the mobile terminal device may also include an image acquisition apparatus (such as a camera). The image acquisition apparatus is used to collect images and send the collected images to the processor, which uses at least one of image quality enhancement schemes to enhance the quality of the image to be processed by executing the above-mentioned computer program stored in the memory to obtain a processed image.

The embodiment of the present disclosure also provides a computer-readable storage medium on which a computer program is stored, and that when executed by a processor, performs the method provided in any alternative solution of the present application.

In the embodiments provided in the present application, the above-mentioned image processing method executed by the electronic device may be executed using an artificial intelligence model.

According to an embodiment of the present disclosure, in an image processing method in an electronic device, the processing method for enhancing image quality may obtain output data of image content features in a recognized image or an image, by using image data as input data for an artificial intelligence model. The artificial intelligence model may be obtained through training. Here, "obtained through training" indicates training a basic artificial intelligence model with multiple pieces of training data through a training algorithm to obtain a predefined operation rule or artificial intelligence model configured to perform desired features (or purposes). The artificial intelligence model may include multiple neural network layers. Each of the plurality of neural network layers includes a plurality of weight values, and the neural network calculation is performed by the calculation of the calculation result of the previous layer and the plurality of weight values.

Visual understanding is a technology for recognizing and processing things like human vision, and includes, for example, object recognition, object tracking, image retrieval, human recognition, scene recognition, 3D reconstruction/localization, or image enhancement.

In the embodiments provided in the present disclosure, at least one of the multiple modules can be implemented through an AI model. The functions associated with AI may be performed by a non-volatile memory, a volatile memory, and a processor.

The processor may include one or more processors. At this time, the one or more processors may be a general-purpose processor (such as, central processing unit (CPU), application processor (AP), etc.), or a pure graphic processing unit (such as, graphic processing unit (GPU), visual processing unit (VPU), and/or an AI dedicated processor (such as, neural processing unit (NPU)).

The one or more processors control the processing of input data according to predefined operation rules or artificial intelligence (AI) model stored in non-volatile memory and volatile memory. The predefined operation rule or artificial intelligence model are provided through training or learning.

Here, "providing by learning" refers to obtaining predefined operation rule or AI model with desired characteristics by applying learning algorithms to multiple learning data. This learning may be performed in the device in which the AI according to the embodiment is executed, and/or may be realized by a separate server/system.

The AI model may consist of multiple neural network layers. Each layer has multiple weight values, and the calculation of one layer is performed by the calculation result of the previous layer and multiple weights of the current layer. Examples of neural networks include, but are not limited to, convolutional neural network (CNN), deep neural network (DNN), recurrent neural network (RNN), restricted Boltzmann machine (RBM), deep belief network (DBN), bidirectional loop deep neural network (BRDNN), generative adversarial network (GAN), and deep Q network.

A learning algorithm is a method of training a predetermined target apparatus (for example, a robot) using a plurality of learning data to make, allow, or control the target apparatus to make determination or prediction. Examples of the learning algorithm include, but are not limited to, supervised learning, unsupervised learning, semi-supervised learning, or reinforcement learning.

Figure 9:
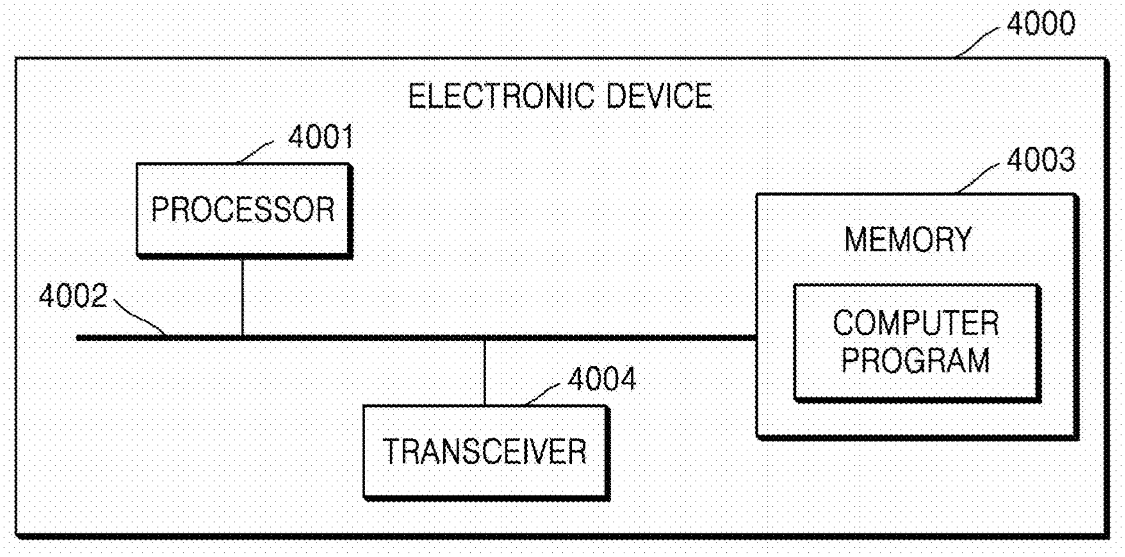
FIG. 9 shows a schematic structural diagram of an electronic device provided in an embodiment of the present application.

As an example, FIG. 9 is a schematic structural diagram illustrating an electronic device 4000 suitable for the embodiments of the present application. As shown in FIG. 9, the electronic device 4000 may include a processor 4001 and a memory 4003. The processor 4001 is connected to the memory 4003, for example, via a bus 4002. In an embodiment, the electronic device 4000 may further include a transceiver 4004. It should be noted that the transceiver 4004 is not limited to one in actual application, and the structure of the electronic device 4000 is not limited to the embodiment of the present application.

The processor 4001 may be a central processing unit (CPU), a general-purpose processor, a digital signal processor (DSP), an application specific integrated circuit (ASIC), a field programmable gated array (FPGA) or other programmable logic device, transistor logic device, hardware component, or any combination thereof. Various exemplary logic blocks, modules, and circuits described in connection with the present disclosure may be implemented or executed. The processor 4001 may also be a combination that implements computing functions, such as a combination that includes one or more microprocessors, a combination of DSP and microprocessors, etc.

The bus 4002 may include a path to transfer information between the above components. The bus 4002 may be a peripheral component interconnect (PCI) bus or an extended industry standard architecture (EISA) bus or the like. The bus 4002 may be divided into an address bus, a data bus, a control bus, etc. For ease of representation, the bus is expressed by only one thick line in FIG. 9, but it does not mean that there is only one bus or one type of bus.

The memory 4003 may be a read only memory (ROM) or other types of static storage device that may store static information and instructions, a random access memory (RAM) or other types of dynamic storage device that may store information and instructions. It may also be an electrically erasable programmable read only memory (EEPROM), a compact disc read only memory (CD-ROM) or other optical disc storage, disc storage (including compact disc, laser disc, optical disc, digital versatile disc, Blu-ray disc, etc.), magnetic disc storage medium or other magnetic storage device, or any other medium capable of carrying or storing computer program in the form of instructions or data structures and capable of being accessed by a computer, but is not limited thereto.

The memory 4003 is configured to store computer program for performing the solution of the present application, and is controlled by the processor 4001. The processor 4001 is configured to execute the computer program stored in the memory 4003 to implement the contents shown in any alternative method embodiment.

It should be understood that although various steps in the flowchart of the drawings are shown in sequence as indicated by arrows, these steps are not necessarily performed in sequence as indicated by arrows. Unless explicitly stated herein, the execution of these steps is not strictly limited in sequence but may be performed in other sequences. Moreover, at least part of the steps in the flowchart of the drawings may include a plurality of sub-steps or stages, which are not necessarily completed at the same time, but may be performed at different times, and the perform order thereof is not necessarily sequentially, but may be performed in turn or alternately with at least part of the sub-steps or stages of other steps or other steps.

The above-mentioned is only partial embodiments of the present disclosure, and it should be noted that several modifications and refinements may be made for one of ordinary skill in the art without departing from the principle of the present application, and these improvements and refinements should also be considered to be within the scope of the present application.

In an embodiment of the present disclosure, an electronic device for enhancing quality of an image includes a memory configured to store one or more instructions, and at least one processor configured to execute the one or more instructions stored in the memory to acquire the image to be processed, acquire a noise intensity of the image to be processed, denoise the image to be processed according to the noise intensity of the image, and obtain the denoised image.

In an embodiment, the at least one processor is further configured to execute the one or more instructions stored in the memory to acquire a brightness channel image of the image to be processed, and acquire a noise spatial distribution of the image to be processed according to the brightness channel image of the image. The denoising of the image to be processed according to the noise intensity of the image includes denoising the image to be processed according to the noise intensity corresponding to the each of the plurality of channel images and the noise spatial distribution of the image.

In an embodiment, to acquire the noise spatial distribution of the image to be processed according to the brightness channel image of the image, the at least one processor is configured to execute the one or more instructions stored in the memory to acquire the noise spatial distribution of the image to be processed by using a noise spatial feature network according to the brightness channel image of the image.

In an embodiment, to acquire the noise intensity corresponding to the each of the plurality of channel images of the image to be processed, the at least one processor is configured to execute the one or more instructions stored in the memory to acquire the noise intensity corresponding to the each of the plurality of channel images by using a cascaded noise intensity network.

In an embodiment, to denoise the image to be processed according to the noise intensity corresponding to the each of the plurality of channel images of the image, the at least one processor is configured to execute the one or more instructions stored in the memory to concatenate the noise intensity of the each of the plurality of channel images of the image, and to acquire a noise residual by a denoising network according to the concatenated noise intensity of each of the plurality of channel images of the image. The denoising of the image according to the noise intensity corresponding to the each of the plurality of channel images of the image includes denoising the image according to the noise residual.

In an embodiment of the present disclosure, a computer-readable storage medium, having a computer program stored thereon that performs, when executed by a processor, the method of the denoising of the image.

In an embodiment of the present disclosure, an electronic device for enhancing quality of an image includes a memory configured to store one or more instructions, and at least one processor configured to execute the one or more instructions stored in the memory to acquire a brightness channel image of the image to be processed, determine a brightness enhancement parameter of the image to be processed, perform image brightness adjustment on the image to be processed based on the brightness enhancement parameter, and obtain the brightness-adjusted image.

In an embodiment, to determine the brightness enhancement parameter of the image to be processed, the at least one processor is configured to execute the one or more instructions stored in the memory to acquire brightness adjustment instruction information input by a user, and determine the brightness enhancement parameter of each pixel of the image to be processed based on the instruction information.

In an embodiment, to determine the brightness enhancement parameter of the image to be processed, the at least one processor is configured to execute the one or more instructions stored in the memory to acquire global brightness information of the image to be processed and local brightness information of the image to be processed based on the brightness channel image, and determine the brightness enhancement parameter of each pixel of the image to be processed, based on the global brightness information and the local brightness information.

In an embodiment, to acquire the local brightness information of the image to be processed based on the brightness channel image, the at least one processor is configured to execute the one or more instructions stored in the memory to estimate a semantical related-local brightness information using a local brightness estimation network, based on the brightness channel image.

In an embodiment, to determine the brightness enhancement parameter of each pixel of the image to be processed, based on the global brightness information and the local brightness information, the at least one processor is configured to execute the one or more instructions stored in the memory to determine the brightness enhancement parameter of each pixel of the image to be processed based on pointwise production value of the global brightness information and local brightness information.

In an embodiment of the present disclosure, a computer-readable storage medium, having a computer program stored thereon that performs, when executed by a processor, the method of the image brightness adjustment.

In an embodiment of the present disclosure, An electronic device for enhancing quality of an image includes a memory configured to store one or more instructions, and at least one processor configured to execute the one or more instructions stored in the memory to acquire a brightness channel image of the image to be processed, acquire a texture enhancement residual and a noise suppression residual of the image using an image texture enhancement network according to the brightness channel image of the image, fuse the texture enhancement residual and the noise suppression residual to obtain a texture residual, perform image texture enhancement on the image according to the texture residual of the image, and obtain the texture-enhanced image.

In an embodiment, the image texture enhancement network includes at least one dual convolution module, one dual convolution module includes a first branch for obtaining the texture enhancement residual of the image to be processed and a second branch for obtaining the noise suppression residual of the image to be processed, and a residual fusion module for fusing the texture enhancement residual and the noise suppression residual to obtain the texture residual.

In an embodiment, different dual convolution modules in the image texture enhancement network have different convolution network types and/or convolution processing parameters.

In an embodiment, the at least one dual convolution module is dilated convolution module respectively and the at least one dual convolution module has different dilation ratios In an embodiment, to fuse the texture enhancement residual and the noise suppression residual to obtain the texture residual, the at least one processor is configured to execute the one or more instructions stored in the memory to subtract the noise suppression residual from the texture enhancement residual to obtain the texture residual corresponding to each of the at least one dual convolution module. The performing image texture enhancement on the image according to the texture residual of the image includes superimposing the texture residual corresponding to each of the at least one of dual convolution module with the image to be processed.

In an embodiment, the one dual convolution module comprises the first branch includes a first convolution module for acquiring the texture enhancement residual of the image to be processed, and a first non-linear activation function layer for performing nonlinear processing on the texture residual output by the first convolution module, and the second branch includes a second convolution module for acquiring the noise suppression residual of the image to be processed, and a second non-linear activation function layer for performing nonlinear processing on the noise suppression residual output by the second convolution module, wherein the first convolution module and the second convolution module have different convolution processing parameters.

In an embodiment, to acquiring the texture enhancement residual and the noise suppression residual of the image to be processed using an image texture enhancement network, the processor is further configured to execute the one or more instructions stored in the memory to acquire at least one of non-brightness channel image of the image to be processed, and acquire the texture enhancement residual and the noise suppression residual of the image to be processed, using an image texture enhancement network, based on the brightness channel image. The obtaining the texture-enhanced image comprises obtaining a texture-enhanced brightness channel image according to the texture residual and the brightness channel image; and fusing the texture-enhanced brightness channel image and the at least one of non-brightness channel image to obtain the texture-enhanced image.

In an embodiment of the present disclosure, a computer-readable storage medium, having a computer program stored thereon that performs, when executed by a processor, the method of the image texture enhancement.

While embodiments have been described with reference to the figures, it will be understood by those of ordinary skill in the art that various changes in form and details may be made therein without departing from the spirit and scope included in the following claims and their equivalents.

What is claimed is:

1. An image processing method to process an image, the method comprising:
- acquiring a plurality of channel images of the image to be processed;
- acquiring a noise intensity corresponding to each of the plurality of channel images of the image to be processed by using a noise intensity network corresponding to the each of the plurality of channel images of the image to be processed, wherein the noise intensity network is convolutional neural network;
- acquiring a brightness channel image of the image to be processed; and
- acquiring a noise spatial distribution of the image to be processed based on the brightness channel image of the image;
- concatenating the noise intensity of each of the plurality of channel images of the image to be processed;
- acquiring a noise residual by a denoising network according to the concatenated noise intensity of each of the plurality of channel images of the image to be processed;

denoising the image to be processed based on the noise residual and the noise spatial distribution of the image; and obtaining the denoised image.

2. The method of claim 1, wherein the acquiring of the noise spatial distribution of the image to be processed based on the brightness channel image of the image comprises:

acquiring the noise spatial distribution of the image to be processed based on a noise spatial feature network based on the brightness channel image of the image.

3. The method of claim 1, wherein the acquiring of the noise intensity corresponding to each of the plurality of channel images of the image to be processed comprises:

acquiring the noise intensity corresponding to each of the plurality of channel images based on a cascaded noise intensity network.

4. The method of claim 1, wherein the denoising of the image based on the noise intensity corresponding to the each of the plurality of channel images of the image to be processed comprises denoising the image to be processed based on the noise residual.

5. The method of claim 4, wherein the denoising of the image to be processed based on the noise residual and the noise spatial distribution of the image to be processed comprises:

weighting the noise residual based on the noise spatial distribution to obtain a weighted noise residual; and denoising the image to be processed based on the weighted noise residual.

6. The method of claim 5, wherein the obtaining of the denoised image comprises:

obtaining the denoised image by fusing the weighted noise residual and the image to be processed.

7. The method of claim 4, wherein a structure of the denoising network is a UNet-like structure.

8. An electronic device configured to process an image, the electronic device comprising:

a memory configured to store one or more instructions; and at least one processor configured to execute the one or more instructions stored in the memory to:

acquire a plurality of channel images of the image to be processed;

acquire a noise intensity corresponding to each of the plurality of channel images of the image to be processed by using a noise intensity network corresponding to each of the plurality of channel images of the image to be processed, wherein the noise intensity network is convolutional neural network;

acquire a brightness channel image of the image to be processed; and acquire a noise spatial distribution of the image to be processed based on the brightness channel image of the image;

concatenate the noise intensity of each of the plurality of channel images of the image to be processed;

acquire a noise residual by a denoising network according to the concatenated noise intensity of each of the plurality of channel images of the image to be processed;

denoise the image to be processed based on the noise residual and the noise spatial distribution; and obtain the denoised image.

9. The electronic device of claim 8, wherein, to acquire the noise spatial distribution of the image to be processed based on the brightness channel image of the image, the at least one processor is configured to execute the one or more instructions stored in the memory to:

acquire the noise spatial distribution of the image to be processed based on a noise spatial feature network based on the brightness channel image of the image to be processed.

10. The electronic device of claim 8, wherein, to acquire the noise intensity corresponding to each of the plurality of channel images of the image to be processed, the at least one processor is configured to execute the one or more instructions stored in the memory to:

acquire the noise intensity corresponding to each of the plurality of channel images based on a cascaded noise intensity network.

11. A non-transitory computer-readable storage medium, having a computer program stored thereon that performs, when executed by a processor, an image processing method to process an image, the method comprising:

acquiring a plurality of channel images of the image to be processed;

acquiring a noise intensity corresponding to each of the plurality of channel images of the image to be processed by using a noise intensity network corresponding to each of the plurality of channel images of the image to be processed, wherein the noise intensity network is convolutional neural network;

acquiring a brightness channel image of the image to be processed; and acquiring a noise spatial distribution of the image to be processed based on the brightness channel image of the image;

concatenating the noise intensity of each of the plurality of channel images of the image to be processed;

acquiring a noise residual by a denoising network according to the concatenated noise intensity of each of the plurality of channel images of the image to be processed;

denoising the image to be processed based on the noise residual and the noise spatial distribution; and obtaining the denoised image.

* * * * *